US010317057B2

(12) United States Patent
Fletcher et al.

(10) Patent No.: US 10,317,057 B2
(45) Date of Patent: Jun. 11, 2019

(54) LIGHTING SYSTEM HAVING A MOUNTING DEVICE

(71) Applicant: EcoSense Lighting Inc., Los Angeles, CA (US)

(72) Inventors: Robert Fletcher, Pasadena, CA (US); Edward R Adams, Englewood, TN (US)

(73) Assignee: ECOSENSE LIGHTING INC., Los Angeles, CA (US)

( * ) Notice: Subject to any disclaimer, the term of this patent is extended or adjusted under 35 U.S.C. 154(b) by 238 days.

(21) Appl. No.: 15/481,223

(22) Filed: Apr. 6, 2017

(65) Prior Publication Data

US 2017/0211789 A1    Jul. 27, 2017

Related U.S. Application Data

(63) Continuation of application No. 14/816,827, filed on Aug. 3, 2015, now Pat. No. 9,651,232.

(51) Int. Cl.
*F21V 21/26* (2006.01)
*F21V 21/30* (2006.01)
(Continued)

(52) U.S. Cl.
CPC ............... *F21V 21/26* (2013.01); *F16M 1/00* (2013.01); *F21S 2/005* (2013.01); *F21V 14/02* (2013.01);
(Continued)

(58) Field of Classification Search
CPC .......... F21V 21/30; F21V 21/26; F21V 21/28; F21V 21/29; F21V 15/015; F21V 21/108
(Continued)

(56) References Cited

U.S. PATENT DOCUMENTS

| 5,716,126 A | 2/1998 | Meyer |
| 6,079,992 A | 6/2000 | Kuchar et al. |

(Continued)

FOREIGN PATENT DOCUMENTS

| GB | 751823 A | 7/1956 |
| WO | 94/01717 A | 1/1994 |
| WO | 2018/053375 A1 | 3/2018 |

OTHER PUBLICATIONS

International Search Report and Opinion dated Nov. 16, 2017 in PCT International patent application No. PCT/US2017/051939 filed on Sep. 16, 2017; 8pp.

*Primary Examiner* — Anh T Mai
*Assistant Examiner* — Michael Chiang
(74) *Attorney, Agent, or Firm* — Jay M. Brown

(57) ABSTRACT

Lighting system including mounting post, mounting body, first lighting module, and second lighting module. Mounting post has first end spaced apart along longitudinal axis from second end. Mounting body has first end being spaced apart along another longitudinal axis from second end. First end of mounting body is pivotally connected at first pivot axis by first pivot joint with first end of mounting post. First lighting module includes first semiconductor light-emitting device in first housing and is pivotally connected at first pivot axis by first pivot joint with first end of mounting body and with first end of mounting post. Second lighting module includes second semiconductor light-emitting device in second housing and is pivotally connected at second pivot axis by second pivot joint with second end of mounting body.

50 Claims, 24 Drawing Sheets

(51) Int. Cl.
  *F21S 2/00*    (2016.01)
  *F21V 14/02*   (2006.01)
  *F16M 1/00*    (2006.01)
  *F21V 15/015*  (2006.01)
  *F21Y 115/10*  (2016.01)
  *F21V 21/108*  (2006.01)
  *F21Y 115/30*  (2016.01)
  *F21Y 115/15*  (2016.01)

(52) U.S. Cl.
  CPC ............ *F21V 21/30* (2013.01); *F21V 15/015* (2013.01); *F21V 21/108* (2013.01); *F21Y 2115/10* (2016.08); *F21Y 2115/15* (2016.08); *F21Y 2115/30* (2016.08)

(58) Field of Classification Search
  USPC .......................... 248/282.1, 278.1; 362/427
  See application file for complete search history.

(56) References Cited

U.S. PATENT DOCUMENTS

| | | | | |
|---|---|---|---|---|
| 6,416,207 B1* | 7/2002 | Chang | ...................... | F21S 6/003 362/249.07 |
| 8,104,934 B2* | 1/2012 | Probasco | ................. | F21S 8/028 362/3 |
| 9,255,677 B2 | 2/2016 | Pickard et al. | | |
| 2009/0318770 A1* | 12/2009 | Marka | .................... | A61B 90/35 600/249 |
| 2010/0254147 A1* | 10/2010 | Tsao | ........................ | F21V 21/30 362/371 |

* cited by examiner

LIGHTING SYSTEM HAVING A MOUNTING DEVICE

BACKGROUND OF THE INVENTION

1. Field of the Invention

The present invention relates to the field of lighting systems that include semiconductor light-emitting devices.

2. Background of the Invention

Numerous lighting systems including lighting modules that include semiconductor light-emitting devices have been developed. As examples, some of these lighting systems may include mounting devices. Despite the existence of these lighting systems, further improvements are still needed in lighting systems including lighting modules and that have mounting devices.

SUMMARY

In an example of an implementation, a lighting system is provided that includes: a mounting post; a mounting body; a first lighting module; and a second lighting module. In the example of the lighting system, the mounting post has a first end being spaced apart along a longitudinal axis from a second end. Also in the example of the lighting system, the mounting body has a first end being spaced apart along another longitudinal axis from a second end, the first end of the mounting body being pivotally connected at a first pivot axis by a first pivot joint with the first end of the mounting post. In the example of the lighting system, the first lighting module includes a first housing and has a first semiconductor light-emitting device in the first housing, the first lighting module being pivotally connected at the first pivot axis by the first pivot joint with the first end of the mounting body and with the first end of the mounting post. Also in the example of the lighting system, the second lighting module includes a second housing and has a second semiconductor light-emitting device in the second housing, the second lighting module being pivotally connected at a second pivot axis by a second pivot joint with the second end of the mounting body.

In some examples of the implementation of the lighting system, the first pivot joint may be configured for permitting a range of pivotal movement by the first housing around the first pivot axis.

In further examples of the implementation of the lighting system, the first pivot joint may be configured for permitting another range of pivotal movement by the mounting body around the first pivot axis.

In additional examples of the implementation of the lighting system, the second pivot joint may be configured for permitting a further range of pivotal movement by the second housing around the second pivot axis.

In other examples of the implementation of the lighting system, the first pivot joint and the second pivot joint may be configured for cooperatively preventing the first housing from being in direct contact with the second housing.

In some examples of the implementation of the lighting system, the first pivot joint and the second pivot joint may be configured for causing the another range of pivotal movement and the further range of pivotal movement to cooperatively prevent the first housing from being in direct contact with the second housing.

In further examples of the implementation of the lighting system, the first pivot joint and the second pivot joint may be configured for cooperatively maintaining the first housing as being at least a selected minimum distance away from the second housing.

In additional examples of the implementation of the lighting system, the first pivot joint and the second pivot joint may be configured for cooperatively maintaining the first housing as being at least a selected minimum distance of about one millimeter away from the second housing.

In other examples of the implementation of the lighting system, the first lighting module may be configured for emitting light emissions along a first central light emission axis intersecting the first pivot axis.

In some examples of the implementation of the lighting system, the second lighting module may be configured for emitting further light emissions along a second central light emission axis intersecting the second pivot axis.

In further examples of the implementation of the lighting system, the range of pivotal movement, and the another range of pivotal movement, and the further range of pivotal movement, may be collectively configured for permitting an alignment of the first central light emission axis of the first lighting module as being parallel with the second central light emission axis of the second lighting module.

In additional examples of the implementation of the lighting system, the first pivot joint may be configured for facilitating a locking of the first central light emission axis of the first lighting module in a fixed position relative to the second central light emission axis of the second lighting module.

In other examples of the implementation of the lighting system, the first pivot joint may be configured for facilitating a locking of the another longitudinal axis of the mounting body as being in a fixed position relative to the first central light emission axis of the first lighting module.

In some examples of the implementation of the lighting system, the second pivot joint may be configured for facilitating another locking of the another longitudinal axis of the mounting body as being in another fixed position relative to the second central light emission axis of the second lighting module.

In further examples of the implementation of the lighting system, the first pivot joint may be configured for permitting the range of pivotal movement by the first housing around the first pivot axis while the another longitudinal axis of the mounting body may be locked in the fixed position relative to the first central light emission axis and may be locked in the another fixed position relative to the second central light emission axis.

In additional examples of the implementation of the lighting system, the lighting system may include a first mounting arm being attached to the first housing and forming a part of the first pivot joint.

In other examples of the implementation of the lighting system, the lighting system may include a second mounting arm being attached to the second housing and forming a part of the second pivot joint.

In some examples of the implementation of the lighting system, the first mounting arm may form a part of the first housing and the second mounting arm may form a part of the second housing.

In further examples of the implementation of the lighting system, the first mounting arm may be aligned between the first semiconductor light-emitting device and the first pivot axis, and the second mounting arm may be aligned between the second semiconductor light-emitting device and the second pivot axis.

In additional examples of the implementation of the lighting system, the first mounting arm may be configured for permitting the range of pivotal movement by the first housing around the first pivot axis and for permitting the another range of pivotal movement by the mounting body around the first pivot axis; and the second mounting arm may be configured for permitting the further range of pivotal movement by the second housing around the second pivot axis.

In other examples of the implementation of the lighting system, the first mounting arm may have an end intersecting with the first pivot axis and the second mounting arm may have another end intersecting with the second pivot axis.

In some examples of the implementation of the lighting system, the first pivot joint may further include a bolt, and the bolt may pass, along the first pivot axis, through the first end of the mounting post and through the first end of the mounting body and through the end of the first mounting arm.

In further examples of the implementation of the lighting system, the first end of the mounting body may have an aperture and the end of the first mounting arm may have another aperture, and the first pivot axis may pass through the aperture and through the another aperture, and the first end of the mounting post may have a threaded receptacle configured for receiving a threaded bolt forming a part of the first pivot joint and passing through the aperture and through the another aperture into the threaded receptacle.

In additional examples of the implementation of the lighting system, the first end of the mounting post may have an aperture and the end of the first mounting arm may have another aperture, and the first pivot axis may pass through the aperture and through the another aperture, and the first end of the mounting body may have a threaded receptacle configured for receiving a threaded bolt forming a part of the first pivot joint and passing through the aperture and through the another aperture into the threaded receptacle.

In other examples of the implementation of the lighting system, the first end of the mounting post may have an aperture and the first end of the mounting body may have another aperture, and the first pivot axis may pass through the aperture and through the another aperture, and the end of the first mounting arm may have a threaded receptacle configured for receiving a threaded bolt forming a part of the first pivot joint and passing through the aperture and through the another aperture into the threaded receptacle.

In further examples of the implementation of the lighting system, the second pivot joint may further include a threaded bolt, and the bolt may pass, along the second pivot axis, through the second end of the mounting body and through the another end of the second mounting arm.

In some examples of the implementation of the lighting system, the lighting system may further include an end cap having a threaded receptacle, the end cap being configured for receiving the threaded bolt as passing through the aperture and through the another aperture into the threaded receptacle.

In additional examples of the implementation of the lighting system, the second end of the mounting body may have an aperture and the another end of the second mounting arm may have another aperture, and the second pivot axis may pass through the aperture and through the another aperture, and the second pivot joint may further include a threaded bolt passing through the aperture and through the another aperture and being configured for securing together the mounting body with the second mounting arm.

In other examples of the implementation of the lighting system, the another end of the second mounting arm may have an aperture, and the second end of the mounting body may have a threaded receptacle configured for receiving a threaded bolt, and the second pivot joint may further include a threaded bolt passing through the aperture into the threaded receptacle.

In some examples of the implementation of the lighting system, the second end of the mounting body may have an aperture, and the another end of the second mounting arm may have a threaded receptacle configured for receiving a threaded bolt, and the second pivot joint may further include a threaded bolt passing through the aperture into the threaded receptacle.

In further examples of the implementation of the lighting system, the first housing may include a first light emission aperture, and the first housing may include a first back plate being spaced apart by a first side wall along the first central light emission axis.

In additional examples of the implementation of the lighting system, the second housing may include a second light emission aperture, and the second housing may include a second back plate being spaced apart by a second side wall along the second central light emission axis.

In other examples of the implementation of the lighting system, the first side wall may have a shape, and the shape of the first side wall may include: a cylindrical shape; a spherical shape; a bullet shape; a frusto-conical shape; or an ellipsoid shape.

In some examples of the implementation of the lighting system, the second side wall may have a shape, and the shape of the second side wall may include: a cylindrical shape; a spherical shape; a bullet shape; a frusto-conical shape; or an ellipsoid shape.

In further examples of the implementation of the lighting system, the first housing may include additional side walls, and the first side wall and the additional side walls collectively may form a first housing shape, and the first housing shape may include a polyhedron.

In additional examples of the implementation of the lighting system, the polyhedron may include a cube or a prism.

In other examples of the implementation of the lighting system, the prism may include: a rectangular prism; a pentagonal prism; or a hexagonal prism.

In some examples of the implementation of the lighting system, the second housing may include further side walls, and the second side wall and the further side walls collectively may form a second housing shape, and the second housing shape may include a polyhedron.

In further examples of the implementation of the lighting system, the polyhedron may include a cube or a prism.

In additional examples of the implementation of the lighting system, the prism may include: a rectangular prism; a pentagonal prism; or a hexagonal prism.

In other examples of the implementation of the lighting system, the first mounting arm may be attached to the first back plate.

In some examples of the implementation of the lighting system, the second mounting arm may be attached to the second back plate.

In further examples of the implementation of the lighting system, the first mounting arm may be integral with the first back plate and the second mounting arm may be integral with the second back plate.

In additional examples of the implementation of the lighting system, the mounting body may include a lateral edge extending between the first and second ends of the mounting body, and the first mounting arm may have a surface configured for being engaged with the lateral edge of the mounting body at an endpoint of the another range of pivotal movement, and the second mounting arm may have another surface configured for being engaged with the lateral edge at another endpoint of the further range of pivotal movement.

In other examples of the implementation of the lighting system, the surface of the first mounting arm and the another surface of the second mounting arm may be configured together with the lateral edge of the mounting body for cooperatively preventing the first housing from being in direct contact with the second housing.

In some examples of the implementation of the lighting system, the surface of the first mounting arm and the another surface of the second mounting arm may be configured, while being engaged with the lateral edge of the mounting body, for cooperatively maintaining the first housing as being at least a selected minimum distance of about one millimeter away from the second housing.

In further examples of the implementation of the lighting system, the mounting body may include: a container and a cover collectively forming an enclosed chamber; and an aperture in the enclosed chamber forming a part of the first pivot joint and being aligned with the first pivot axis; and another aperture in the enclosed chamber forming a part of the second pivot joint and being aligned with the second pivot axis.

In additional examples of the implementation of the lighting system, the mounting post may include a first electrical conduit communicating with the first and second ends of the mounting post, and the end of the first mounting arm may include a second electrical conduit communicating with the first electrical conduit and with the aperture, and the end of the first mounting arm may include a third electrical conduit communicating with the second electrical conduit and with the first lighting module, and the another end of the second mounting arm may include a fourth electrical conduit communicating with the another aperture and with the second lighting module.

In other examples of the implementation of the lighting system, the first electrical conduit, the second electrical conduit, the enclosed chamber, the third electrical conduit and the fourth electrical conduit may be collectively configured for supplying electrical power to the first and second lighting modules from an external power source.

In some examples of the implementation of the lighting system, the mounting body may include a ring surrounding the aperture and forming a part of the first pivot joint, and the mounting post may include another ring located at the first end of the mounting post and forming a part of the first pivot joint, and the ring may be configured for being engaged with the another ring and for permitting the mounting body to be pivoted around the first pivot axis.

In further examples of the implementation of the lighting system, the mounting body may include an end cap forming a part of the first pivot joint and being aligned with the first pivot axis, and the ring may be aligned between the end cap and the ring, and the end cap may be configured for permitting the mounting body to be pivoted around the first pivot axis.

In additional examples of the implementation of the lighting system, the mounting body may include a ring surrounding the aperture and forming a part of the first pivot joint, and the mounting post may include another ring located at the first end of the mounting post and forming a part of the first pivot joint, and the first mounting arm may include a further ring located at the end of the first mounting arm and forming a part of the first pivot joint, and the further ring may be configured for being engaged with the ring and with the another ring and for permitting the first lighting module and the mounting body to be pivoted around the first pivot axis.

In other examples of the implementation of the lighting system, the mounting body may include a ring surrounding the aperture and forming a part of the first pivot joint, and the mounting post may include another ring located at the first end of the mounting post and forming a part of the first pivot joint, and the ring may have a surface configured for being engaged with another surface of the another ring, and the surface of the ring and the another surface of the another ring may be mutually positioned for permitting the mounting body to be pivoted around the first pivot axis.

In some examples of the implementation of the lighting system, the surface of the ring and the another surface of the another ring may be collectively configured for locating the mounting body at a one of a plurality of predetermined positions within the another range of pivotal movement.

In further examples of the implementation of the lighting system, the surface of the ring and the another surface of the another ring each may include a circular pattern of alternating radially extending crests and valleys.

In additional examples of the implementation of the lighting system, the mounting body may include an additional ring surrounding a further aperture and forming a part of the second pivot joint, and the second mounting arm may include yet another ring located at the another end of the second mounting arm and forming a part of the second pivot joint, and the additional ring may be configured for being engaged with the yet another ring and for permitting the second lighting module to be pivoted around the second pivot axis.

In other examples of the implementation of the lighting system, the mounting body may include an additional ring surrounding a further aperture and forming a part of the second pivot joint, and the second mounting arm may include yet another ring located at the another end of the second mounting arm and forming a part of the second pivot joint, and the additional ring may have a further surface configured for being engaged with an additional surface of the yet another ring, and the further surface of the additional ring and the additional surface of the yet another ring may be mutually positioned for permitting the second lighting module to be pivoted around the second pivot axis.

In some examples of the implementation of the lighting system, the further surface of the additional ring and the additional surface of the yet another ring may be collectively configured for locating the second lighting module at a one of a plurality of predetermined positions within the further range of pivotal movement.

In further examples of the implementation of the lighting system, the further surface of the additional ring and the additional surface of the yet another ring each may include a circular pattern of alternating radially extending crests and valleys.

In additional examples of the implementation of the lighting system, the further lighting system may include a mounting bracket plate being attached to the mounting post.

In other examples of the implementation of the lighting system, the mounting bracket plate may be attached by a swivel joint to the mounting post, and the swivel joint may be configured for facilitating rotation of the mounting post around the longitudinal axis on a swivel path.

In some examples of the implementation of the lighting system, the mounting post may be configured for being locked at a selected position along the swivel path.

In further examples of the implementation of the lighting system, the lighting system may further include: a first connector body having a first end being spaced apart along the first pivot axis from a second end, the first end of the first connector body forming a part of the first pivot joint, and the second end of the first connector body forming a part of a third pivot joint having a third pivot axis; and a third lighting module including a third housing and having a third semiconductor light-emitting device in the third housing, the third lighting module being pivotally connected at the third pivot axis by the third pivot joint with the second end of the first connector body.

In additional examples of the implementation of the lighting system, the lighting system may further include: a second connector body having a first end being spaced apart along the second pivot axis from a second end, the first end of the second connector body forming a part of the second pivot joint, and the second end of the second connector body forming a part of a fourth pivot joint having a fourth pivot axis; and another mounting body having a first end being spaced apart along a further longitudinal axis from a second end, the first end of the another mounting body being pivotally connected at the third pivot axis by the third pivot joint with the second end of the first connector body; and a fourth lighting module including a fourth housing and having a fourth semiconductor light-emitting device in the fourth housing, the fourth lighting module being pivotally connected at the fourth pivot axis by the fourth pivot joint with the second end of the second connector body and with the second end of the another mounting body.

In other examples of the implementation of the lighting system, the lighting system may include: a connector body having a first end being spaced apart along the second pivot axis from a second end, the first end of the connector body forming a part of the second pivot joint, and the second end of the connector body forming a part of another pivot joint having another pivot axis; and another lighting module including another housing and having another semiconductor light-emitting device in the another housing, the another lighting module being pivotally connected at the another pivot axis by the another pivot joint with the second end of the connector body.

In some examples of the implementation of the lighting system, the third pivot joint may be configured for permitting an additional range of pivotal movement by the third housing around the third pivot axis.

In further examples of the implementation of the lighting system, the third pivot joint may be configured for permitting yet another range of pivotal movement by the another mounting body around the third pivot axis.

In additional examples of the implementation of the lighting system, the fourth pivot joint may be configured for permitting a still further range of pivotal movement by the fourth housing around the fourth pivot axis.

In other examples of the implementation of the lighting system, the third pivot joint and the fourth pivot joint may be configured for cooperatively preventing the third housing from being in direct contact with the fourth housing.

In some examples of the implementation of the lighting system, the third pivot joint and the fourth pivot joint may be configured for causing the yet another range of pivotal movement and the still further range of pivotal movement to cooperatively prevent the third housing from being in direct contact with the fourth housing.

In further examples of the implementation of the lighting system, the third pivot joint and the fourth pivot joint may be configured for cooperatively maintaining the third housing as being at least a selected minimum distance away from the fourth housing.

In additional examples of the implementation of the lighting system, the third pivot joint and the fourth pivot joint may be configured for cooperatively maintaining the third housing as being at least a selected minimum distance of about one millimeter away from the fourth housing.

In other examples of the implementation of the lighting system, the third lighting module may be configured for emitting additional light emissions along a third central light emission axis intersecting the third pivot axis.

In some examples of the implementation of the lighting system, the fourth lighting module may be configured for emitting other light emissions along a fourth central light emission axis intersecting the fourth pivot axis.

In further examples of the implementation of the lighting system, the additional range of pivotal movement, and the yet another range of pivotal movement, and the still further range of pivotal movement, may be collectively configured for permitting an alignment of the third central light emission axis of the third lighting module as being parallel with the fourth central light emission axis of the fourth lighting module.

In additional examples of the implementation of the lighting system, the third pivot joint may be configured for facilitating a locking of the third central light emission axis of the third lighting module in a fixed position relative to the fourth central light emission axis of the fourth lighting module.

In other examples of the implementation of the lighting system, the third pivot joint may be configured for facilitating a locking of the further longitudinal axis of the another mounting body as being in a fixed position relative to the third central light emission axis of the third lighting module.

In some examples of the implementation of the lighting system, the fourth pivot joint may be configured for facilitating another locking of the further longitudinal axis of the another mounting body as being in another fixed position relative to the fourth central light emission axis of the fourth lighting module.

In further examples of the implementation of the lighting system, the third pivot joint may be configured for facilitating the additional range of pivotal movement by the third housing around the third pivot axis while the further longitudinal axis of the another mounting body may be locked in the fixed position relative to the third central light emission axis and may be locked in the another fixed position relative to the fourth central light emission axis.

In additional examples of the implementation of the lighting system, the first connector body may be configured for facilitating a locking of the first central light emission axis as being parallel with the third central light emission axis.

In other examples of the implementation of the lighting system, the second connector body may be configured for facilitating a locking of the second central light emission axis as being parallel with the fourth central light emission axis.

In some examples of the implementation of the lighting system, the lighting system may include a third mounting arm being attached to the third housing and forming a part of the third pivot joint.

In further examples of the implementation of the lighting system, the lighting system may include a fourth mounting arm being attached to the fourth housing and forming a part of the fourth pivot joint.

In additional examples of the implementation of the lighting system, the third mounting arm may form a part of the third housing and the fourth mounting arm may form a part of the fourth housing.

In other examples of the implementation of the lighting system, the third mounting arm may be aligned between the third semiconductor light-emitting device and the third pivot axis, and the fourth mounting arm may be aligned between the fourth semiconductor light-emitting device and the fourth pivot axis.

In some examples of the implementation of the lighting system, the third mounting arm may be configured for permitting the additional range of pivotal movement by the third housing around the third pivot axis and for permitting the yet another range of pivotal movement by the another mounting body around the third pivot axis; and the fourth mounting arm may be configured for permitting the still further range of pivotal movement by the fourth housing around the fourth pivot axis.

In further examples of the implementation of the lighting system, the third mounting arm may have a further end intersecting with the third pivot axis and the fourth mounting arm may have an additional end intersecting with the fourth pivot axis.

In additional examples of the implementation of the lighting system, the first pivot joint may include a first bolt passing, along the first pivot axis, into the first end of the mounting body, and into the end of the first mounting arm, and into the first end of the first connector body.

In other examples of the implementation of the lighting system, the second pivot joint may include a second bolt passing, along the second pivot axis, into the second end of the mounting body, and into the end of the second mounting arm, and into the first end of the second connector body.

In some examples of the implementation of the lighting system, the third pivot joint may include a third bolt passing, along the third pivot axis, into the first end of the another mounting body, and into the end of the third mounting arm, and into the second end of the first connector body.

In further examples of the implementation of the lighting system, the fourth pivot joint may include a fourth bolt passing, along the fourth pivot axis, into the second end of the another mounting body, and into the end of the fourth mounting arm, and into the second end of the second connector body.

In additional examples of the implementation of the lighting system, the third housing may include a third light emission aperture, and the third housing may include a third back plate being spaced apart by a third side wall along the third central light emission axis.

In other examples of the implementation of the lighting system, the fourth housing may include a fourth light emission aperture, and the fourth housing may include a fourth back plate being spaced apart by a fourth side wall along the fourth central light emission axis.

In some examples of the implementation of the lighting system, the third side wall may have a shape, and the shape of the third side wall may include: a cylindrical shape; a spherical shape; a bullet shape; a frusto-conical shape; or an ellipsoid shape.

In further examples of the implementation of the lighting system, the fourth side wall may have a shape, and the shape of the fourth side wall may include: a cylindrical shape; a spherical shape; a bullet shape; a frusto-conical shape; or an ellipsoid shape.

In additional examples of the implementation of the lighting system, the third housing may include additional side walls, and the third side wall and the additional side walls may collectively form a third housing shape, and the third housing shape may include a polyhedron.

In other examples of the implementation of the lighting system, the polyhedron may include a cube or a prism.

In some examples of the implementation of the lighting system, the prism may include: a rectangular prism; a pentagonal prism; or a hexagonal prism.

In further examples of the implementation of the lighting system, the fourth housing may include further side walls, and the fourth side wall and the further side walls may collectively form a fourth housing shape, and the fourth housing shape may include a polyhedron.

In additional examples of the implementation of the lighting system, the polyhedron may include a cube or a prism.

In other examples of the implementation of the lighting system, the prism may include: a rectangular prism; a pentagonal prism; or a hexagonal prism.

In some examples of the implementation of the lighting system, the third mounting arm may be attached to the third back plate.

In further examples of the implementation of the lighting system, the fourth mounting arm may be attached to the fourth back plate.

In additional examples of the implementation of the lighting system, the third mounting arm may be integral with the third back plate and the fourth mounting arm may be integral with the fourth back plate.

In other examples of the implementation of the lighting system, the another mounting body may include a lateral edge extending between the first and second ends of the another mounting body, and the third mounting arm may have a surface configured for being engaged with the lateral edge of the another mounting body at an endpoint of the yet another range of pivotal movement, and the fourth mounting arm may have another surface configured for being engaged with the lateral edge of the another mounting body at another endpoint of the still further range of pivotal movement.

In some examples of the implementation of the lighting system, the surface of the third mounting arm and the another surface of the fourth mounting arm may be configured together with the lateral edge of the another mounting body for cooperatively preventing the third housing from being in direct contact with the fourth housing.

In further examples of the implementation of the lighting system, the surface of the third mounting arm and the another surface of the fourth mounting arm may be configured, while being engaged with the lateral edge of the another mounting body, for cooperatively maintaining the third housing as being at least a selected minimum distance of about one millimeter away from the fourth housing.

In additional examples of the implementation of the lighting system, the mounting body may include: a container and a cover collectively forming an enclosed chamber; and an aperture in the enclosed chamber forming a part of the first pivot joint and being aligned with the first pivot axis; and another aperture in the enclosed chamber forming a part of the second pivot joint and being aligned with the second pivot axis.

In other examples of the implementation of the lighting system, the another mounting body may include: another container and another cover collectively forming another enclosed chamber; and a further aperture in the another enclosed chamber forming a part of the third pivot joint and being aligned with the third pivot axis; and an additional aperture in the another enclosed chamber forming a part of the fourth pivot joint and being aligned with the fourth pivot axis.

In some examples of the implementation of the lighting system, the mounting post may include a first electrical conduit communicating with the first and second ends of the mounting post, and the end of the first mounting arm may include a second electrical conduit communicating with the first electrical conduit and with the aperture, and the end of the first mounting arm may include a third electrical conduit communicating with the second electrical conduit and with the first lighting module, and the another end of the second mounting arm may include a fourth electrical conduit communicating with the another aperture and with the second lighting module.

In further examples of the implementation of the lighting system, the first connector body may include a fifth electrical conduit communicating with the first end of the mounting post and with the first end of the another mounting body, and the second connector body may include a sixth electrical conduit communicating with the second end of the mounting body and with the second end of the another mounting body, and the further end of the third mounting arm may include a seventh electrical conduit communicating with the first end of the another mounting body and with the third lighting module, and the additional end of the fourth mounting arm may include an eighth electrical conduit communicating with the second end of the another mounting body and with the fourth lighting module.

In additional examples of the implementation of the lighting system, the first electrical conduit, the second electrical conduit, the enclosed chamber, the third electrical conduit, the fourth electrical conduit, the fifth electrical conduit, the sixth electrical conduit, the seventh electrical conduit, and the eighth electrical conduit may be collectively configured for supplying electrical power to the first, second, third and fourth lighting modules from an external power source.

In some examples of the implementation of the lighting system, the mounting body may include a ring surrounding the aperture and forming a part of the first pivot joint, and the first connector body may include another ring located at the first end of the first connector body and forming a part of the first pivot joint, and the ring may be configured for being engaged with the another ring while permitting the mounting body to be pivoted around the first pivot axis.

In further examples of the implementation of the lighting system, the mounting body may include an end cap forming a part of the first pivot joint and being aligned with the first pivot axis, and the ring may be aligned between the end cap and the another ring, and the end cap may be configured for permitting the mounting body to be pivoted around the first pivot axis.

In additional examples of the implementation of the lighting system, the another mounting body may include a further ring surrounding the further aperture and forming a part of the third pivot joint, and the first connector body may include an additional ring located at the second end of the first connector body and forming a part of the third pivot joint, and the further ring may be configured for being engaged with the additional ring while permitting the another mounting body to be pivoted around the third pivot axis.

In other examples of the implementation of the lighting system, the ring may have a surface configured for being engaged with a surface of the another ring, and the surface of the ring and the surface of the another ring may be mutually positioned for permitting the mounting body to be pivoted around the first pivot axis.

In some examples of the implementation of the lighting system, the further ring may have a surface configured for being engaged with a surface of the additional ring, and the surface of the further ring and the surface of the additional ring may be mutually positioned for permitting the another mounting body to be pivoted around the third pivot axis.

In further examples of the implementation of the lighting system, the surface of the ring and the surface of the additional ring may be collectively configured for locating the mounting body at a one of a plurality of predetermined positions within the another range of pivotal movement.

In other examples of the implementation of the lighting system, the surface of the further ring and the surface of the additional ring may be collectively configured for locating the another mounting body at a one of a plurality of predetermined positions within the yet another range of pivotal movement.

In some examples of the implementation of the lighting system, a circular pattern of alternating radially extending crests and valleys may be included in: the surface of the ring; the surface of the another ring; the surface of the further ring; and the surface of the additional ring.

In further examples of the implementation of the lighting system, the mounting body may include a ring surrounding the aperture and forming a part of the first pivot joint, and the first connector body may include another ring located at the first end of the first connector body and forming a part of the first pivot joint, and the first mounting arm may include yet another ring located at the end of the first mounting arm and forming a part of the first pivot joint, and the yet another ring may be configured for being engaged with the ring and with the another ring while permitting the first lighting module and the mounting body to be pivoted around the first pivot axis.

In other examples of the implementation of the lighting system, the another mounting body may include a further ring surrounding the further aperture and forming a part of the third pivot joint, and the first connector body may include an additional ring located at the second end of the first connector body and forming a part of the third pivot joint, and the third mounting arm may include a yet additional ring located at the end of the third mounting arm and forming a part of the third pivot joint, and the yet additional ring may be configured for being engaged with the additional ring and with the further ring while permitting the third lighting module and the mounting body to be pivoted around the third pivot axis.

In some examples of the implementation of the lighting system, the ring may have a surface configured for being engaged with a first surface of the yet another ring, and the yet another ring may have a second surface configured for being engaged with a surface of the another ring, and the surface of the ring and the surface of the another ring and the first and second surfaces of the yet another ring may be mutually positioned for permitting the mounting body to be pivoted around the first pivot axis.

In further examples of the implementation of the lighting system, the additional ring may have a surface configured for being engaged with a first surface of the yet additional ring, and the yet additional ring may have a second surface configured for being engaged with a surface of the further ring, and the surface of the additional ring and the surface of the further ring and the first and second surfaces of the yet additional ring may be mutually positioned for permitting the another mounting body to be pivoted around the third pivot axis.

In additional examples of the implementation of the lighting system, the mounting body may include a yet further ring surrounding the another aperture and forming a part of the second pivot joint, and the second mounting arm may include a still another ring located at the another end of the second mounting arm and forming a part of the second pivot joint, and the second connector body may include a still further ring at the first end of the second connector body, and the still another ring may be configured for being engaged with the yet further ring and with the still further ring while permitting the second lighting module and the mounting body to be pivoted around the second pivot axis.

In other examples of the implementation of the lighting system, the another mounting body may include a still additional ring surrounding the additional aperture and forming a part of the fourth pivot joint, and the second connector body may include an even further ring located at the second end of the second connector body and forming a part of the fourth pivot joint, and the fourth mounting arm may include an even additional ring located at the end of the fourth mounting arm and forming a part of the fourth pivot joint, and the even additional ring may be configured for being engaged with the even further ring and with the still additional ring while permitting the fourth lighting module and the another mounting body to be pivoted around the fourth pivot axis.

Other systems, devices, processes, features and advantages of the invention will be or will become apparent to one with skill in the art upon examination of the following figures and detailed description. It is intended that all such additional systems, devices, processes, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
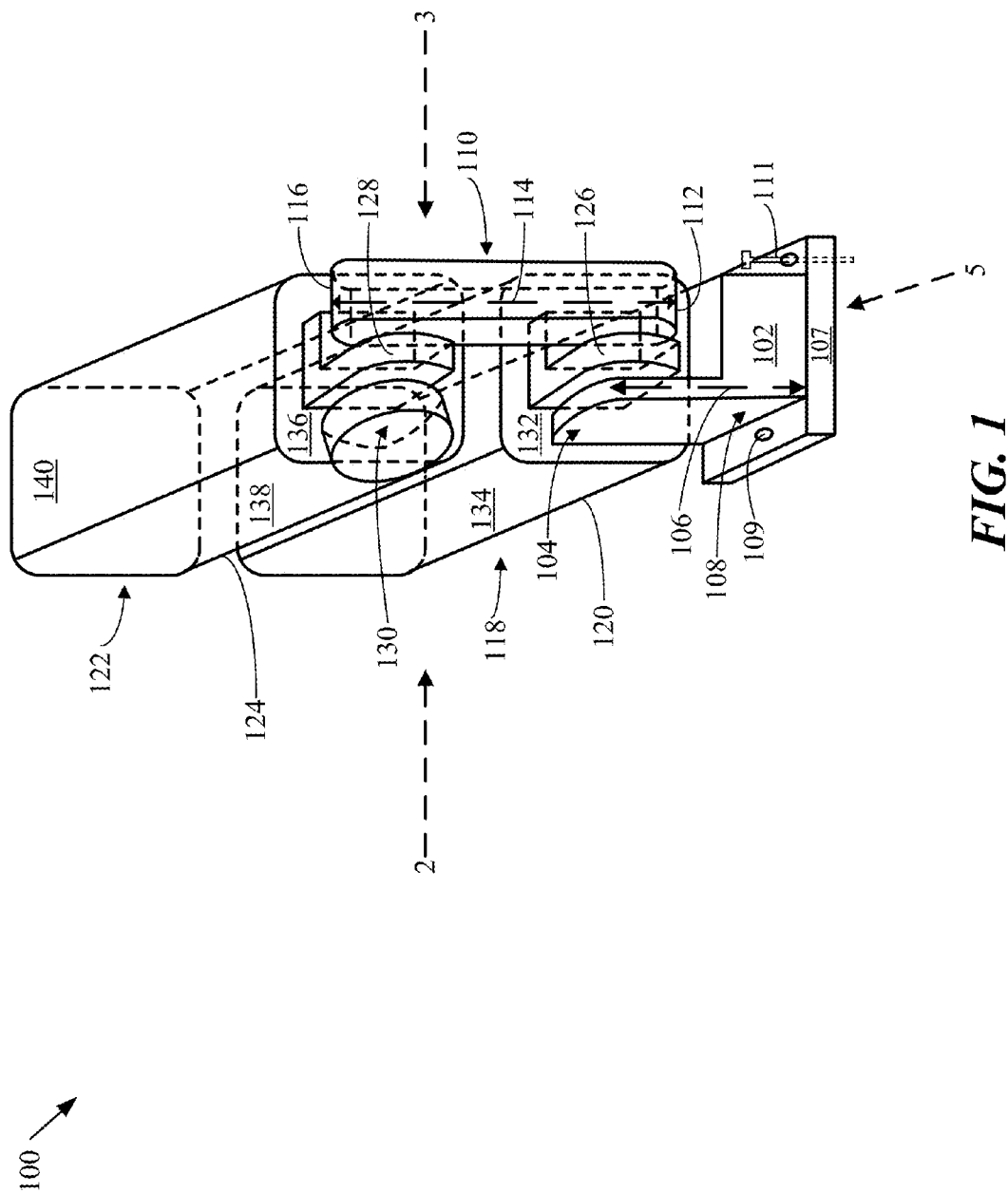
FIG. 1 is a perspective back side view showing an example [100] of an implementation of a lighting system.

Various lighting systems that utilize semiconductor light-emitting devices have been designed. Many such lighting systems exist that include mounting devices. However, existing lighting systems often have demonstrably failed to provide mounting systems that facilitate the rapid, precise, easily-executed, adjustable, and secure positioning of each of a plurality of lighting modules in independently-selectable directions.

In some examples, a lighting system accordingly is provided herein, that may include: a mounting post; a mounting body; a first lighting module; and a second lighting module. In these examples of the lighting system, the mounting post has a first end being spaced apart along a longitudinal axis from a second end. Also in these examples of the lighting system, the mounting body has a first end being spaced apart along another longitudinal axis from a second end, the first end of the mounting body being pivotally connected at a first pivot axis by a first pivot joint with the first end of the mounting post. In these examples of the lighting system, the first lighting module includes a first housing and has a first semiconductor light-emitting device in the first housing, the first lighting module being pivotally connected at the first pivot axis by the first pivot joint with the first end of the mounting body and with the first end of the mounting post. Also in these examples of the lighting system, the second lighting module includes a second housing and has a second semiconductor light-emitting device in the second housing, the second lighting module being pivotally connected at a second pivot axis by a second pivot joint with the second end of the mounting body.

In further examples, a lighting system is provided herein that may further include: a first connector body having a first end being spaced apart along the first pivot axis from a second end, the first end of the first connector body forming a part of the first pivot joint, and the second end of the first connector body forming a part of a third pivot joint having a third pivot axis; and a third lighting module including a third housing and having a third semiconductor light-emitting device in the third housing, the third lighting module being pivotally connected at the third pivot axis by the third pivot joint with the second end of the first connector body. In additional examples, the lighting system may also include: a second connector body having a first end being spaced apart along the second pivot axis from a second end, the first end of the second connector body forming a part of the second pivot joint, and the second end of the second connector body forming a part of a fourth pivot joint having a fourth pivot axis; and another mounting body having a first end being spaced apart along a further longitudinal axis from a second end, the first end of the another mounting body being pivotally connected at the third pivot axis by the third pivot joint with the second end of the first connector body; and a fourth lighting module including a fourth housing and having a fourth semiconductor light-emitting device in the fourth housing, the fourth lighting module being pivotally connected at the fourth pivot axis by the fourth pivot joint with the second end of the second connector body and with the second end of the another mounting body.

The following definitions of terms, being stated as applying "throughout this specification", are hereby deemed to be incorporated throughout this specification, including but not limited to the Summary, Brief Description of the Figures, Detailed Description, and Claims.

Throughout this specification, the term "semiconductor" means: a substance, examples including a solid chemical element or compound, that can conduct electricity under some conditions but not others, making the substance a good medium for the control of electrical current.

Throughout this specification, the term "semiconductor light-emitting device" (also being abbreviated as "SLED") means: a light-emitting diode; an organic light-emitting diode; a laser diode; or any other light-emitting device having one or more layers containing inorganic and/or organic semiconductor(s). Throughout this specification, the term "light-emitting diode" (herein also referred to as an "LED") means: a two-lead semiconductor light source having an active pn-junction. As examples, an LED may include a series of semiconductor layers that may be epitaxially grown on a substrate such as, for example, a substrate that includes sapphire, silicon, silicon carbide, gallium nitride or gallium arsenide. Further, for example, one or more semiconductor p-n junctions may be formed in these epitaxial layers. When a sufficient voltage is applied across the p-n junction, for example, electrons in the n-type semiconductor layers and holes in the p-type semiconductor layers may flow toward the p-n junction. As the electrons and holes flow toward each other, some of the electrons may recombine with corresponding holes, and emit photons. The energy release is called electroluminescence, and the color of the light, which corresponds to the energy of the photons, is determined by the energy band gap of the semiconductor. As examples, a spectral power distribution of the light generated by an LED may generally depend on the particular semiconductor materials used and on the structure of the thin epitaxial layers that make up the "active region" of the device, being the area where the light is generated. As examples, an LED may have a light-emissive electroluminescent layer including an inorganic semiconductor, such as a Group III-V semiconductor, examples including: gallium nitride; silicon; silicon carbide; and zinc oxide. Throughout this specification, the term "organic light-emitting diode" (herein also referred to as an "OLED") means: an LED having a light-emissive electroluminescent layer including an organic semiconductor, such as small organic molecules or an organic polymer. It is understood throughout this specification that a semiconductor light-emitting device may include: a non-semiconductor-substrate or a semiconductor-substrate; and may include one or more electrically-conductive contact layers. Further, it is understood throughout this specification that an LED may include a substrate formed of materials such as, for example: silicon carbide; sapphire; gallium nitride; or silicon. It is additionally understood throughout this specification that a semiconductor light-emitting device may have a cathode contact on one side and an anode contact on an opposite side, or may alternatively have both contacts on the same side of the device.

Further background information regarding semiconductor light-emitting devices is provided in the following documents, the entireties of all of which hereby are incorporated by reference herein: U.S. Pat. Nos. 7,564,180; 7,456,499; 7,213,940; 7,095,056; 6,958,497; 6,853,010; 6,791,119; 6,600,175; 6,201,262; 6,187,606; 6,120,600; 5,912,477; 5,739,554; 5,631,190; 5,604,135; 5,523,589; 5,416,342; 5,393,993; 5,359,345; 5,338,944; 5,210,051; 5,027,168; 5,027,168; 4,966,862; and 4,918,497; and U.S. Patent Application Publication Nos. 2014/0225511; 2014/0078715; 2013/0241392; 2009/0184616; 2009/0080185; 2009/0050908; 2009/0050907; 2008/0308825; 2008/0198112; 2008/0179611; 2008/0173884; 2008/0121921; 2008/0012036; 2007/0253209; 2007/0223219; 2007/0170447; 2007/0158668; 2007/0139923; and 2006/0221272.

Throughout this specification, the term "spectral power distribution" means: the emission spectrum of the one or more wavelengths of light emitted by a semiconductor light-emitting device. Throughout this specification, the term "peak wavelength" means: the wavelength where the spectral power distribution of a semiconductor light-emitting device reaches its maximum value as detected by a photo-detector. As an example, an LED may be a source of nearly monochromatic light and may appear to emit light having a single color. Thus, the spectral power distribution of the light emitted by such an LED may be centered about its peak wavelength. As examples, the "width" of the spectral power distribution of an LED may be within a range of between about 10 nanometers and about 30 nanometers, where the width is measured at half the maximum illumination on each side of the emission spectrum. Throughout this specification, the term "full-width-half-maximum" ("FWHM") means: the full width of the spectral power distribution of a semiconductor light-emitting device measured at half the maximum illumination on each side of its emission spectrum. Throughout this specification, the term "half-width-half-maximum" ("HWHM") means: half of the full width of a FWHM. Throughout this specification, the term "dominant wavelength" means: the wavelength of monochromatic light that has the same apparent color as the light emitted by a semiconductor light-emitting device, as perceived by the human eye. As an example, since the human eye perceives yellow and green light better than red and blue light, and because the light emitted by a semiconductor light-emitting device may extend across a range of wavelengths, the color perceived (i.e., the dominant wavelength) may differ from the peak wavelength.

Throughout this specification, the term "luminous flux", also referred to as "luminous power", means: the measure in lumens of the perceived power of light, being adjusted to reflect the varying sensitivity of the human eye to different wavelengths of light. Throughout this specification, the term "radiant flux" means: the measure of the total power of electromagnetic radiation without being so adjusted. Throughout this specification, the term "central light emission axis" means a direction along which the light emissions of a semiconductor light-emitting device have a greatest radiant flux. It is understood throughout this specification that light emissions "along a central light emission axis" means light emissions that: include light emissions in the directions of the central light emission axis; and may further include light emissions in a plurality of other generally similar directions.

It is understood throughout this specification that "directions along a longitudinal axis" means the directions of the longitudinal axis; and may further include a plurality of other generally similar directions. It is understood throughout this specification that "directions spaced apart from directions along a longitudinal axis" means directions being similar to and spaced apart from the directions along the longitudinal axis.

It is understood throughout this specification that light emissions "along the longitudinal axis" means light emissions that: include light emissions in the directions of the longitudinal axis; and may further include light emissions in a plurality of other generally similar directions. It is understood throughout this specification that light emissions "in directions transverse to the longitudinal axis" means light emissions that: include light emissions in the directions being orthogonal to the longitudinal axis; and may further include light emissions in a plurality of other generally similar directions. It is understood throughout this specification that light emissions "in directions spaced apart from directions along the longitudinal axis" means light emissions in directions being similar to and spaced apart from the directions along the longitudinal axis. It is understood throughout this specification that light emissions "in directions spaced apart from directions transverse to the longitudinal axis" means light emissions in directions being similar to and spaced apart from the directions being transverse to the longitudinal axis.

Throughout this specification, the term "luminescent" means: characterized by absorption of electromagnetic radiation (e.g., visible light, UV light or infrared light) causing the emission of light by, as examples: fluorescence; and phosphorescence.

Throughout this specification, the term "object" means a material article or device. Throughout this specification, the term "surface" means an exterior boundary of an object. Throughout this specification, the term "incident visible light" means visible light that propagates in one or more directions towards a surface. Throughout this specification, the term "reflective surface" means a surface of an object that causes incident visible light, upon reaching the surface, to then propagate in one or more different directions away from the surface without passing through the object. Throughout this specification, the term "planar reflective surface" means a generally flat reflective surface.

Throughout this specification, the term "reflectance" means a fraction of a radiant flux of incident visible light having a specified wavelength that is caused by a reflective surface of an object to propagate in one or more different directions away from the surface without passing through the object. Throughout this specification, the term "reflected light" means the incident visible light that is caused by a reflective surface to propagate in one or more different directions away from the surface without passing through the object. Throughout this specification, the term "Lambertian reflectance" means diffuse reflectance of visible light from a surface, in which the reflected light has uniform radiant flux in all of the propagation directions. Throughout this specification, the term "specular reflectance" means mirror-like reflection of visible light from a surface, in which light from a single incident direction is reflected into a single propagation direction. Throughout this specification, the term "spectrum of reflectance values" means a spectrum of values of fractions of radiant flux of incident visible light, the values corresponding to a spectrum of wavelength values of visible light, that are caused by a reflective surface to propagate in one or more different directions away from the surface without passing through the object. Throughout this specification, the term "transmittance" means a fraction of a radiant flux of incident visible light having a specified wavelength that is permitted by a reflective surface to pass through the object having the reflective surface. Throughout this specification, the term "transmitted light" means the incident visible light that is permitted by a reflective surface to pass through the object having the reflective surface. Throughout this specification, the term "spectrum of transmittance values" means a spectrum of values of fractions of radiant flux of incident visible light, the values corresponding to a spectrum of wavelength values of visible light, that are permitted by a reflective surface to pass through the object having the reflective surface. Throughout this specification, the term "absorbance" means a fraction of a radiant flux of incident visible light having a specified wavelength that is permitted by a reflective surface to pass through the reflective surface and is absorbed by the object having the reflective surface. Throughout this specification, the term "spectrum of absorbance values" means a spectrum of values of fractions of radiant flux of incident visible light, the values corresponding to a spectrum of wavelength values of visible light, that are permitted by a reflective surface to pass through the reflective surface and are absorbed by the object having the reflective surface. Throughout this specification, it is understood that a reflective surface, or an object, may have a spectrum of reflectance values, and a spectrum of transmittance values, and a spectrum of absorbance values. The spectra of reflectance values, absorbance values, and transmittance values of a reflective surface or of an object may be measured, for example, utilizing an ultraviolet-visible-near infrared (UV-VIS-NIR) spectrophotometer. Throughout this specification, the term "visible light reflector" means an object having a reflective surface. In examples, a visible light reflector may be selected as having a reflective surface characterized by light reflections that are more Lambertian than specular.

Throughout this specification, the term "lumiphor" means: a medium that includes one or more luminescent materials being positioned to absorb light that is emitted at a first spectral power distribution by a semiconductor light-emitting device, and to re-emit light at a second spectral power distribution in the visible or ultra violet spectrum being different than the first spectral power distribution, regardless of the delay between absorption and re-emission. Lumiphors may be categorized as being down-converting, i.e., a material that converts photons to a lower energy level (longer wavelength); or up-converting, i.e., a material that converts photons to a higher energy level (shorter wavelength). As examples, a luminescent material may include: a phosphor; a quantum dot; a quantum wire; a quantum well; a photonic nanocrystal; a semiconducting nanoparticle; a scintillator; a lumiphoric ink; a lumiphoric organic dye; a day glow tape; a phosphorescent material; or a fluorescent material. Throughout this specification, the term "quantum material" means any luminescent material that includes: a quantum dot; a quantum wire; or a quantum well. Some quantum materials may absorb and emit light at spectral power distributions having narrow wavelength ranges, for example, wavelength ranges having spectral widths being within ranges of between about 25 nanometers and about 50 nanometers. In examples, two or more different quantum materials may be included in a lumiphor, such that each of the quantum materials may have a spectral power distribution for light emissions that may not overlap with a spectral power distribution for light absorption of any of the one or more other quantum materials. In these examples, cross-absorption of light emissions among the quantum materials of the lumiphor may be minimized. As examples, a lumiphor may include one or more layers or bodies that may contain one or more luminescent materials that each may be: (1) coated or sprayed directly onto an semiconductor light-emitting device; (2) coated or sprayed onto surfaces of a lens or other elements of packaging for an semiconductor light-emitting device; (3) dispersed in a matrix medium; or (4) included within a clear encapsulant (e.g., an epoxy-based or silicone-based curable resin or glass or ceramic) that may be positioned on or over an semiconductor light-emitting device. A lumiphor may include one or multiple types of luminescent materials. Other materials may also be included with a lumiphor such as, for example, fillers, diffusants, colorants, or other materials that may as examples improve the performance of or reduce the overall cost of the lumiphor. In examples where multiple types of luminescent materials may be included in a lumiphor, such materials may, as examples, be mixed together in a single layer or deposited sequentially in successive layers.

Throughout this specification, the term "volumetric lumiphor" means a lumiphor being distributed in an object having a shape including defined exterior surfaces. In some examples, a volumetric lumiphor may be formed by dispersing a lumiphor in a volume of a matrix medium having suitable spectra of visible light transmittance values and visible light absorbance values. As examples, such spectra may be affected by a thickness of the volume of the matrix medium, and by a concentration of the lumiphor being distributed in the volume of the matrix medium. In examples, the matrix medium may have a composition that includes polymers or oligomers of: a polycarbonate; a silicone; an acrylic; a glass; a polystyrene; or a polyester such as polyethylene terephthalate. Throughout this specification, the term "remotely-located lumiphor" means a lumiphor being spaced apart at a distance from and positioned to receive light that is emitted by a semiconductor light-emitting device.

Throughout this specification, the term "light-scattering particles" means small particles formed of a non-luminescent, non-wavelength-converting material. In some examples, a volumetric lumiphor may include light-scattering particles being dispersed in the volume of the matrix medium for causing some of the light emissions having the first spectral power distribution to be scattered within the volumetric lumiphor. As an example, causing some of the light emissions to be so scattered within the matrix medium may cause the luminescent materials in the volumetric lumiphor to absorb more of the light emissions having the first spectral power distribution. In examples, the light-scattering particles may include: rutile titanium dioxide; anatase titanium dioxide; barium sulfate; diamond; alumina; magnesium oxide; calcium titanate; barium titanate; strontium titanate; or barium strontium titanate. In examples, light-scattering particles may have particle sizes being within a range of about 0.01 micron (10 nanometers) and about 2.0 microns (2,000 nanometers).

In some examples, a visible light reflector may be formed by dispersing light-scattering particles having a first index of refraction in a volume of a matrix medium having a second index of refraction being suitably different from the first index of refraction for causing the volume of the matrix medium with the dispersed light-scattering particles to have suitable spectra of reflectance values, transmittance values, and absorbance values for functioning as a visible light reflector. As examples, such spectra may be affected by a thickness of the volume of the matrix medium, and by a concentration of the light-scattering particles being distributed in the volume of the matrix medium, and by physical characteristics of the light-scattering particles such as the particle sizes and shapes, and smoothness or roughness of exterior surfaces of the particles. In an example, the smaller the difference between the first and second indices of refraction, the more light-scattering particles may need to be dispersed in the volume of the matrix medium to achieve a given amount of light-scattering. As examples, the matrix medium for forming a visible light reflector may have a composition that includes polymers or oligomers of: a polycarbonate; a silicone; an acrylic; a glass; a polystyrene; or a polyester such as polyethylene terephthalate. In further examples, the light-scattering particles may include: rutile titanium dioxide; anatase titanium dioxide; barium sulfate; diamond; alumina; magnesium oxide; calcium titanate; barium titanate; strontium titanate; or barium strontium titanate. In other examples, a visible light reflector may include a reflective polymeric or metallized surface formed on a visible light-transmissive polymeric or metallic object such as, for example, a volume of a matrix medium. Additional examples of visible light reflectors may include microcellular foamed polyethylene terephthalate sheets ("MCPET"). Suitable visible light reflectors may be commercially available under the trade names White Optics® and MIRO® from WhiteOptics LLC, 243-G Quigley Blvd., New Castle, Del. 19720 USA. Suitable MCPET visible light reflectors may be commercially available from the Furukawa Electric Co., Ltd., Foamed Products Division, Tokyo, Japan. Additional suitable visible light reflectors may be commercially available from CVI Laser Optics, 200 Dorado Place SE, Albuquerque, N. Mex. 87123 USA.

In some examples, a converging or diverging lens may be formed as a volume of a matrix medium having a suitable shape for functioning as a lens. In further examples, forming a diverging lens may include dispersing light-scattering particles having a first index of refraction in a volume of a matrix medium having a second index of refraction being suitably different from the first index of refraction for causing the volume of the matrix medium with the dispersed light-scattering particles to have suitable light-scattering value for functioning as a diverging lens. As examples, the matrix medium for forming a lens may have a composition that includes polymers or oligomers of: a polycarbonate; a silicone; an acrylic; a glass; a polystyrene; or a polyester such as polyethylene terephthalate. In further examples, the light-scattering particles may include: rutile titanium dioxide; anatase titanium dioxide; barium sulfate; diamond; alumina; magnesium oxide; calcium titanate; barium titanate; strontium titanate; or barium strontium titanate.

In further examples, a volumetric lumiphor and a visible light reflector may be integrally formed. As examples, a volumetric lumiphor and a visible light reflector may be integrally formed in respective layers of a volume of a matrix medium, including a layer of the matrix medium having a dispersed lumiphor, and including another layer of the same or a different matrix medium having light-scattering particles being suitably dispersed for causing the another layer to have suitable spectra of reflectance values, transmittance values, and absorbance values for functioning as the visible light reflector. In other examples, an integrally-formed volumetric lumiphor and visible light reflector may incorporate any of the further examples of variations discussed above as to separately-formed volumetric lumiphors and visible light reflectors.

Throughout this specification, the term "phosphor" means: a material that exhibits luminescence when struck by photons. Examples of phosphors that may be utilized include: $CaAlSiN_3$:Eu, $SrAlSiN_3$:Eu, $CaAlSiN_3$:Eu, $Ba_3Si_6O_{12}N_2$:Eu, $Ba_2SiO_4$:Eu, $Sr_2SiO_4$:Eu, $Ca_2SiO_4$:Eu, $Ca_3Sc_2Si_3O_{12}$:Ce, $Ca_3Mg_2Si_3O_{12}$:Ce, $CaSc_2O_4$:Ce, $CaSi_2O_2N_2$:Eu, $SrSi_2O_2N_2$:Eu, $BaSi_2O_2N_2$:Eu, $Ca_5(PO_4)_3Cl$:Eu, $Ba_5(PO_4)_3Cl$:Eu, $Cs_2CaP_2O_7$, $Cs_2SrP_2O_7$, $SrGa_2S_4$:Eu, $Lu_3Al_5O_{12}$:Ce, $Ca_8Mg(SiO_4)_4Cl_2$:Eu, $Sr_8Mg(SiO_4)_4Cl_2$:Eu, $La_3Si_6N_{11}$:Ce, $Y_3Al_5O_{12}$:Ce, $Y_3Ga_5O_{12}$:Ce, $Gd_3Al_5O_{12}$:Ce, $Gd_3Ga_5O_{12}$:Ce, $Tb_3Al_5O_{12}$:Ce, $Tb_3Ga_5O_{12}$:Ce, $Lu_3Ga_5O_{12}$:Ce, (SrCa)$AlSiN_3$:Eu, LuAG:Ce, $(Y,Gd)_2Al_5)_{12}$:Ce, CaS:Eu, SrS:Eu, $SrGa_2S_4$:$E_4$, $Ca_2(Sc,Mg)_2SiO_{12}$:Ce, $Ca_2Sc_2Si_2)_{12}$:C2, $Ca_2Sc_2O_4$:Ce, $Ba_2Si_6O_{12}N_2$:Eu, (Sr,Ca)$AlSiN_2$:Eu, and $CaAlSiN_2$:Eu.

Throughout this specification, the term "quantum dot" means: a nanocrystal made of semiconductor materials that are small enough to exhibit quantum mechanical properties, such that its excitons are confined in all three spatial dimensions.

Throughout this specification, the term "quantum wire" means: an electrically conducting wire in which quantum effects influence the transport properties.

Throughout this specification, the term "quantum well" means: a thin layer that can confine (quasi-)particles (typically electrons or holes) in the dimension perpendicular to the layer surface, whereas the movement in the other dimensions is not restricted.

Throughout this specification, the term "photonic nanocrystal" means: a periodic optical nanostructure that affects the motion of photons, for one, two, or three dimensions, in much the same way that ionic lattices affect electrons in solids.

Throughout this specification, the term "semiconducting nanoparticle" means: a particle having a dimension within a range of between about 1 nanometer and about 100 nanometers, being formed of a semiconductor.

Throughout this specification, the term "scintillator" means: a material that fluoresces when struck by photons.

Throughout this specification, the term "lumiphoric ink" means: a liquid composition containing a luminescent material. For example, a lumiphoric ink composition may contain semiconductor nanoparticles. Examples of lumiphoric ink compositions that may be utilized are disclosed in Cao et al., U.S. Patent Application Publication No. 20130221489 published on Aug. 29, 2013, the entirety of which hereby is incorporated herein by reference.

Throughout this specification, the term "lumiphoric organic dye" means an organic dye having luminescent up-converting or down-converting activity. As an example, some perylene-based dyes may be suitable.

Throughout this specification, the term "day glow tape" means: a tape material containing a luminescent material.

Throughout this specification, the term "visible light" means light having one or more wavelengths being within a range of between about 380 nanometers and about 670 nanometers; and "visible light spectrum" means the range of wavelengths of between about 380 nanometers and about 670 nanometers.

Throughout this specification, the term "white light" means: light having a color point located at a delta(uv) of about equal to or less than 0.006 and having a CCT being within a range of between about 10000K and about 1800K (herein referred to as a "white color point."). Many different hues of light may be perceived as being "white." For example, some "white" light, such as light generated by a tungsten filament incandescent lighting device, may appear yellowish in color, while other "white" light, such as light generated by some fluorescent lighting devices, may appear more bluish in color. As examples, white light having a CCT of about 3000K may appear yellowish in color, while white light having a CCT of about equal to or greater than 8000K may appear more bluish in color and may be referred to as "cool" white light. Further, white light having a CCT of between about 2500K and about 4500K may appear reddish or yellowish in color and may be referred to as "warm" white light. "White light" includes light having a spectral power distribution of wavelengths including red, green and blue color points. In an example, a CCT of a lumiphor may be tuned by selecting one or more particular luminescent materials to be included in the lumiphor. For example, light emissions from a semiconductor light-emitting device that includes three separate emitters respectively having red, green and blue color points with an appropriate spectral power distribution may have a white color point. As another example, light perceived as being "white" may be produced by mixing light emissions from a semiconductor light-emitting device having a blue, greenish-blue or purplish-blue color point together with light emissions having a yellow color point being produced by passing some of the light emissions having the blue, greenish-blue or purplish-blue color point through a lumiphor to down-convert them into light emissions having the yellow color point. General background information on systems, devices and processes for generating light perceived as being "white" is provided in "Class A Color Designation for Light Sources Used in General Illumination", Freyssinier and Rea, *J. Light & Vis. Env.*, Vol. 37, No. 2 & 3 (Nov. 7, 2013, Illuminating Engineering Institute of Japan), pp. 10-14; the entirety of which hereby is incorporated herein by reference.

Throughout this specification, the term "in contact with" means: that a first object, being "in contact with" a second object, is in either direct or indirect contact with the second object. Throughout this specification, the term "in indirect contact with" means: that the first object is not in direct contact with the second object, but instead that there are a plurality of objects (including the first and second objects), and each of the plurality of objects is in direct contact with at least one other of the plurality of objects (e.g., the first and second objects are in a stack and are separated by one or more intervening layers). Throughout this specification, the term "in direct contact with" means: that the first object, which is "in direct contact" with a second object, is touching the second object and there are no intervening objects between at least portions of both the first and second objects.

Throughout this specification, the term "spectrophotometer" means: an apparatus that can measure a light beam's intensity as a function of its wavelength and calculate its total luminous flux.

Throughout this specification, the term "integrating sphere-spectrophotometer" means: a spectrophotometer operationally connected with an integrating sphere. An integrating sphere (also known as an Ulbricht sphere) is an optical component having a hollow spherical cavity with its interior covered with a diffuse white reflective coating, with small holes for entrance and exit ports. Its relevant property is a uniform scattering or diffusing effect. Light rays incident on any point on the inner surface are, by multiple scattering reflections, distributed equally to all other points. The effects of the original direction of light are minimized. An integrating sphere may be thought of as a diffuser which preserves power but destroys spatial information. Another type of integrating sphere that can be utilized is referred to as a focusing or Coblentz sphere. A Coblentz sphere has a mirror-like (specular) inner surface rather than a diffuse inner surface. Light scattered by the interior of an integrating sphere is evenly distributed over all angles. The total power (radiant flux) of a light source can then be measured without inaccuracy caused by the directional characteristics of the source. Background information on integrating sphere-spectrophotometer apparatus is provided in Liu et al., U.S. Pat. No. 7,532,324 issued on May 12, 2009, the entirety of which hereby is incorporated herein by reference. It is understood throughout this specification that color points may be measured, for example, by utilizing a spectrophotometer, such as an integrating sphere-spectrophotometer. The spectra of reflectance values, absorbance values, and transmittance values of a reflective surface or of an object may be measured, for example, utilizing an ultraviolet-visible-near infrared (UV-VIS-NIR) spectrophotometer.

Throughout this specification, the term "lenticular features" means: an array of semicircular convex lenses ("lenticles") on a surface, being arranged as a sinusoidal series of mutually parallel ridges between troughs, forming a series of "lenticular toroidal lenses." Background information on lenticular toroidal lenses and lenticular features is provided in Seo U.S. Pat. No. 8,503,083 issued on Aug. 6, 2013, the entirety of which hereby is incorporated herein by reference.

Throughout this specification, the term "microprismatic features" means an array of small, equally-spaced multi-faceted prisms being arranged in a regular array forming a "microprismatic lens" on a surface. Background information on microprismatic lenses is provided in Pakhchyan U.S. Patent Application Publication No. 2011/0292483A1 published on Dec. 1, 2011, the entirety of which hereby is incorporated herein by reference.

Throughout this specification, the term "upward direction" means a direction illustrated as being upward, as indicated by an arrow shown in a Figure herein, being upward relative to an object shown in the Figure. Throughout this specification, the term "downward direction" means a direction illustrated as being downward, as indicated by an arrow shown in a Figure herein, being downward relative to an object shown in the Figure. It is understood that the terms "upward direction" and "downward direction" are relative terms defined by the corresponding arrows illustrated in the Figures as indicating such directions; and that the lighting systems illustrated in the Figures may be oriented in other directions.

Throughout this specification, the term "aperture" means an opening in a surface of an object, which forms a cavity in the object, and which may also form a passageway through the object communicating with the opening and with another opening in another surface of the object.

Throughout this specification, the term "ring" means a raised loop on the surface of an object. Throughout this specification, a ring being "configured for being engaged with" another ring means that the ring is shaped to fit together with the another ring, so that the rings may be rotated relative to each other. As an example, the ring may have a surface that is shaped to fit together with another surface of the another ring. In further examples, the ring may have a raised rim with a rim surface being shaped to fit together with another surface that is inside the another ring.

It is understood throughout this specification that numbering of the names of elements as being "first", "second" etcetera, is solely for purposes of clarity in referring to such elements in connection with various examples of lighting systems. It is understood throughout this specification that an example [100] of a lighting system may include any combination of the features discussed in connection with the examples [100] of a lighting system.

Figure 2:
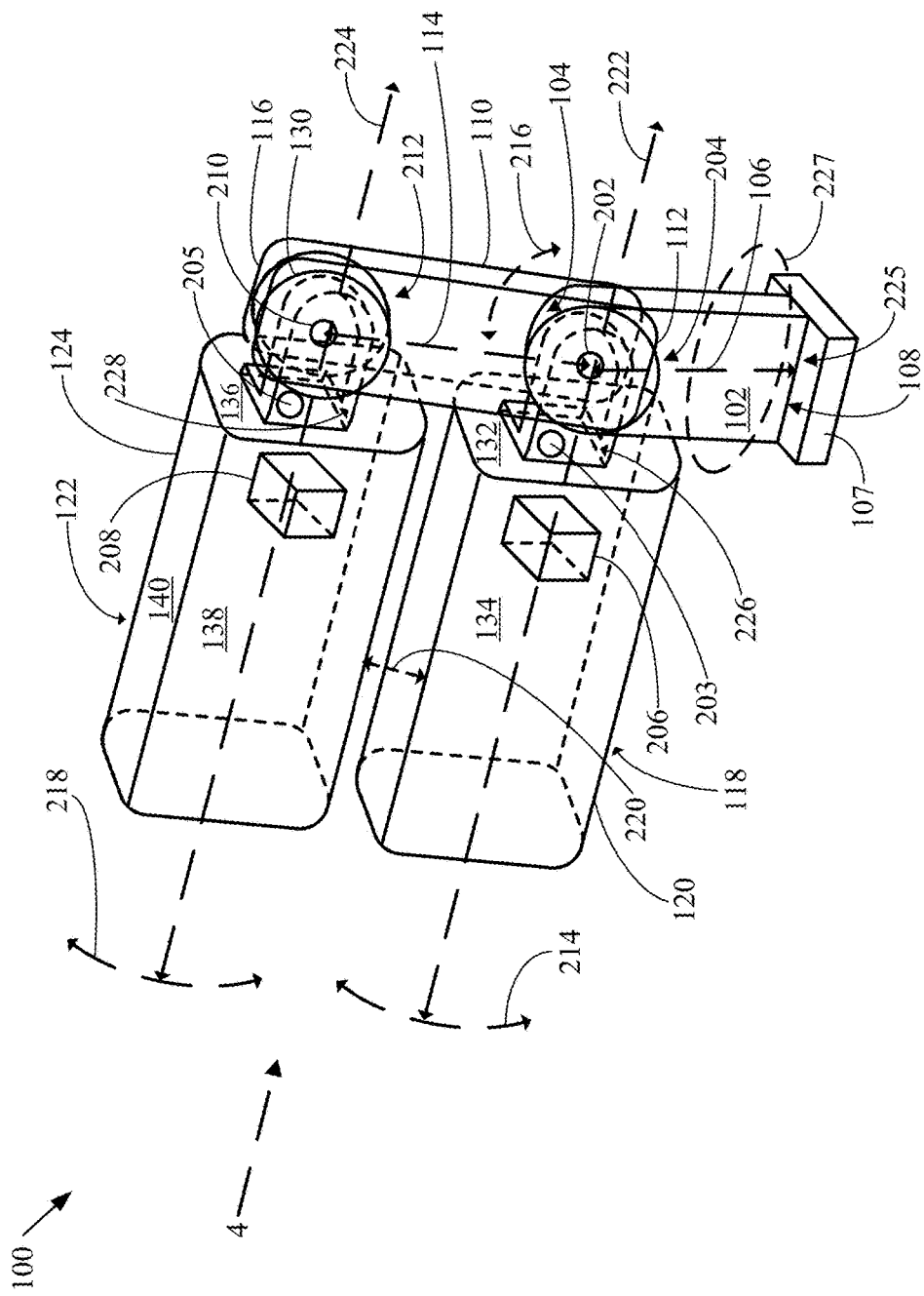
FIG. 2 is a perspective side view taken along the line [2], showing the example [100] of the lighting system.
Figure 3:
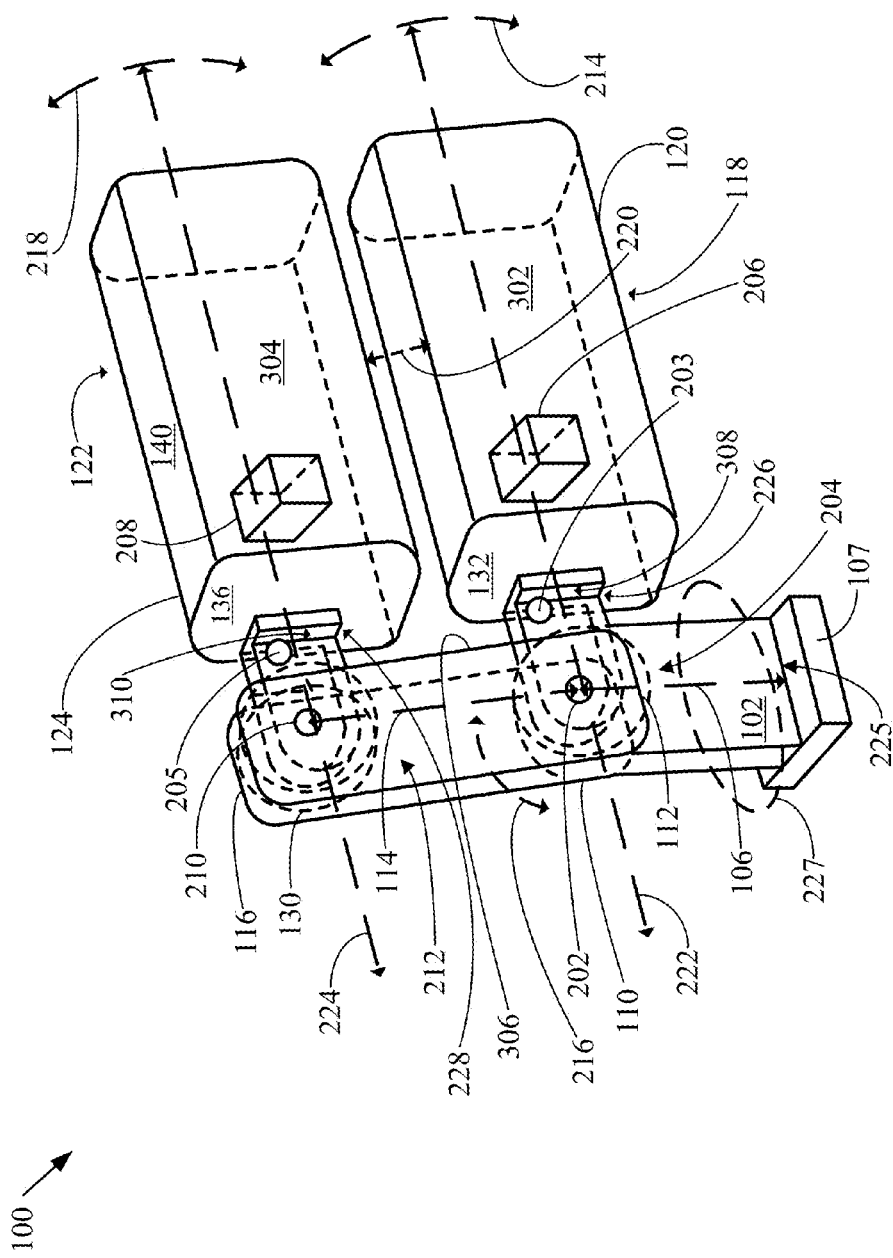
FIG. 3 is a perspective side view taken along the line [3], showing the example [100] of the lighting system.
Figure 4:
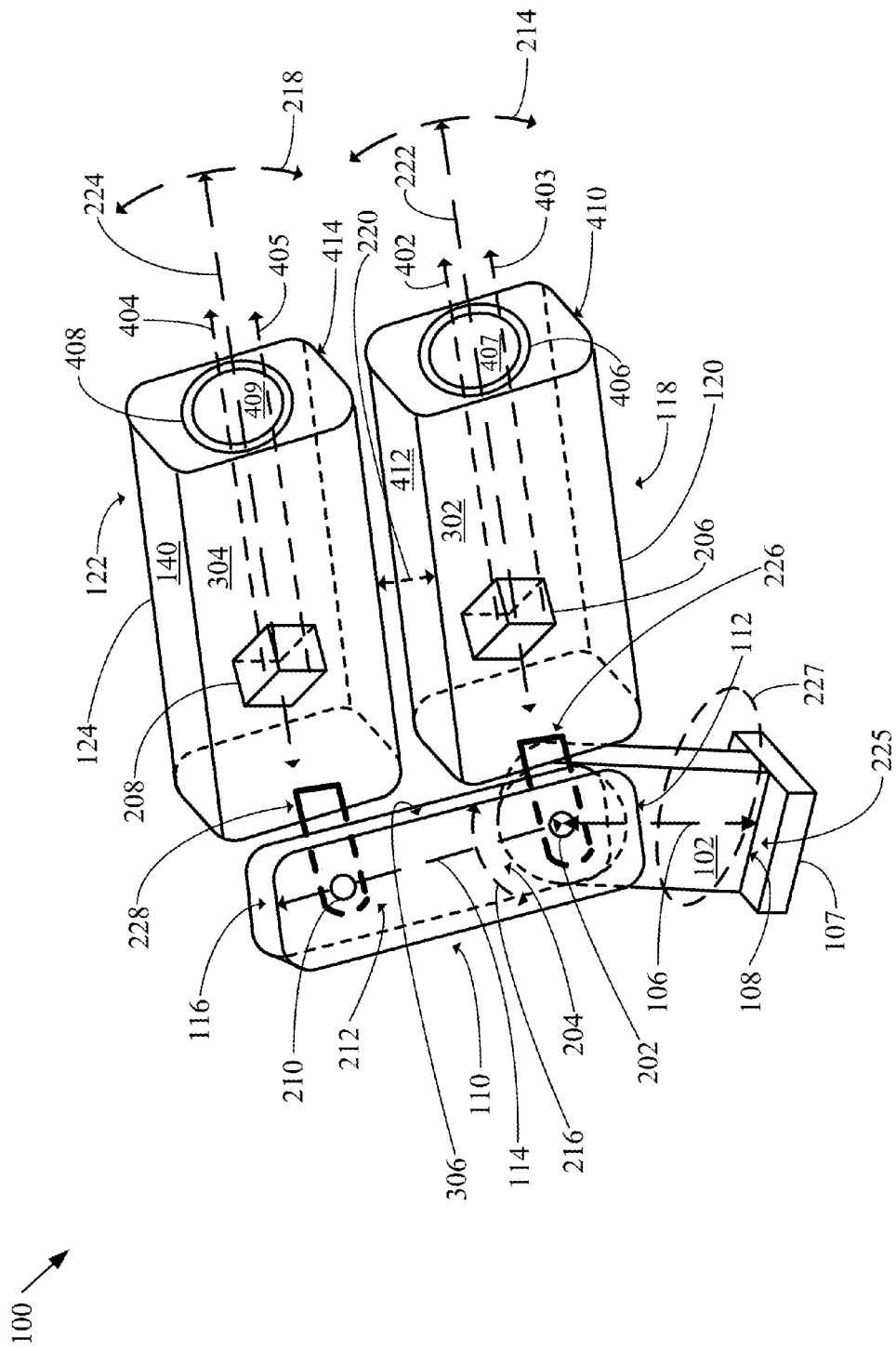
FIG. 4 is a perspective front view taken along the line [4], showing the example [100] of the lighting system.
Figure 5:
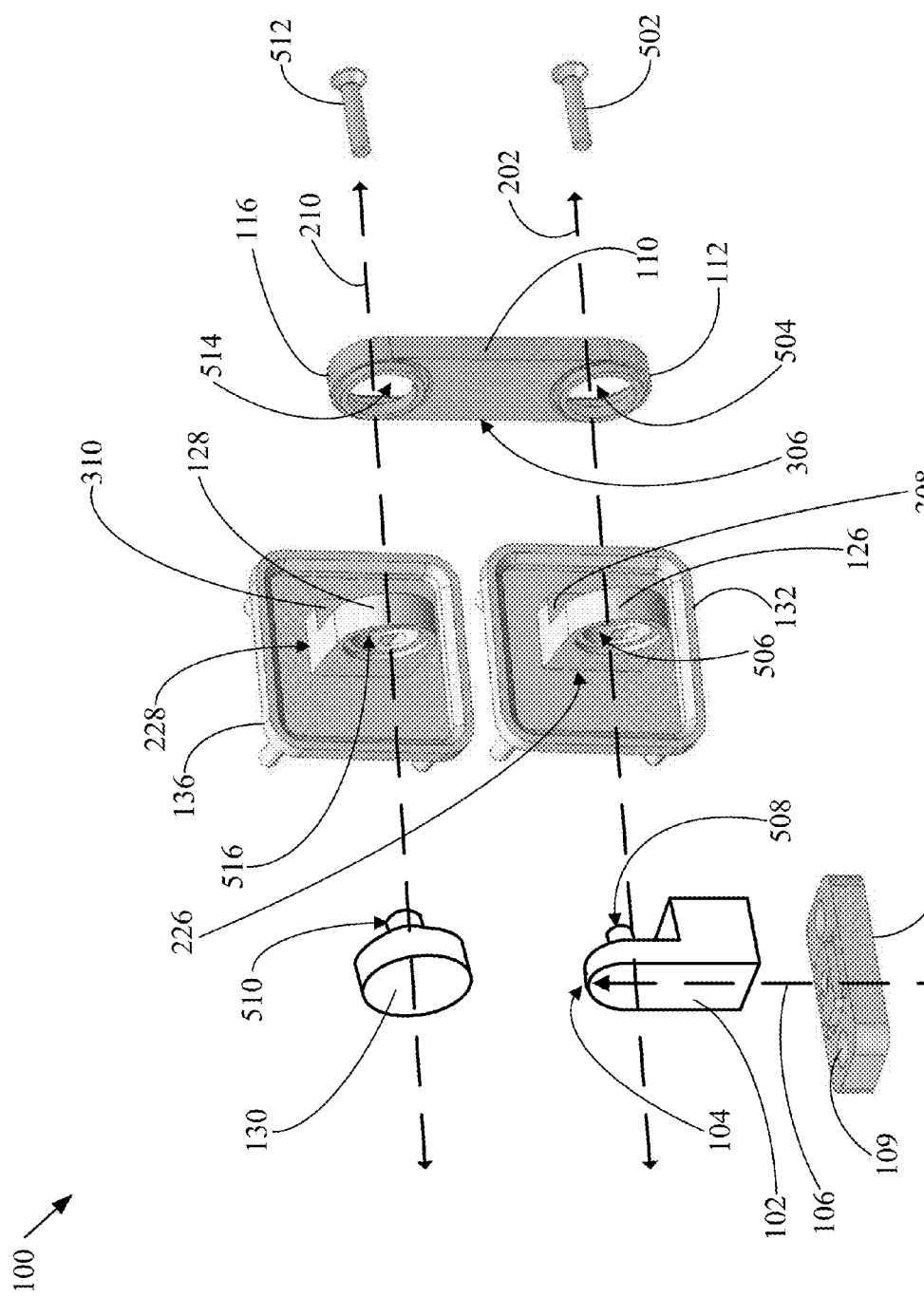
FIG. 5 is an exploded view taken along the line [5], showing portions of the example [100] of the lighting system.

FIG. 1 is a perspective back side view showing an example [100] of an implementation of a lighting system. FIG. 2 is a perspective side view taken along the line [2], showing the example [100] of the lighting system. FIG. 3 is a perspective side view taken along the line [3], showing the example [100] of the lighting system. FIG. 4 is a perspective front view taken along the line [4], showing the example [100] of the lighting system. FIG. 5 is an exploded view taken along the line [5], showing portions of the example [100] of the lighting system. It is understood throughout this specification that an example [100] of a lighting system may include any combination of the features that are discussed herein in connection with the examples [100], [600], [1100] of lighting systems and in connection with the example [1800] of a mini-mounting arm assembly. Accordingly, the entireties of the discussions herein of the other examples [600], [1100] of lighting systems and of the example [1800] of a mini-mounting arm assembly are hereby incorporated in this discussion of the examples [100] of the lighting systems. As shown in FIGS. 1, 2, 3, 4 and 5, the example [100] of the implementation of the lighting system includes a mounting post [102] having a first end [104] being spaced apart along a longitudinal axis being represented by an arrow [106] from a second end [108]. Further, the example [100] of the implementation of the lighting system includes a mounting body [110] having a first end [112] being spaced apart along another longitudinal axis represented by an arrow [114] from a second end [116], the first end [112] of the mounting body [110] being pivotally connected at a first pivot axis [202] by a first pivot joint [204] with the first end [104] of the mounting post [102]. The example [100] of the implementation of the lighting system also includes a first lighting module [118] including a first housing [120] and having a first semiconductor light-emitting device [206] in the first housing [120], the first lighting module [118] being pivotally connected at the first pivot axis [202] by the first pivot joint [204] with the first end [112] of the mounting body [110] and with the first end [104] of the mounting post [102]. In addition, the example [100] of the implementation of the lighting system includes a second lighting module [122] including a second housing [124] and having a second semiconductor light-emitting device [208] in the second housing [124], the second lighting module [122] being pivotally connected at a second pivot axis [210] by a second pivot joint [212] with the second end [116] of the mounting body [110].

In examples of the example [100] of the implementation of the lighting system, the first pivot joint [204] may be configured for permitting a range of pivotal movement, as represented by an arrow [214], by the first housing [120] around the first pivot axis [202]. As further examples of the example [100] of the implementation of the lighting system, the first pivot joint [204] may be configured for permitting another range of pivotal movement, as represented by an arrow [216], by the mounting body [110] around the first pivot axis [202]. Additionally, as examples of the example [100] of the implementation of the lighting system, the second pivot joint [212] may be configured for permitting a further range of pivotal movement, as represented by an arrow [218], by the second housing [124] around the second pivot axis [210].

In some examples of the example [100] of the implementation of the lighting system, the first pivot joint [204] and the second pivot joint [212] may be configured for cooperatively preventing the first housing [120] from being in direct contact with the second housing [124]. Further, for example, the first pivot joint [204] and the second pivot joint [212] in the example [100] of the implementation of the lighting system may be configured for causing the another range [216] of pivotal movement and the further range [218] of pivotal movement to cooperatively prevent the first housing [120] from being in direct contact with the second housing [124]. As examples [100] of the implementation of the lighting system, the first pivot joint [204] and the second pivot joint [212] may be configured for cooperatively maintaining the first housing [120] as being at least a selected minimum distance, represented by an arrow [220], away from the second housing [124]. For example, the first pivot joint [204] and the second pivot joint [212] may be configured for cooperatively maintaining the first housing [120] as being at least a selected minimum distance [220] of about one millimeter away from the second housing [124].

In the example [100] of the implementation of the lighting system, the first lighting module [118] may be configured for emitting light emissions [402], [403] along a first central light emission axis [222] intersecting the first pivot axis [202]. Further in the example [100] of the implementation of the lighting system, the second lighting module [122] may be configured for emitting further light emissions [404], [405] along a second central light emission axis [224] intersecting the second pivot axis [210]. As examples of the example [100] of the lighting system, the range [214] of pivotal movement, and the another range [216] of pivotal movement, and the further range [218] of pivotal movement may be collectively configured for permitting an alignment of the first central light emission axis [222] of the first lighting module [118] as being parallel with the second central light emission axis [224] of the second lighting module [122].

In some examples of the example [100] of the lighting system, the first pivot joint [204] may be configured for facilitating a locking of the first central light emission axis [222] of the first lighting module [118] in a fixed position relative to the second central light emission axis [224] of the second lighting module [122]. As additional examples of the example [100] of the lighting system, the first pivot joint [204] may be configured for facilitating a locking of the another longitudinal axis [114] of the mounting body [110] as being in a fixed position relative to the first central light emission axis [222] of the first lighting module [118]. In further examples of the example [100] of the lighting system, the second pivot joint [212] may be configured for facilitating another locking of the another longitudinal axis [114] of the mounting body [110] as being in another fixed position relative to the second central light emission axis [224] of the second lighting module [122]. In examples of the example [100] of the lighting system, the first pivot joint [204] may be configured for permitting the range [214] of pivotal movement by the first housing [120] around the first pivot axis [202] while the another longitudinal axis [114] of the mounting body [110] is locked in the fixed position relative to the first central light emission axis [222] and is locked in the another fixed position relative to the second central light emission axis [224]. In some examples, the example [100] of the lighting system may include a set screw or locking bolt [203] passing through a first mounting arm [226] to the mounting body [110], or passing through the mounting body [110] to the first mounting arm [226], for locking them into a fixed relative position. In further examples, the example [100] of the lighting system may include a set screw or locking bolt [205] passing through a second mounting arm [228] to the mounting body [110], or passing through the mounting body [110] to the second mounting arm [228], for locking them into a fixed relative position.

In further examples, the example [100] of the lighting system may include a mounting bracket plate [107] being attached to the mounting post [102]. As an example of the example [100] of the lighting system, the mounting bracket plate [107] may include one or more apertures [107] configured for receiving a mounting fastener [111]. As additional examples of the example [100] of the lighting system, the mounting bracket plate [107] may be attached by a swivel joint [225] to the mounting post [102], and the swivel joint [225] may be configured for facilitating rotation of the mounting post [102] around the longitudinal axis [106] on a swivel path represented by a dashed loop [227]. In some examples of the example [100] of the lighting system, the mounting post [102] may be configured for being locked at a selected position along the swivel path [227].

As additional examples, the example [100] of the lighting system may include the first mounting arm [226] as being attached to the first housing [120] and forming a part of the first pivot joint [204]. In further examples, the example [100] of the lighting system may include the second mounting arm [228] as being attached to the second housing [124] and forming a part of the second pivot joint [212]. In some examples of the example [100] of the lighting system, the first mounting arm [226] may form a part of the first housing [120], and the second mounting arm [228] may form a part of the second housing [124]. Further, for example, the first mounting arm [226] of the example [100] of the lighting system may be aligned between the first semiconductor light-emitting device [206] and the first pivot axis [202], and the second mounting arm [228] may be aligned between the second semiconductor light-emitting device [208] and the second pivot axis [210]. As further examples of the example [100] of the lighting system, the first mounting arm [226] may be configured for permitting the range [214] of pivotal movement by the first housing [120] around the first pivot axis [202] and for permitting the another range [216] of pivotal movement by the mounting body [110] around the first pivot axis [202]; and the second mounting arm [228] may be configured for permitting the further range [218] of pivotal movement by the second housing [124] around the second pivot axis [210]. In further examples of the example [100] of the lighting system, the first mounting arm [226]

may have an end [126] intersecting with the first pivot axis [202], and the second mounting arm [228] may have another end [128] intersecting with the second pivot axis [210].

In some examples of the example [100] of the lighting system, the first pivot joint [204] may further include a bolt [502], and the bolt [502] may pass, along the first pivot axis [202], through the first end [112] of the mounting body [110], and through the end [126] of the first mounting arm [226], and through the first end [104] of the mounting post [102]. In some examples of the example [100] of the lighting system, the first end [112] of the mounting body [110] may have an aperture [504] and the end [126] of the first mounting arm [226] may have another aperture [506], and the first pivot axis [202] may pass through the aperture [504] and through the another aperture [506], and the first end [104] of the mounting post [102] may have a further aperture [508] configured for receiving the bolt [502] being threaded (not shown) and forming a part of the first pivot joint [204], the bolt [502] passing through the aperture [504] and through the another aperture [506] and into the further aperture [508] at the first end [104] of the mounting post [102]. As an example [100] of the lighting system, the further aperture [508] may include a threaded (not shown) receptacle. In further examples of the example [100] of the lighting system, the first end [104] of the mounting post [102] may have the further aperture [508] and the end [126] of the first mounting arm [226] may have the another aperture [506], and the first pivot axis [202] may pass through the aperture [508] and through the another aperture [506], and the first end [112] of the mounting body [110] may have the aperture [504] as including a threaded (not shown) receptacle configured for receiving the threaded (not shown) bolt [502] forming a part of the first pivot joint [204] and passing through the aperture [508] and through the another aperture [506] into the threaded (not shown) receptacle [504]. In additional examples of the example [100] of the lighting system, the first end [104] of the mounting post [102] may have the aperture [508] and the first end [112] of the mounting body [110] may have the another aperture [504], and the first pivot axis [202] may pass through the aperture [508] and through the another aperture [504], and the end [126] of the first mounting arm [226] may have the threaded (not shown) receptacle [506] configured for receiving the threaded (not shown) bolt [502] forming a part of the first pivot joint [204] and passing through the aperture [508] and through the another aperture [504] into the threaded (not shown) receptacle [506].

In additional examples of the example [100] of the lighting system, the second pivot joint [212] may further include a bolt [512], and the bolt [512] may pass, along the second pivot axis [210], through the second end [116] of the mounting body [110] and through the another end [128] of the second mounting arm [228]. In some examples of the example [100] of the lighting system, the second end [116] of the mounting body [110] may have an aperture [514] and the another end [128] of the second mounting arm [228] may have another aperture [516] and the second pivot axis [210] may pass through the aperture [514] and through the another aperture [516], and the second pivot joint [212] may further include the threaded (not shown) bolt [512] passing through the aperture [514] and through the another aperture [516] and being configured for securing together the mounting body [110] with the second mounting arm [228]. As other examples of the example [100] of the lighting system, the another end [128] of the second mounting arm [228] may have the aperture [516], and the second end [116] of the mounting body [110] may have the aperture [514] as including a threaded (not shown) receptacle configured for receiving the threaded (not shown) bolt [512], and the second pivot joint [212] may further include the threaded (not shown) bolt [512] passing through the aperture [516] into the threaded (not shown) receptacle [514]. In further examples of the example [100] of the lighting system, the second end [116] of the mounting body [110] may have the aperture [514], and the another end [128] of the second mounting arm [228] may have the threaded (not shown) receptacle [516] configured for receiving the threaded (not shown) bolt [512], and the second pivot joint [212] may further include the threaded (not shown) bolt [512] passing through the aperture [514] into the threaded (not shown) receptacle [516]. Further, for example, the example [100] of the lighting system may include an end cap [130] having a threaded (not shown) receptacle [510], and the end cap [130] may be configured for receiving the threaded (not shown) bolt [512] as passing through the aperture [514] and through the another aperture [516] into the threaded (not shown) receptacle [510]. In an example [100] of the lighting system, the end cap [130] may have a raised surface (not shown) for manually gripping the end cap [130] in order to rotate the second lighting module [122] around the second pivot axis [210]. In an example [100] of the lighting system, the another end [128] of the second mounting arm [228] may have a raised surface (not shown) for manually gripping the another end [128] in order to rotate the second lighting module [122] around the second pivot axis [210].

In some examples of the example [100] of the lighting system, the first housing [120] may include a first light emission aperture [406], and the first housing [120] may include a first back plate [132] being spaced apart by a first side wall [134] along the first central light emission axis [222]. As additional examples of the example [100] of the lighting system, the second housing [124] may include a second light emission aperture [408], and the second housing [124] may include a second back plate [136] being spaced apart by a second side wall [138] along the second central light emission axis [224]. As further examples, the first housing [120] may include a lens [407]; and the second housing [124] may include a lens [409]. In examples of the example [100] of the implementation of the lighting system, configuring the first lighting module [118] for emitting the light emissions [402], [403] along the first central light emission axis [222] and configuring the second lighting module [122] for emitting the further light emissions [404], [405] along the second central light emission axis [224] may include fixing the lenses [407], [409] at selected orientations within the first and second housings [120], [124]. Additionally, for example, each of the housings [120], [124] may include further optical components (not shown), such as a lens carrier and a primary reflector. In addition, for example, the lens [407] may be a tertiary lens; and the first housing [120] may include a secondary lens (not shown) being located between the first semiconductor light-emitting device [206] and the lens [407]. Further, for example, the lens [409] may be a tertiary lens; and the second housing [124] may include another secondary lens (not shown) being located between the second semiconductor light-emitting device [208] and the lens [409]. As further examples, the first housing [120] may include an oriented lens [407] or an oriented secondary lens (not shown); and the second housing [124] may include an oriented lens [409] or an oriented another secondary lens (not shown). In examples, an oriented lens [407], [409] or such an oriented secondary lens or oriented another secondary lens (not shown) may be configured for emission of light [402], [403], [404], [405]

having a non-uniform intensity distribution around the central light emission axes [222], [224]. In examples, an oriented lens [407], [409] or such an oriented secondary lens or oriented another secondary lens (not shown) may be configured for emission of light [402], [403], [404], [405] having a non-uniform intensity distribution as intentionally being asymmetrically oriented around the central light emission axes [222], [224]. Further, for example, an oriented lens [407] or secondary lens (not shown) of the first housing [120] may be configured for emission of light [402], [403] having a non-uniform intensity distribution being asymmetrically oriented around the central light emission axis [222], in a selected manner, relative to another non-uniform intensity distribution being asymmetrically oriented around the central light emission axis [224] for emission of light [404], [405] by the oriented lens [409] or another secondary lens (not shown). In some examples, the example [100] of the lighting system may cause such intentionally asymmetric orientations of the light emission distributions around the central light emission axes [222], [224] to be established by the positioning of the lenses [407], [409] and such secondary lenses (not shown) around the respective central light emission axes [222], [224] in the first and second housings [120], [124]. In further examples, the example [100] of the lighting system may cause such intentionally asymmetric orientations of the light emission distributions around the central light emission axes [222], [224] to be maintained by attachment of the mounting bracket plate [107] by the mounting fastener [109] to a working surface (not shown), examples of working surfaces including a surface of: a wall, a ceiling, a floor, or a table.

In some examples [100] of the lighting system, the first side wall [134] may have a shape, and the shape of the first side wall [134] may include: a cylindrical shape; a spherical shape; a bullet shape; a frusto-conical shape; or an ellipsoid shape. In additional examples [100] of the lighting system, the second side wall [138] may have a shape, and the shape of the second side wall [138] may include: a cylindrical shape; a spherical shape; a bullet shape; a frusto-conical shape; or an ellipsoid shape. As further examples [100] of the lighting system, the first housing [120] may include additional side walls [302], [410], [412], and the first side wall [134] together with the additional side walls [302], [410], [412] may collectively form a first housing [120] shape, and the first housing [120] shape may include a polyhedron. As examples [100] of the lighting system, the polyhedron shape of the first housing [120] may include a cube or a prism; and in some examples, the prism may include: a rectangular prism; a pentagonal prism; or a hexagonal prism. In additional examples [100] of the lighting system, the second housing [124] may include further side walls [140], [304], [414], and the second side wall [138] together with the further side walls [140], [304], [414] may collectively form a second housing [124] shape, and the second housing [124] shape may include a polyhedron. As examples [100] of the lighting system, the polyhedron shape of the second housing [124] may include a cube or a prism; and in further examples, the prism may include: a rectangular prism; a pentagonal prism; or a hexagonal prism.

In some examples [100] of the lighting system, the first mounting arm [226] may be attached to the first back plate [132]. Further, in some examples [100] of the lighting system, the second mounting arm [228] may be attached to the second back plate [136]. As examples, the first mounting arm [226] may be integral with the first back plate [132], and the second mounting arm [228] may be integral with the second back plate [136]. In additional examples [100] of the lighting system, the mounting body [110] may include a lateral edge [306] extending between the first and second ends [112], [116] of the mounting body [110], and the first mounting arm [226] may have a surface [308] configured for being engaged with the lateral edge [306] of the mounting body [110] at an endpoint of the another range [216] of pivotal movement, and the second mounting arm [228] may have another surface [310] configured for being engaged with the lateral edge [306] at another endpoint of the further range [218] of pivotal movement. In some examples [100] of the lighting system, the surface [308] of the first mounting arm [226] and the another surface [310] of the second mounting arm [228] may be configured together with the lateral edge [306] of the mounting body [110] for cooperatively preventing the first housing [120] from being in direct contact with the second housing [124]. In further examples [100] of the lighting system, the surface [308] of the first mounting arm [226] and the another surface [310] of the second mounting arm [228] may be configured, while being engaged with the lateral edge [306] of the mounting body [110], for cooperatively maintaining the first housing [120] as being at least a selected minimum distance [220] of about one millimeter away from the second housing [124]. In examples, configuring the first and second pivot joints [204], [212] for permitting the ranges of pivotal movement may include the surface [308] of the first mounting arm [226] and the another surface [310] of the second mounting arm [228] as respectively defining first endpoints of the range [214] and of the further range [218] of pivotal movement while being engaged with the lateral edge [306] of the mounting body [110]. In further examples, configuring the first and second pivot joints [204], [212] for permitting the ranges of pivotal movement may include the another range of pivotal movement [216] by the mounting body [110] around the first pivot axis [202] as having first and second endpoints being defined by limiting stops (not shown) at the first end [104] of the mounting post [102].

Figure 6:
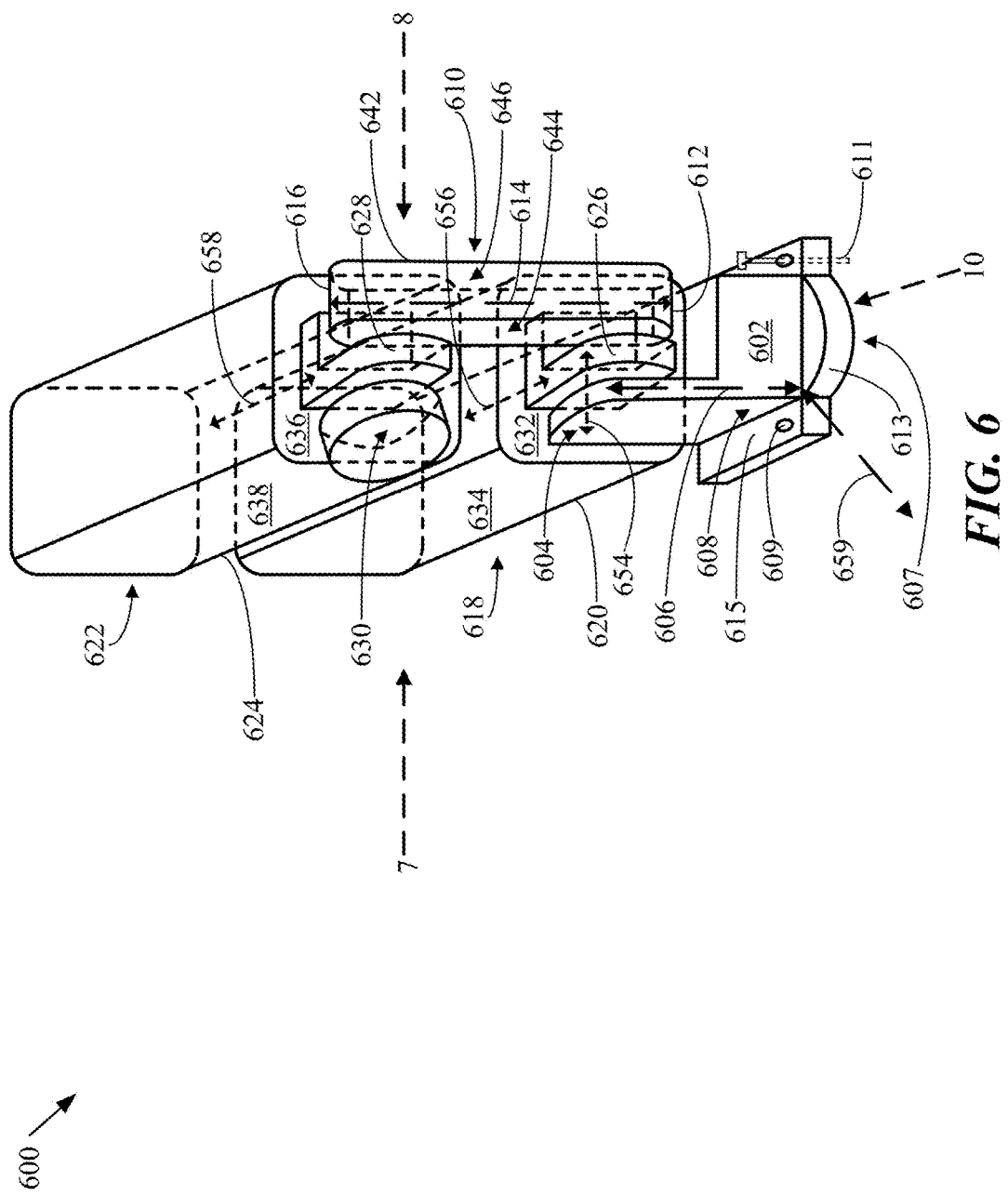
FIG. 6 is a perspective back side view showing another example [600] of the lighting system.
Figure 7:
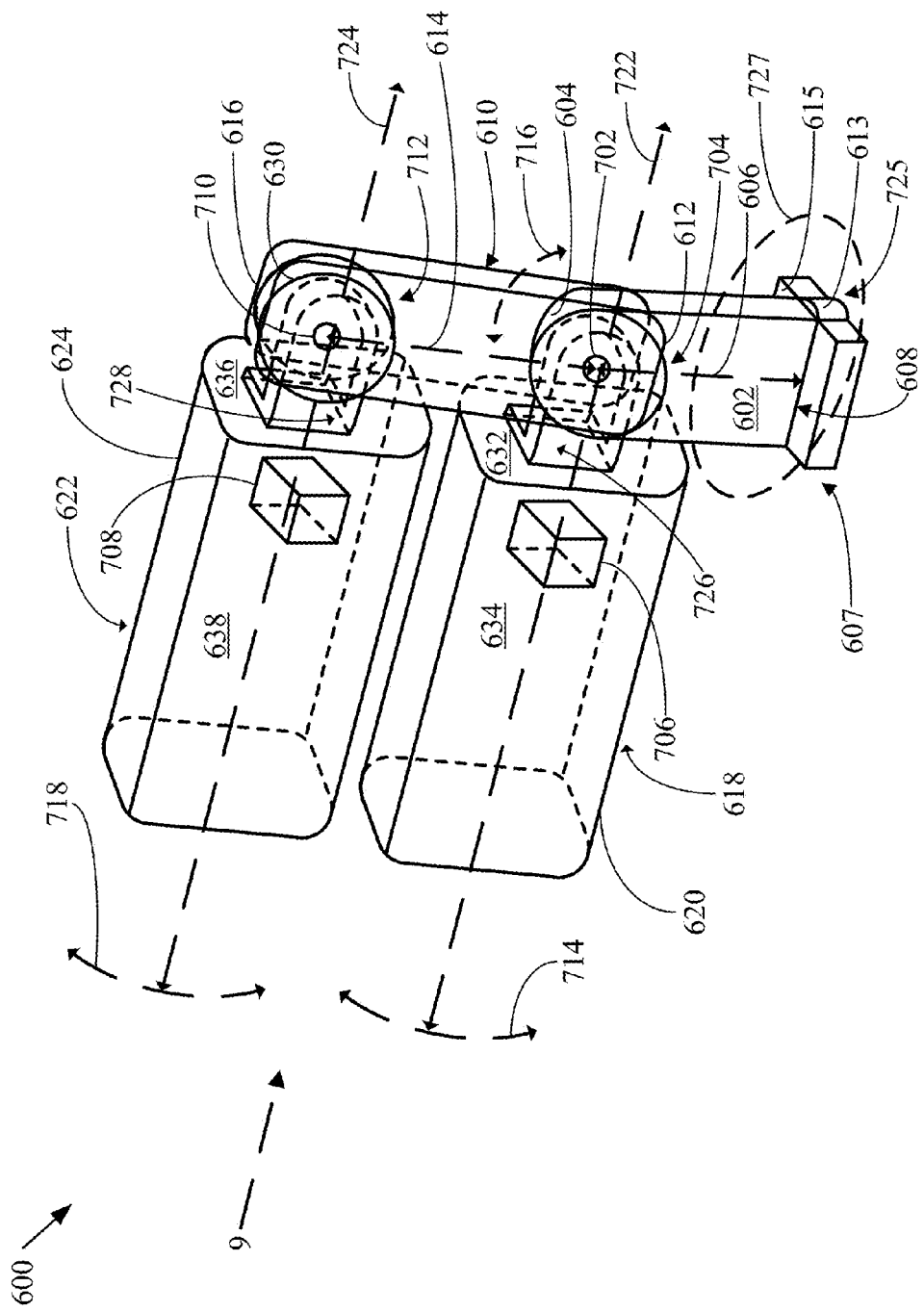
FIG. 7 is a perspective side view taken along the line [7], showing the example [600] of the lighting system.
Figure 8:
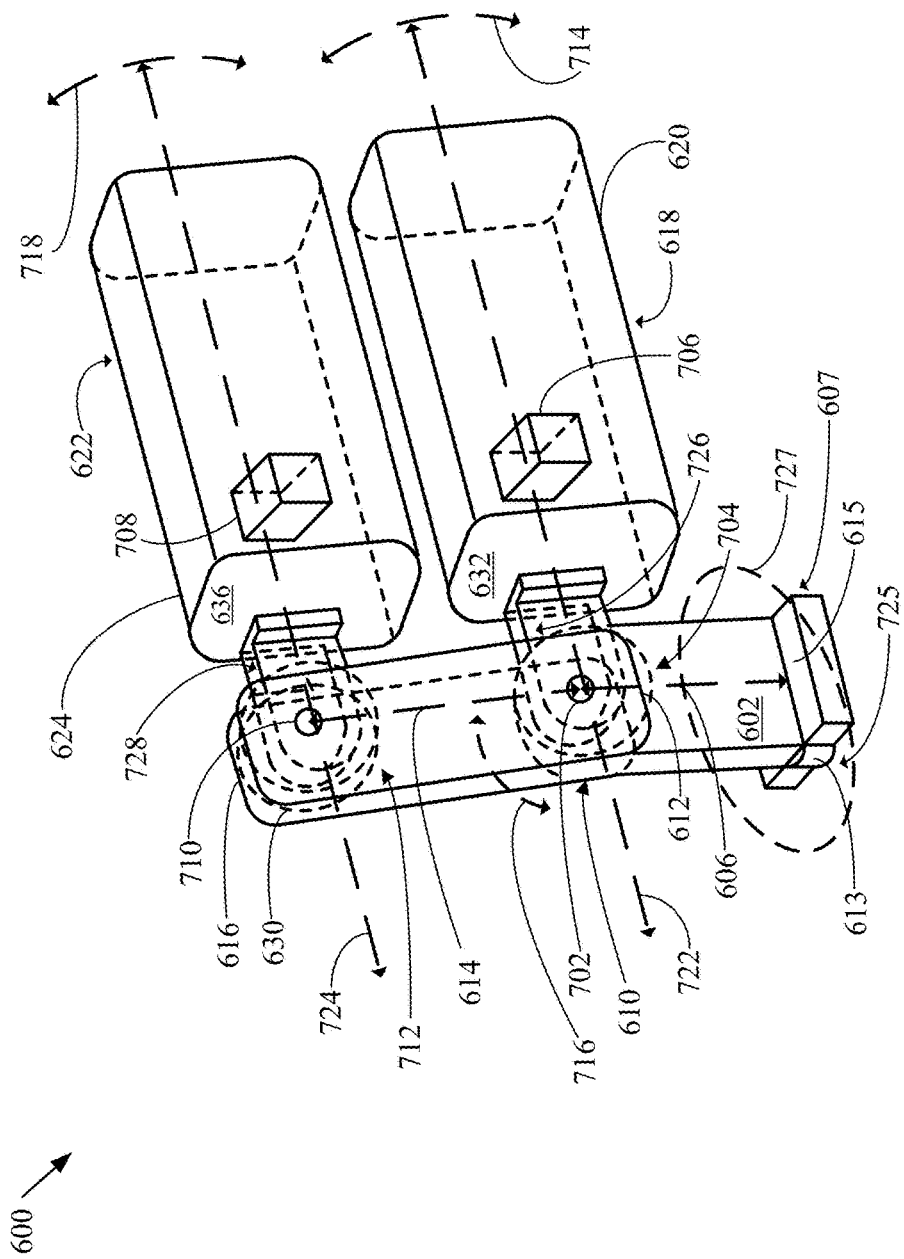
FIG. 8 is a perspective side view taken along the line [8], showing the example [600] of the lighting system.
Figure 9:
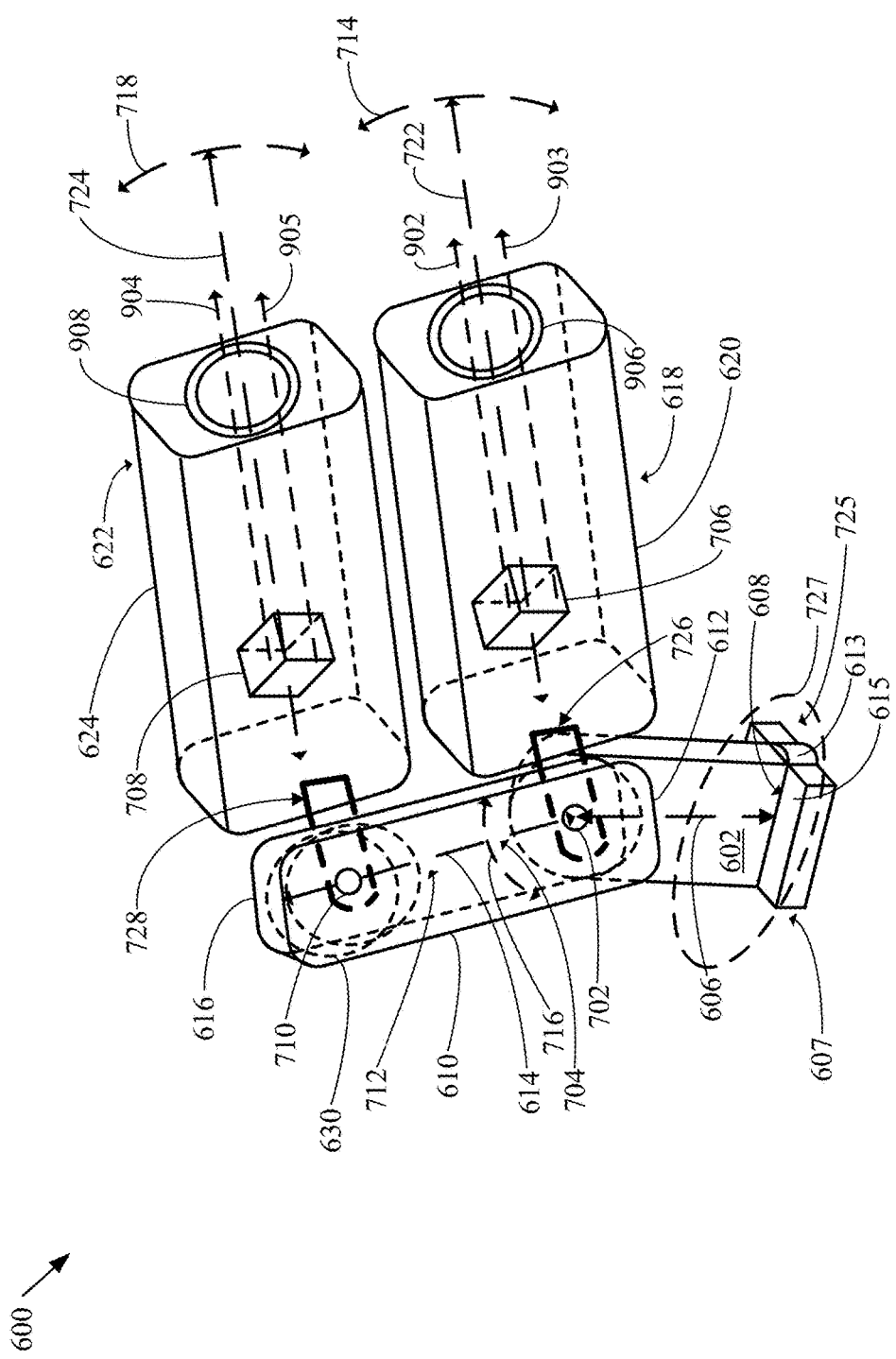
FIG. 9 is a perspective front view taken along the line [9], showing the example [600] of the lighting system.
Figure 10:
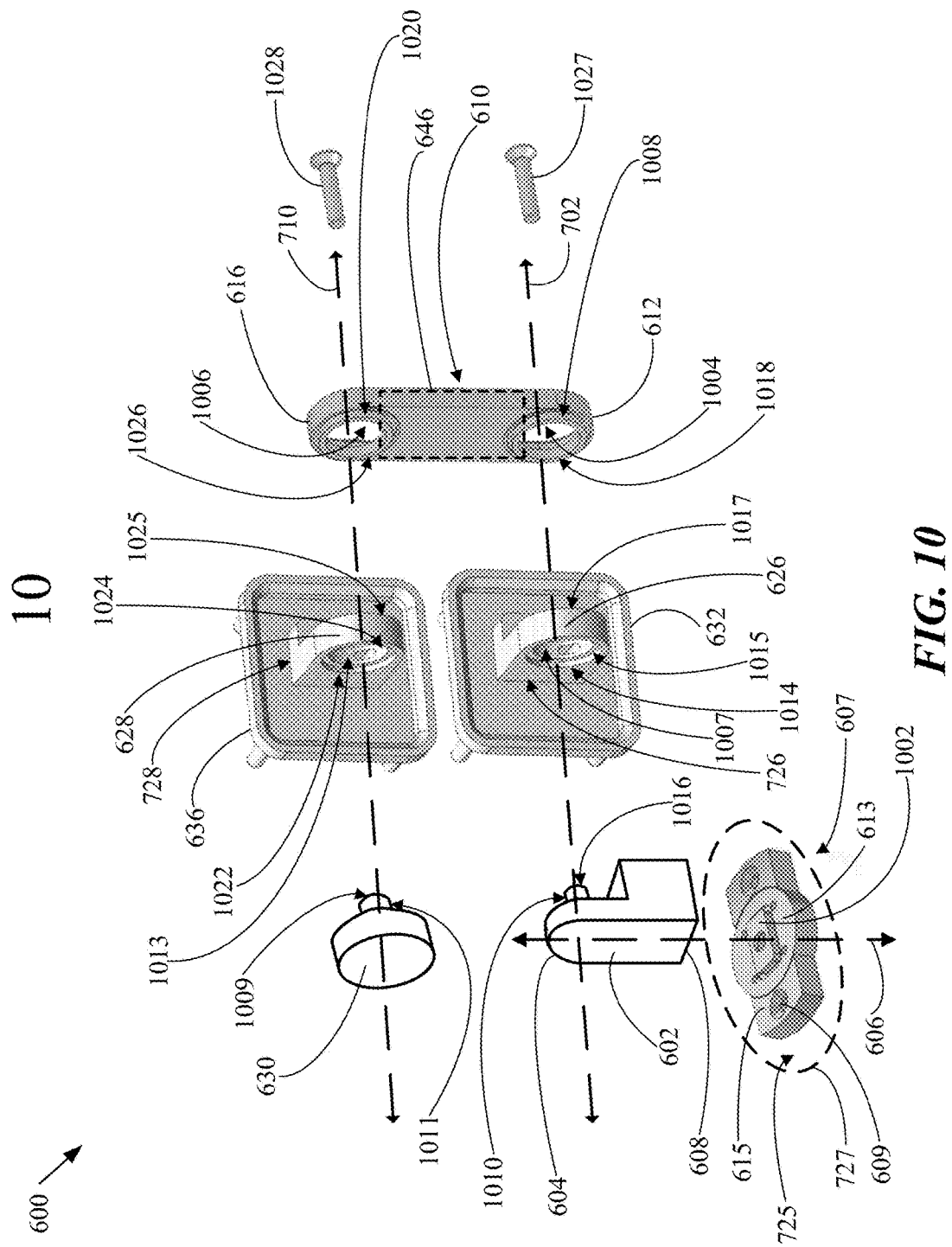
FIG. 10 is an exploded view taken along the line [10], showing portions of the example [600] of the lighting system.

FIG. 6 is a perspective back side view showing another example [600] of the lighting system. FIG. 7 is a perspective side view taken along the line [7], showing the example [600] of the lighting system. FIG. 8 is a perspective side view taken along the line [8], showing the example [600] of the lighting system. FIG. 9 is a perspective front view taken along the line [9], showing the example [600] of the lighting system. FIG. 10 is an exploded view taken along the line [10], showing portions of the example [600] of the lighting system. It is understood throughout this specification that an example [600] of a lighting system may include any combination of the features that are discussed herein in connection with the examples [100], [600], [1100] of lighting systems and in connection with the example [1800] of a mini-mounting arm assembly. Accordingly, the entireties of the discussions of the other examples [100], [1100] of lighting systems and of the example [1800] of a mini-mounting arm assembly are hereby incorporated in this discussion of the examples [600] of the lighting systems. As shown in FIGS. 6, 7, 8, 9 and 10, the example [600] of the implementation of the lighting system includes a mounting post [602] having a first end [604] being spaced apart along a longitudinal axis being represented by an arrow [606] from a second end [608]. Further, the example [600] of the implementation of the lighting system includes a mounting body [610] having a first end [612] being spaced apart along another longitudinal axis being represented by an arrow [614] from a second end [616], the first end [612] of the mounting body [610] being pivotally connected at a first pivot axis [702] by a first pivot joint [704] with the first end

[604] of the mounting post [602]. The example [600] of the implementation of the lighting system also includes a first lighting module [618] including a first housing [620] and having a first semiconductor light-emitting device [706] in the first housing [620], the first lighting module [618] being pivotally connected at the first pivot axis [702] by the first pivot joint [704] with the first end [612] of the mounting body [610] and with the first end [604] of the mounting post [602]. In addition, the example [600] of the implementation of the lighting system includes a second lighting module [622] including a second housing [624] and having a second semiconductor light-emitting device [708] in the second housing [624], the second lighting module [622] being pivotally connected at a second pivot axis [710] by a second pivot joint [712] with the second end [616] of the mounting body [610].

In examples of the example [600] of the implementation of the lighting system, the first pivot joint [704] may be configured for permitting a range of pivotal movement, as represented by an arrow [714], by the first housing [620] around the first pivot axis [702]. As further examples of the example [600] of the implementation of the lighting system, the first pivot joint [704] may be configured for permitting another range of pivotal movement, as represented by an arrow [716], by the mounting body [610] around the first pivot axis [702]. Additionally, as examples of the example [600] of the implementation of the lighting system, the second pivot joint [712] may be configured for permitting a further range of pivotal movement, as represented by an arrow [718], by the second housing [624] around the second pivot axis [710].

In the example [600] of the implementation of the lighting system, the first lighting module [618] may be configured for emitting light emissions [902], [903] along a first central light emission axis [722] intersecting the first pivot axis [702]. Further in the example [600] of the implementation of the lighting system, the second lighting module [622] may be configured for emitting further light emissions [904], [905] along a second central light emission axis [724] intersecting the second pivot axis [710].

In further examples, the example [600] of the lighting system may include a mounting bracket plate [607] being attached to the mounting post [602]. As an example of the example [600] of the lighting system, the mounting bracket plate [607] may include one or more apertures [609] configured for receiving a mounting fastener [611]. As additional examples of the example [600] of the lighting system, the mounting bracket plate [607] may be attached by a swivel joint [725] to the mounting post [602], and the swivel joint [725] may be configured for facilitating rotation of the mounting post [602] around the longitudinal axis [606] on a swivel path represented by a dashed loop [727]. In some examples of the example [600] of the lighting system, the mounting post [602] may be configured for being locked at a selected position along the swivel path [727]. In some examples [600] of the lighting system, the mounting bracket plate [607] may include a disc [613] being rotatably attached to a base plate [615], the disc [613] being configured to be rotated around the longitudinal axis [606] while the base plate [615] is attached by the mounting fastener [611] to a working surface (not shown), examples of working surfaces including a surface of: a wall, a ceiling, a floor, or a table. Further, for example, the disc [613] may have a raised region [1002]; and the second end [608] of the mounting post [602] may have a cavity region (not shown) being shaped for receiving the raised region [1002]; and the raised region [1002] together with the cavity region may be collectively configured for securing the mounting post [602] to the disc [613]. Additionally, for example, the mounting post [602], being secured to the disc [613], may be rotatable around the longitudinal axis [606] over the base plate [615] on the swivel path [727].

As additional examples, the example [600] of the lighting system may include a first mounting arm [726] being attached to the first housing [620] and forming a part of the first pivot joint [704]. In further examples, the example [600] of the lighting system may include a second mounting arm [728] being attached to the second housing [624] and forming a part of the second pivot joint [712]. In some examples of the example [600] of the lighting system, the first mounting arm [726] may form a part of the first housing [620], and the second mounting arm [728] may form a part of the second housing [624].

In some examples of the example [600] of the lighting system, the first housing [620] may include a first light emission aperture [906], and the first housing [620] may include a first back plate [632] being spaced apart by a first side wall [634] along the first central light emission axis [722]. As additional examples of the example [600] of the lighting system, the second housing [624] may include a second light emission aperture [908], and the second housing [624] may include a second back plate [636] being spaced apart by a second side wall [638] along the second central light emission axis [724].

Further, for example, the first mounting arm [726] of the example [600] of the lighting system may be aligned between the first semiconductor light-emitting device [706] and the first pivot axis [702], and the second mounting arm [728] may be aligned between the second semiconductor light-emitting device [708] and the second pivot axis [710]. As further examples of the example [600] of the lighting system, the first mounting arm [726] may be configured for permitting the range [714] of pivotal movement by the first housing [620] around the first pivot axis [702] and for permitting the another range [716] of pivotal movement by the mounting body [610] around the first pivot axis [702]; and the second mounting arm [728] may be configured for permitting the further range [718] of pivotal movement by the second housing [624] around the second pivot axis [710]. In further examples of the example [600] of the lighting system, the first mounting arm [726] may have an end [626] intersecting with the first pivot axis [702], and the second mounting arm [728] may have another end [628] intersecting with the second pivot axis [710].

In some examples of the example [600] of the lighting system, the mounting body [610] may include a container [642] and a cover [644] collectively forming an enclosed chamber [646]. Further in those examples [600] of the lighting system, the enclosed chamber [646] may include or communicate with an aperture [1004] forming a part of the first pivot joint [704] and being aligned with the first pivot axis [702]; and the enclosed chamber [646] may include or communicate with a further aperture [1006] forming a part of the second pivot joint [712] and being aligned with the second pivot axis [710]. In additional examples of the example [600] of the lighting system, the mounting post [602] may include a first electrical conduit being represented by the arrow [606] and communicating with the first and second ends [604], [608] of the mounting post [602]; and the end [626] of the first mounting arm [726] may include a second electrical conduit being represented by an arrow [654] and communicating with the first electrical conduit [606] and with the aperture [1004]; and the end [626] of the first mounting arm [726] may include a third electrical conduit being represented by an arrow [656] and communicating with the second electrical conduit [654] and with the first lighting module [618]; and the another end [628] of the second mounting arm [728] may include a fourth electrical conduit being represented by an arrow [658] and communicating with the further aperture [1006] and with the second lighting module [622]. In additional examples of the example [600] of the lighting system, the first electrical conduit [606], and the second electrical conduit [654], and the enclosed chamber [646], and the third electrical conduit [656], and the fourth electrical conduit [658] may be collectively configured for supplying electrical power to the first and second lighting modules [618], [622] from an external power source represented by an arrow [659]. In a further example of the example [600] of the lighting system, the first electrical conduit [606], and the second electrical conduit [654], and the enclosed chamber [646], and the third electrical conduit [656], and the fourth electrical conduit [658] may together form an electrical circuit for supplying electrical power to the first and second lighting modules [618], [622] from the external power source [659].

In additional examples of the example [600] of the lighting system, the mounting body [610] may include a ring [1008] surrounding the aperture [1004] and forming a part of the first pivot joint [704], and the mounting post [602] may include another ring [1010] located at the first end [604] of the mounting post [602] and forming a part of the first pivot joint [704], and the another ring [1010] may be configured for being engaged with the ring [1008] and for permitting the mounting body [610] to be pivoted around the first pivot axis [702]. In further examples of the example [600] of the lighting system, the mounting body [610] may include an end cap [630] forming a part of the second pivot joint [712] and being aligned with the second pivot axis [710], and the end cap [630] may include a ring [1011], and the mounting body [610] may further include an additional ring [1020] surrounding the further aperture [1006] and being aligned with the end cap [630]. Additionally, for example, the ring [1011] may be configured for being engaged with the additional ring [1020] and for permitting the second lighting module [622] to be pivoted around the second pivot axis [710].

In additional examples of the example [600] of the lighting system, the mounting body [610] may include the ring [1008] and the mounting post [602] may include the another ring [1010], and the first mounting arm [726] may include a further ring [1014] surrounding another aperture [1007] located at the end [626] of the first mounting arm [726] and forming a part of the first pivot joint [704]; and the further ring [1014] may be configured for being engaged with the another ring [1010] and with the ring [1008] and for permitting the first lighting module [618] and the mounting body [610] to be pivoted around the first pivot axis [702]. In other examples of the example [600] of the lighting system, the mounting body [610] may include the ring [1008] and the mounting post [602] may include the another ring [1010] and the first mounting arm [726] may include the further ring [1014]; and the further ring [1014] may have a surface [1015] configured for being engaged with another surface [1016] of the another ring [1010]; and the further ring [1014] may also have a further surface [1017] configured for being engaged with an additional surface [1018] of the ring [1008]; and the surfaces [1016], [1015], [1017], [1018] may be mutually positioned for permitting the first lighting module [618] to be pivoted around the first pivot axis [702]. In examples of the example [600] of the lighting system, the surfaces [1016], [1015], [1017], [1018] may be collectively configured for locating the first lighting module [618] at a one of a plurality of predetermined positions within the range [714] of pivotal movement. As further examples of the example [600] of the lighting system, the surfaces [1016], [1015], [1017], [1018] may each include a circular pattern of alternating radially extending crests and valleys. In additional examples of the example [600] of the lighting system, the circular patterns of the alternating radially extending crests and valleys may have a uniform contour. As further examples of the example [600] of the lighting system, the mounting body [610] may include the ring [1008] and the mounting post [602] may include the another ring [1010]; and the another ring [1010] may have the another surface [1016] as configured for being engaged with the additional surface [1018] of the ring [1008], and the another surface [1016] of the another ring [1010] and the additional surface [1018] of the ring [1008] may be mutually positioned for permitting first lighting module [618] and the mounting body [610] to be pivoted around the first pivot axis [702]. As other examples of the example [600] of the lighting system, the another surface [1016] and the additional surface [1018] may be collectively configured for locating the first lighting module [618] at a one of a plurality of predetermined positions within the range [714] of pivotal movement; and for locating the mounting body [610] at a one of a plurality of predetermined positions within the another range [716] of pivotal movement.

In additional examples of the example [600] of the lighting system, the mounting body [610] may include the additional ring [1020] surrounding the further aperture [1006] and forming a part of the second pivot joint [712], and the second mounting arm [728] may include yet another ring [1022] surrounding an additional aperture [1013] located at the another end [628] of the second mounting arm [728] and forming a part of the second pivot joint [712], and the yet another ring [1022] may be configured for being engaged with the additional ring [1020] and for permitting the second lighting module [622] to be pivoted around the second pivot axis [710]. In other examples of the example [600] of the lighting system, the mounting body [610] may include the additional ring [1020] and the second mounting arm [728] may include the yet another ring [1022], and the end cap [630] may include the ring [1011]. Further in those examples, the yet another ring [1022] may have yet another surface [1024] configured for being engaged with a yet further surface [1009] of the ring [1011]; and the yet another ring [1022] may have a yet additional surface [1025] configured for being engaged with still another surface [1026] of the additional ring [1020]; and the surfaces [1009], [1024], [1025], [1026] may be mutually positioned for permitting the second lighting module [622] to be pivoted around the second pivot axis [710]. In examples of the example [600] of the lighting system, the surfaces [1009], [1024], [1025], [1026] may be collectively configured for locating the second lighting module [622] at a one of a plurality of predetermined positions within the further range [718] of pivotal movement. As further examples of the example [600] of the lighting system, the surfaces [1009], [1024], [1025], [1026] may each include a circular pattern of alternating radially extending crests and valleys. In additional examples of the example [600] of the lighting system, the circular patterns of the alternating radially extending crests and valleys may have a uniform contour. In some examples, the example [600] of the lighting system may include a bolt [1027] and another bolt [1028], being configured to secure together the example [600] of the lighting system in the manner as respectively discussed earlier regarding the bolt [502] and the another bolt [512] in the example [100] of the lighting system.

Figure 11:
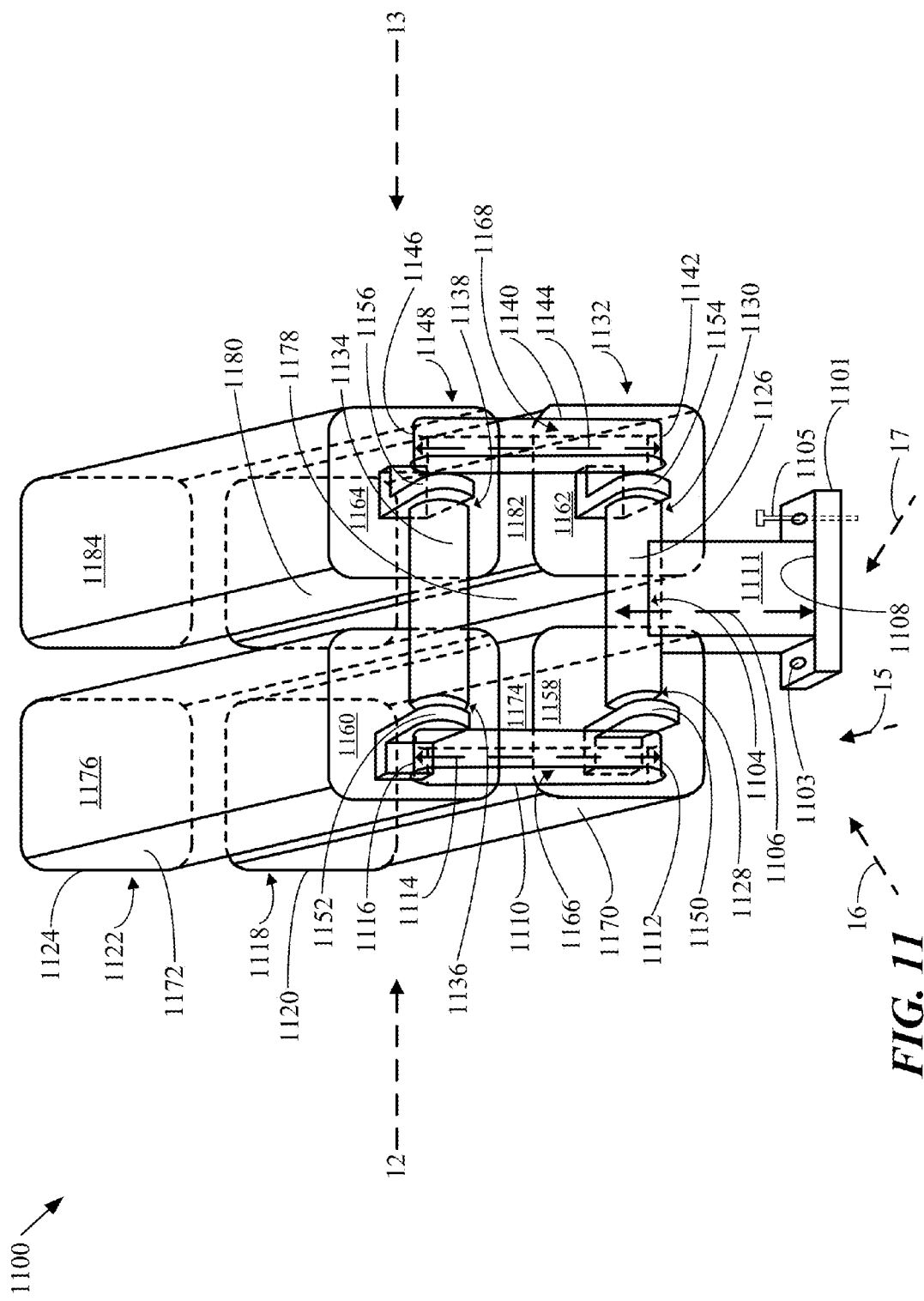
FIG. 11 is a perspective back side view showing an example [1100] of an implementation of a lighting system.
Figure 12:
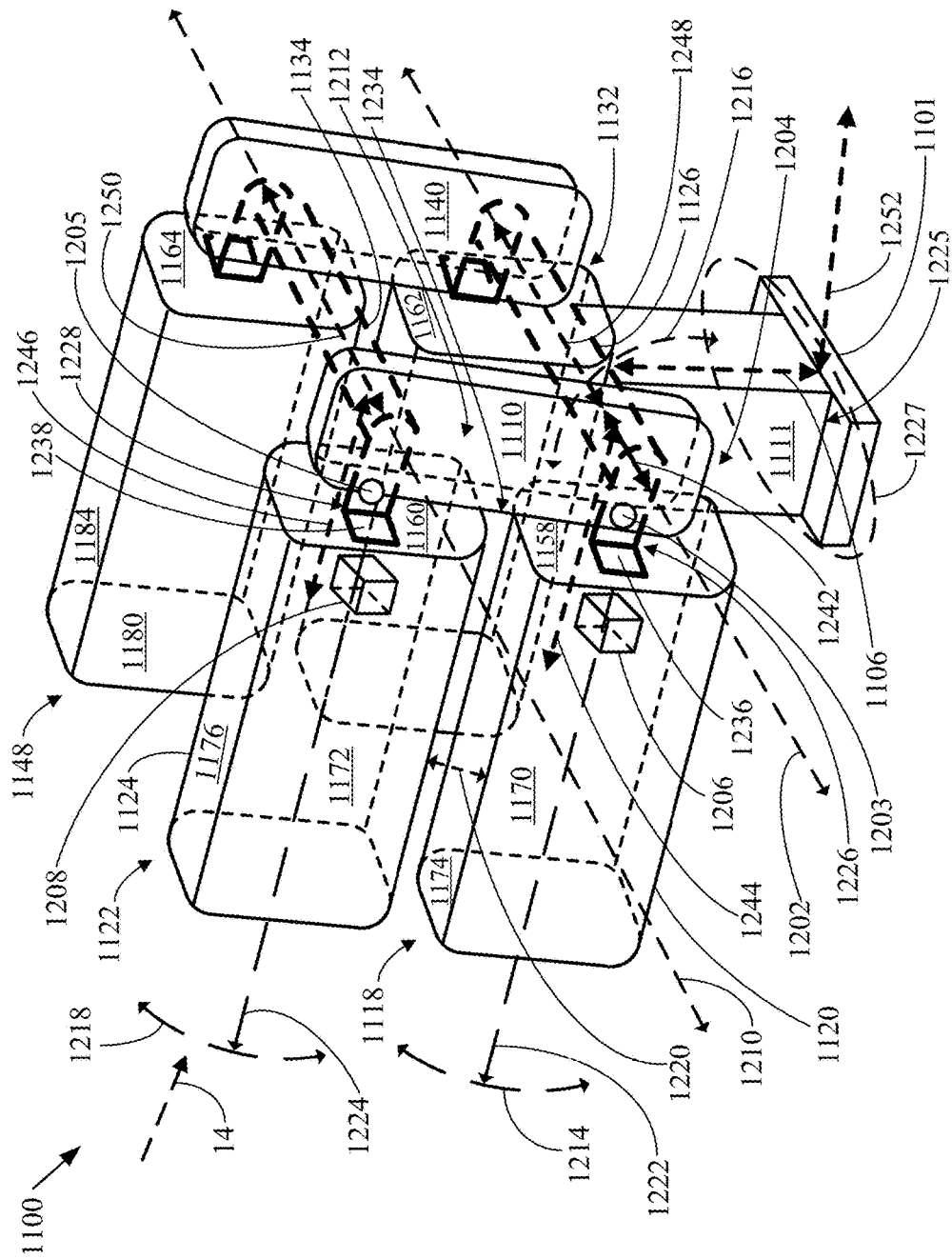
FIG. 12 is a perspective side view taken along the line [12], showing the example [1100] of the lighting system.
Figure 13:
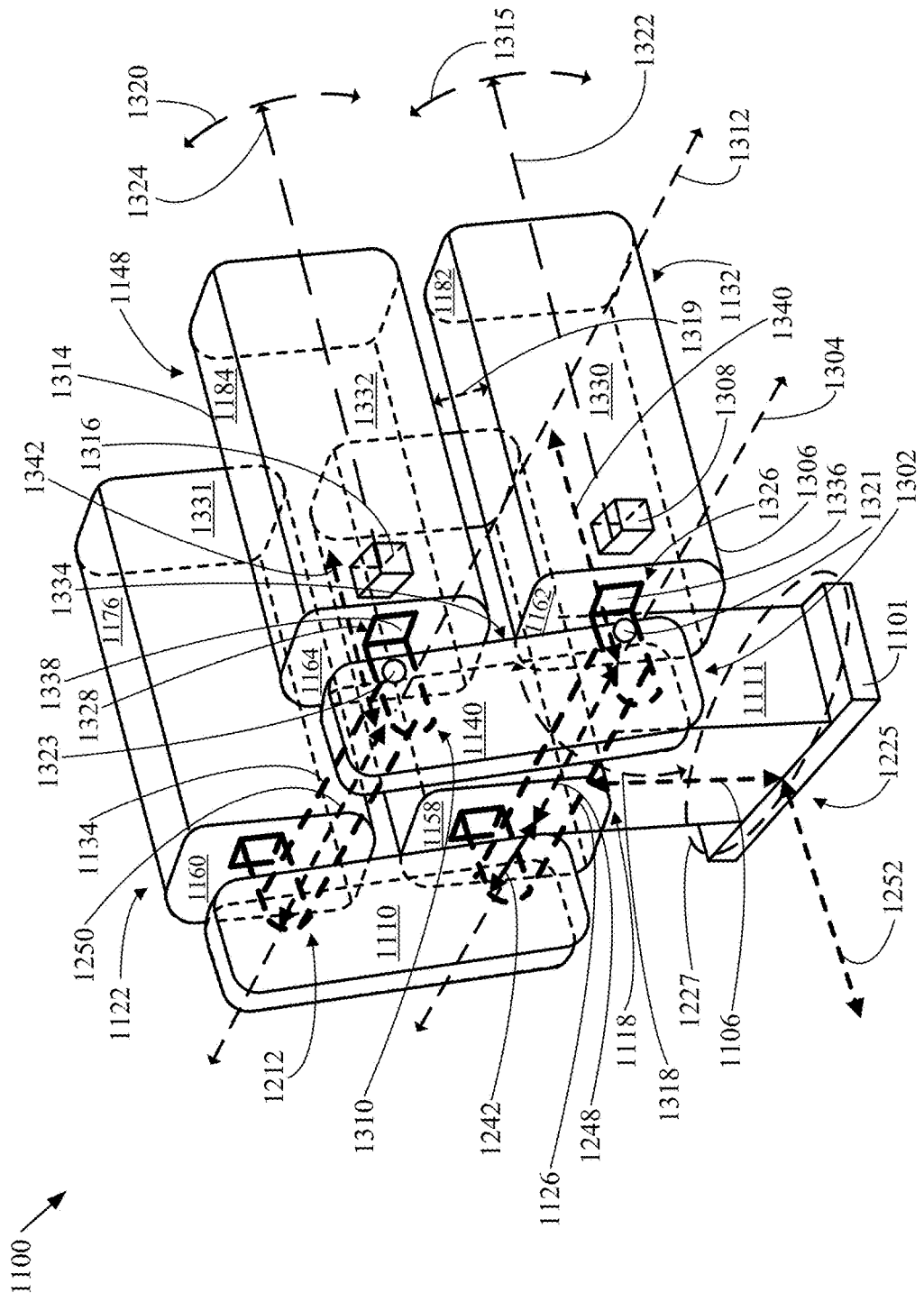
FIG. 13 is a perspective side view taken along the line [13], showing the example [1100] of the lighting system.
Figure 14:
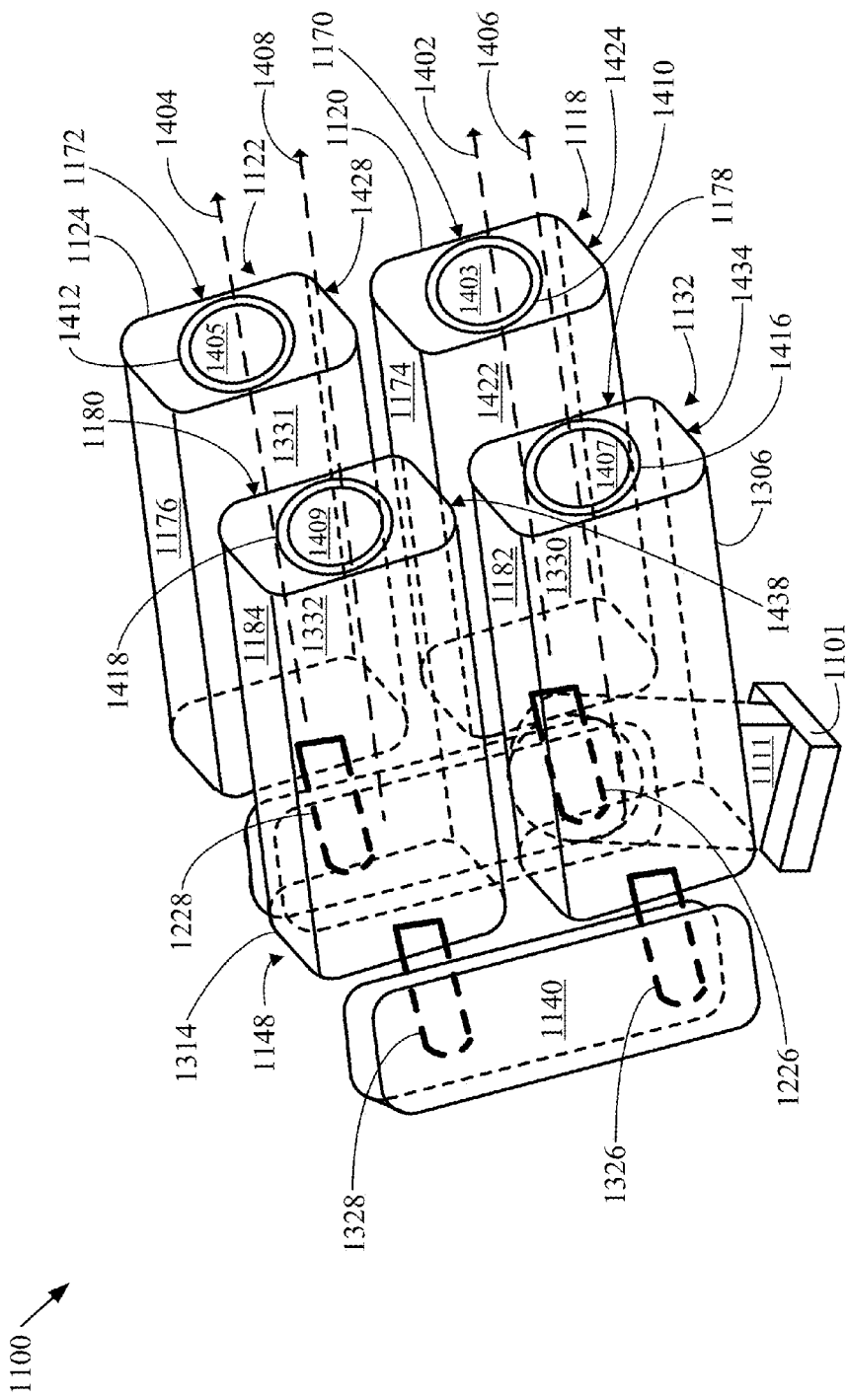
FIG. 14 is a perspective front view taken along the line [14], showing the example [1100] of the lighting system.
Figure 15:
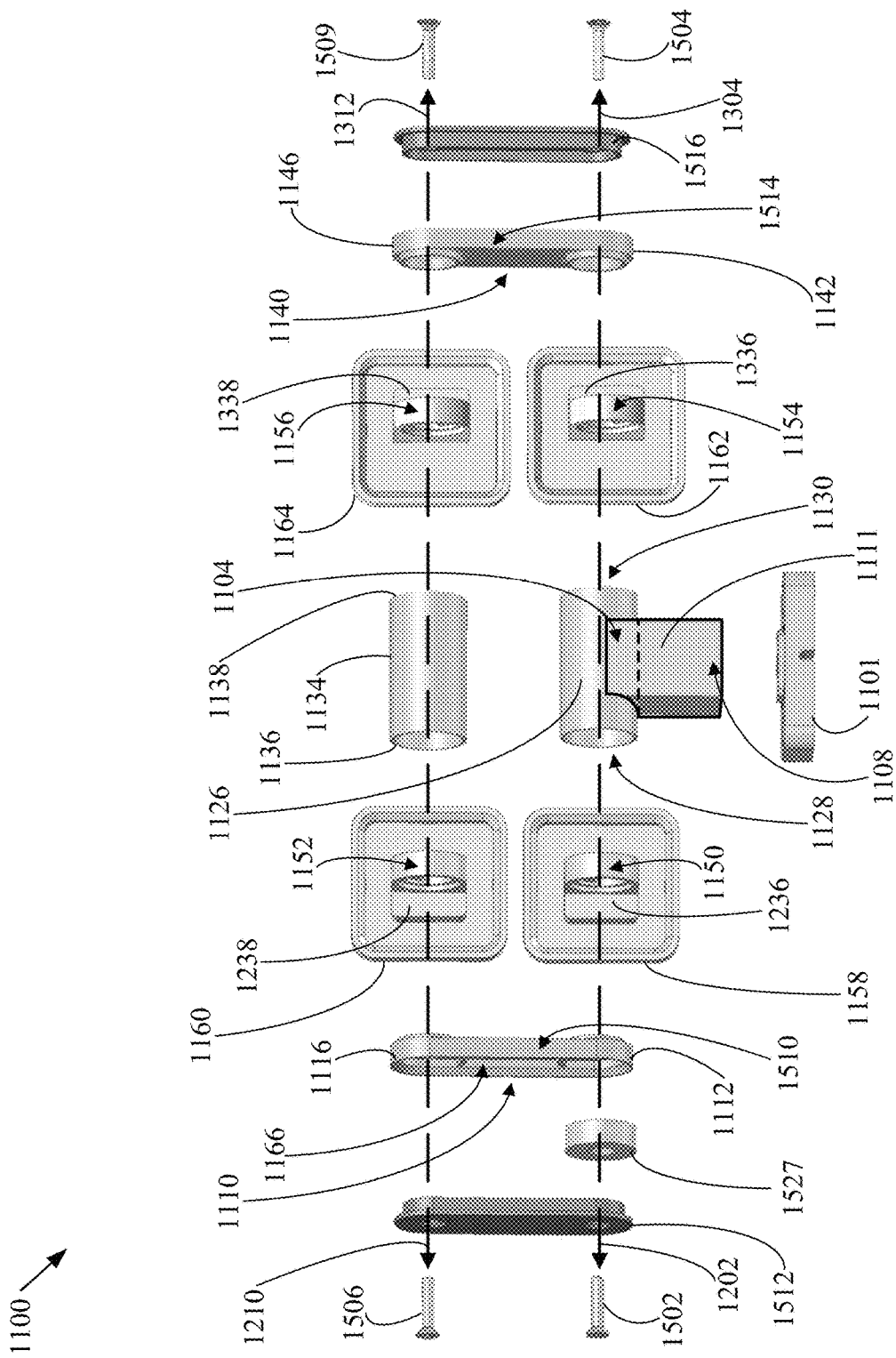
FIG. 15 is an exploded view taken along the line [15], showing portions of the example [1100] of the lighting system.
Figure 16:
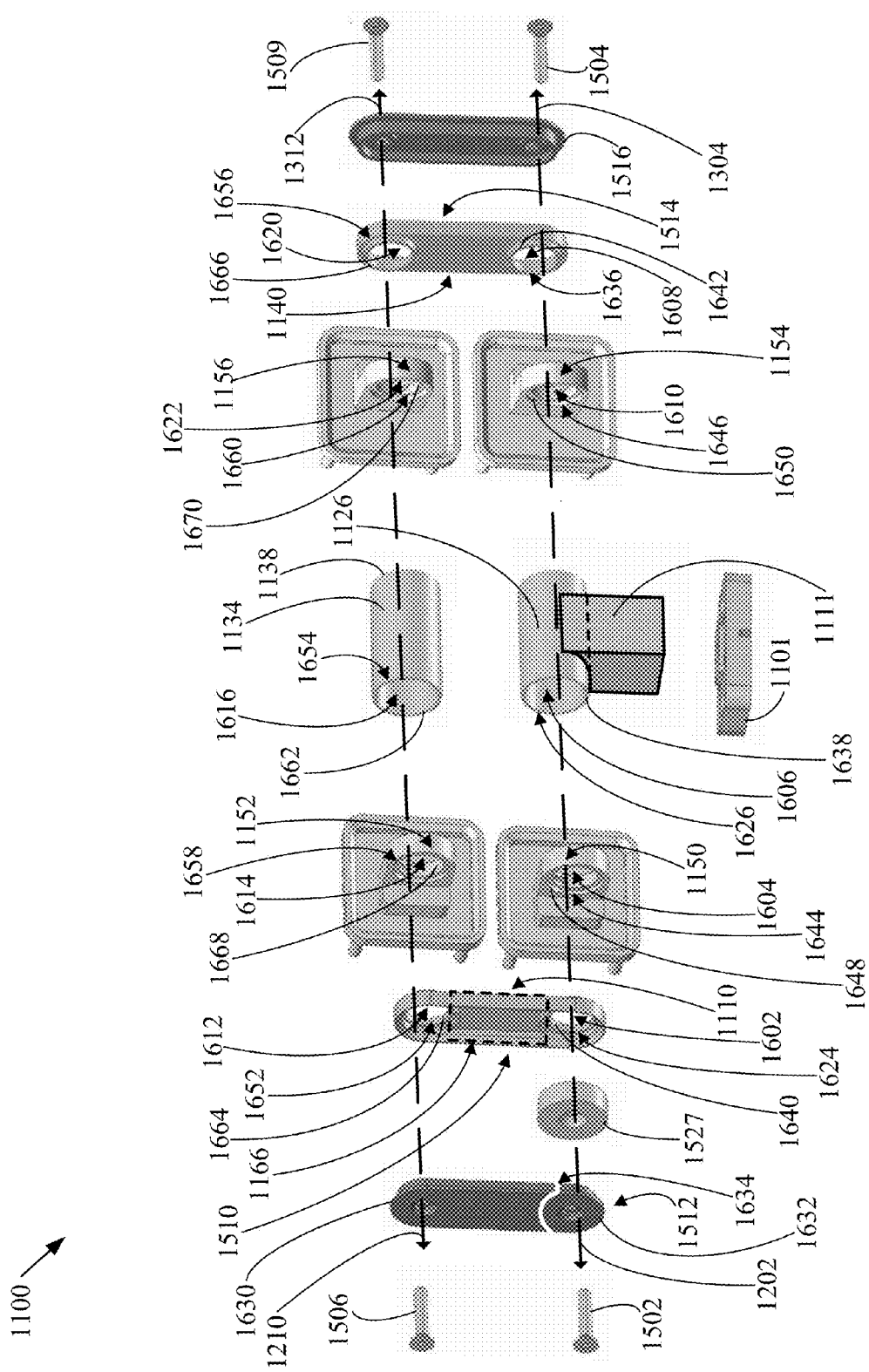
FIG. 16 is an exploded view taken along the line [16], showing the portions of the example [1100] of the lighting system.
Figure 17:
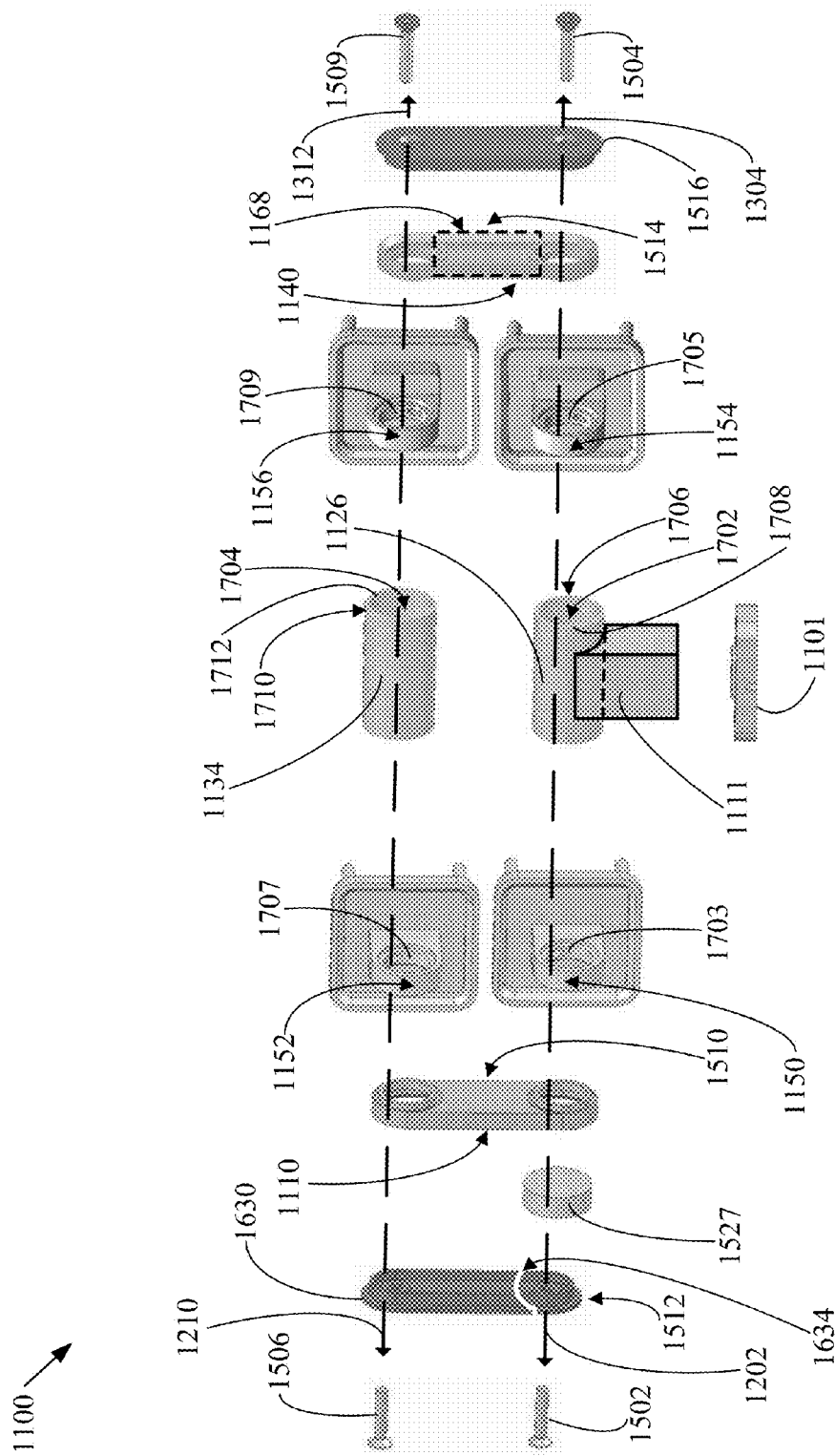
FIG. 17 is an exploded view taken along the line [17], showing the portions of the example [1100] of the lighting system.

FIG. 11 is a perspective back side view showing an example [1100] of an implementation of a lighting system. FIG. 12 is a perspective side view taken along the line [12], showing the example [1100] of the lighting system. FIG. 13 is a perspective side view taken along the line [13], showing the example [1100] of the lighting system. FIG. 14 is a perspective front view taken along the line [14], showing the example [1100] of the lighting system. FIG. 15 is an exploded view taken along the line [15], showing portions of the example [1100] of the lighting system. FIG. 16 is an exploded view taken along the line [16], showing the portions of the example [1100] of the lighting system. FIG. 17 is an exploded view taken along the line [17], showing the portions of the example [1100] of the lighting system. It is understood throughout this specification that an example [1100] of a lighting system may include any combination of the features that are discussed herein in connection with the examples [100], [600], [1100] of lighting systems and in connection with the example [1800] of a mini-mounting arm assembly. Accordingly, the entireties of the discussions of the other examples [100], [600] of lighting systems and of the example [1800] of a mini-mounting arm assembly are hereby incorporated in this discussion of the examples [1100] of the lighting systems. As shown in FIGS. 11, 12, 13, 14, 15, 16, and 17, the example [1100] of the implementation of the lighting system includes a mounting post [1111] having a first end [1104] being spaced apart along a longitudinal axis represented by an arrow [1106] from a second end [1108]. Additionally, the example [1100] of the lighting system includes a first connector body [1126] having a first end [1128] being spaced apart along a first pivot axis [1202] from a second end [1130]. Further, the example [1100] of the implementation of the lighting system includes a mounting body [1110] having a first end [1112] being spaced apart along another longitudinal axis represented by an arrow [1114] from a second end [1116], the first end [1112] of the mounting body [1110] being pivotally connected at the first pivot axis [1202] by a first pivot joint [1204] with the first end [1128] of the first connector body [1126]. The example [1100] of the implementation of the lighting system also includes a first lighting module [1118] including a first housing [1120] and having a first semiconductor light-emitting device [1206] in the first housing [1120], the first lighting module [1118] being pivotally connected at the first pivot axis [1202] by the first pivot joint [1204] with the first end [1112] of the mounting body [1110] and with the first end [1128] of the first connector body [1126].

In some examples, the example [1100] of the implementation of the lighting system may include a second lighting module [1122] including a second housing [1124] and having a second semiconductor light-emitting device [1208] in the second housing [1124], the second lighting module [1122] being pivotally connected at a second pivot axis [1210] by a second pivot joint [1212] with the second end [1116] of the mounting body [1110]. In additional examples, the first end [1128] of the first connector body [1126] may form a part of the first pivot joint [1204], and the second end [1130] of the first connector body [1126] may form a part of a third pivot joint [1302] having a third pivot axis [1304]. In further examples, the first pivot axis [1202] and the third pivot axis [1304] may be integrated together as being a lower pivot axis of the example [1100] of the lighting system. As additional examples, the example [1100] of the lighting system may include a third lighting module [1132]. In examples of the example [1100] of the lighting system, the third lighting module [1132] may include a third housing [1306] and may have a third semiconductor light-emitting device [1308] in the third housing [1306]; and the third lighting module [1132] may be pivotally connected at the third pivot axis [1304] by the third pivot joint [1302] with the second end [1130] of the first connector body [1126]. In further examples, the example [1100] of the lighting system may include a second connector body [1134] having a first end [1136] being spaced apart along the second pivot axis [1210] from a second end [1138]. In examples, the first end [1136] of the second connector body [1134] may form a part of the second pivot joint [1212], and the second end [1138] of the second connector body [1134] may form a part of a fourth pivot joint [1310] having a fourth pivot axis [1312]. In further examples, the second pivot axis [1210] and the fourth pivot axis [1312] may be integrated together as being an upper pivot axis of the example [1100] of the lighting system. As additional examples, the example [1100] of the lighting system may include another mounting body [1140] having a first end [1142] being spaced apart along a further longitudinal axis represented by an arrow [1144] from a second end [1146]. Further, as examples, the first end [1142] of the another mounting body [1140] may be pivotally connected at the third pivot axis [1304] by the third pivot joint [1302] with the second end [1130] of the first connector body [1126]. As further examples, the example [1100] of the lighting system may include a fourth lighting module [1148] including a fourth housing [1314] and having a fourth semiconductor light-emitting device [1316] in the fourth housing [1314]. As examples, the fourth lighting module [1148] may be pivotally connected at the fourth pivot axis [1312] by the fourth pivot joint [1310] with the second end [1138] of the second connector body [1134] and with the second end [1146] of the another mounting body [1140]. In additional examples, the example [1100] of the lighting system may include: the first lighting module [1118]; the first connector body [1126]; the third lighting module [1132]; the second lighting module [1122]; the second connector body [1134]; and the fourth lighting module [1148]. In other examples (not shown), the example [1100] of the lighting system may include the first lighting module [1118], the first connector body [1126], and the third lighting module [1132]; and may omit the second lighting module [1122], the second connector body [1134], and the fourth lighting module [1148]. In additional examples (not shown), the example [1100] of the lighting system may include: the first lighting module [1118]; the first connector body [1126]; the second lighting module [1122]; and the second connector body [1134]; and may omit the third lighting module [1132] and the fourth lighting module [1148]. In those additional examples (not shown), the example [1100] of the lighting system may, as examples, also include the third lighting module [1132] and omit the fourth lighting module [1148]; or also include the fourth lighting module [1148] and omit the third lighting module [1132]. In other examples, the example [1100] of the lighting system may include the first, second, third and fourth lighting modules [1118], [1122], [1132], [1148] and the first and second connector bodies [1126] and [1134]; and may further include one or more additional lighting modules (not shown); and may further include one or more additional connector bodies (not shown).

In further examples, the example [1100] of the lighting system may include a mounting bracket plate [1101] being attached to the mounting post [1111]. As an example of the example [1100] of the lighting system, the mounting bracket plate [1101] may include one or more apertures [1103]

configured for receiving a mounting fastener [1105]. As additional examples of the example [1100] of the lighting system, the mounting bracket plate [1101] may be attached by a swivel joint [1225] to the mounting post [1111], and the swivel joint [1225] may be configured for facilitating rotation of the mounting post [1111] around the longitudinal axis [1106] on a swivel path represented by a dashed loop [1227]. In some examples of the example [100] of the lighting system, the mounting post [1111] may be configured for being locked at a selected position around the swivel path [1227]. In some examples, the example [1100] of the lighting system may include a set screw or locking bolt (not shown) passing through the mounting bracket plate [1101] and the mounting post [1111], for locking them into a fixed relative position.

In examples of the example [1100] of the implementation of the lighting system, the first pivot joint [1204] may be configured for permitting a range of pivotal movement, as represented by an arrow [1214], by the first housing [1120] around the first pivot axis [1202]. As further examples of the example [1100] of the implementation of the lighting system, the first pivot joint [1204] may be configured for permitting another range of pivotal movement, as represented by an arrow [1216], by the mounting body [1110] around the first pivot axis [1202]. Additionally, as examples of the example [1100] of the implementation of the lighting system, the second pivot joint [1212] may be configured for permitting a further range of pivotal movement, as represented by an arrow [1218], by the second housing [1124] around the second pivot axis [1210]. In additional examples of the example [100] of the lighting system, the third pivot joint [1302] may be configured for permitting an additional range of pivotal movement, as represented by an arrow [1315], by the third housing [1306] around the third pivot axis [1304]. As other examples of the example [1100] of the lighting system, the third pivot joint [1302] may be configured for permitting yet another range of pivotal movement, as represented by an arrow [1318], by the another mounting body [1140] around the third pivot axis [1304]. Further, in examples of the example [1100] of the lighting system, the fourth pivot joint [1310] may be configured for permitting a still further range of pivotal movement, as represented by an arrow [1320], by the fourth housing [1314] around the fourth pivot axis [1312].

In some examples of the example [1100] of the implementation of the lighting system, the first pivot joint [1204] and the second pivot joint [1212] may be configured for cooperatively preventing the first housing [1120] from being in direct contact with the second housing [1124]. Further, for example, the first pivot joint [1204] and the second pivot joint [1212] in the example [1100] of the implementation of the lighting system may be configured for causing the another range [1216] of pivotal movement and the further range [1218] of pivotal movement to cooperatively prevent the first housing [1120] from being in direct contact with the second housing [1124]. As examples [1100] of the implementation of the lighting system, the first pivot joint [1204] and the second pivot joint [1212] may be configured for cooperatively maintaining the first housing [1120] as being at least a selected minimum distance, as represented by an arrow [1220], away from the second housing [1124]. For example, the first pivot joint [1204] and the second pivot joint [1212] may be configured for cooperatively maintaining the first housing [1120] as being at least a selected minimum distance [1220] of about one millimeter away from the second housing [1124]. In additional examples of the example [1100] of the lighting system, the third pivot joint [1302] and the fourth pivot joint [1310] may be configured for cooperatively preventing the third housing [1306] from being in direct contact with the fourth housing [1314]. Further, in examples of the example [1100] of the lighting system, the third pivot joint [1302] and the fourth pivot joint [1310] may be configured for causing the yet another range of pivotal movement [1318] and the still further range of pivotal movement [1320] to cooperatively prevent the third housing [1306] from being in direct contact with the fourth housing [1314]. For example, the third pivot joint [1302] and the fourth pivot joint [1310] may be configured for cooperatively maintaining the third housing [1306] as being at least a selected minimum distance represented by an arrow [1319] away from the fourth housing [1314]. In some examples of the example [1100] of the lighting system, the third pivot joint [1302] and the fourth pivot joint [1310] may be configured for cooperatively maintaining the third housing [1306] as being at least a selected minimum distance [1319] of about one millimeter away from the fourth housing [1314]. In examples, configuring the first and second pivot joints [1204], [1212] for permitting the ranges of pivotal movement may include the surface [1236] of the first mounting arm [1226] and the another surface [1238] of the second mounting arm [1228] as respectively defining first endpoints of the range [1214] and of the further range [1218] of pivotal movement while being engaged with the lateral edge [1234] of the mounting body [1110]. In further examples, configuring the first and second pivot joints [1204], [1212] for permitting the ranges of pivotal movement may include the another range of pivotal movement [1216] by the mounting body [1110] around the first pivot axis [1202] as having first and second endpoints being defined by limiting stops (not shown) at the first end [1128] of the first connector body [1126].

In examples, configuring the third and fourth pivot joints [1304], [1312] for permitting the ranges of pivotal movement may include the surface [1336] of the third mounting arm [1326] and the another surface [1338] of the fourth mounting arm [1328] as respectively defining first endpoints of the additional range [1315] and of the still further range [1320] of pivotal movement while being engaged with the lateral edge [1342] of the another mounting body [1140]. In further examples, configuring the third and fourth pivot joints [1304], [1312] for permitting the ranges of pivotal movement may include the yet another range of pivotal movement [1318] by the another mounting body [1140] around the third pivot axis [1302] as having first and second endpoints being defined by limiting stops (not shown) at the second end [1130] of the first connector body [1126].

In the example [1100] of the implementation of the lighting system, the first lighting module [1118] may be configured for emitting light emissions [1402] along a first central light emission axis [1222] intersecting the first pivot axis [1202]. Further in the example [1100] of the implementation of the lighting system, the second lighting module [1122] may be configured for emitting further light emissions [1404] along a second central light emission axis [1224] intersecting the second pivot axis [1210]. As examples of the example [1100] of the lighting system, the range [1214] of pivotal movement, and the another range [1216] of pivotal movement, and the further range [1218] of pivotal movement may be collectively configured for permitting an alignment of the first central light emission axis [1222] of the first lighting module [1118] as being parallel with the second central light emission axis [1224] of the second lighting module [1122]. Additionally in the example [1100] of the lighting system, the third lighting module

[1132] may be configured for emitting additional light emissions [1406] along a third central light emission axis [1322] intersecting the third pivot axis [1304]. In further examples of the example [1100] of the lighting system, the fourth lighting module [1148] may be configured for emitting other light emissions [1408] along a fourth central light emission axis [1324] intersecting the fourth pivot axis [1312]. In some examples of the example [1100] of the lighting system, the additional range of pivotal movement [1315], and the yet another range of pivotal movement [1318], and the still further range of pivotal movement [1320] may be collectively configured for permitting an alignment of the third central light emission axis [1322] of the third lighting module [1132] as being parallel with the fourth central light emission axis [1324] of the fourth lighting module [1148].

In some examples of the example [1100] of the lighting system, the first pivot joint [1204] may be configured for facilitating a locking of the first central light emission axis [1222] of the first lighting module [1118] in a fixed position relative to the second central light emission axis [1224] of the second lighting module [1122]. As additional examples of the example [1100] of the lighting system, the first pivot joint [1204] may be configured for facilitating a locking of the another longitudinal axis [1114] of the mounting body [1110] as being in a fixed position relative to the first central light emission axis [1222] of the first lighting module [1118]. In further examples of the example [1100] of the lighting system, the second pivot joint [1212] may be configured for facilitating another locking of the another longitudinal axis [1114] of the mounting body [1110] as being in another fixed position relative to the second central light emission axis [1224] of the second lighting module [1122]. In examples of the example [1100] of the lighting system, the first pivot joint [1204] may be configured for permitting the range [1214] of pivotal movement by the first housing [1120] around the first pivot axis [1202] while the another longitudinal axis [1114] of the mounting body [1110] is locked in the fixed position relative to the first central light emission axis [1222] and is locked in the another fixed position relative to the second central light emission axis [1224]. In additional examples of the example [1100] of the lighting system, the third pivot joint [1302] may be configured for facilitating a locking of the third central light emission axis [1322] of the third lighting module [1132] in a fixed position relative to the fourth central light emission axis [1324] of the fourth lighting module [1148]. In other examples of the example [1100] of the lighting system, the third pivot joint [1302] may be configured for facilitating a locking of the further longitudinal axis [1144] of the another mounting body [1140] as being in a fixed position relative to the third central light emission axis [1322] of the third lighting module [1132]. As additional examples of the example [1100] of the lighting system, the fourth pivot joint [1310] may be configured for facilitating another locking of the further longitudinal axis [1144] of the another mounting body [1140] as being in another fixed position relative to the fourth central light emission axis [1324] of the fourth lighting module [1148]. In examples of the example [1100] of the lighting system, the third pivot joint [1302] may be configured for facilitating the additional range of pivotal movement [1315] by the third housing [1306] around the third pivot axis [1304] while the further longitudinal axis [1144] of the another mounting body [1140] is locked in the fixed position relative to the third central light emission axis [1322] and is locked in the another fixed position relative to the fourth central light emission axis [1324]. In some examples of the example [1100] of the lighting system, the first connector body [1126] may be configured for facilitating a locking of the first central light emission axis [1222] as being parallel with the third central light emission axis [1322]. In other examples of the example [1100] of the lighting system, the second connector body [1134] may be configured for facilitating a locking of the second central light emission axis [1224] as being parallel with the fourth central light emission axis [1324].

As additional examples, the example [1100] of the lighting system may include a first mounting arm [1226] being attached to the first housing [1120] and forming a part of the first pivot joint [1204]. In further examples, the example [1100] of the lighting system may include a second mounting arm [1228] being attached to the second housing [1124] and forming a part of the second pivot joint [1212]. In some examples of the example [1100] of the lighting system, the first mounting arm [1226] may form a part of the first housing [1120], and the second mounting arm [1228] may form a part of the second housing [1124]. Further, for example, the first mounting arm [1226] of the example [1100] of the lighting system may be aligned between the first semiconductor light-emitting device [1206] and the first pivot axis [1202]; and the second mounting arm [1228] may be aligned between the second semiconductor light-emitting device [1208] and the second pivot axis [1210]. As further examples of the example [1100] of the lighting system, the first mounting arm [1226] may be configured for permitting the range [1214] of pivotal movement by the first housing [1120] around the first pivot axis [1202] and for permitting the another range [1216] of pivotal movement by the mounting body [1110] around the first pivot axis [1202]; and the second mounting arm [1228] may be configured for permitting the further range [1218] of pivotal movement by the second housing [1124] around the second pivot axis [1210]. In further examples of the example [1100] of the lighting system, the first mounting arm [1226] may have an end [1150] intersecting with the first pivot axis [1202], and the second mounting arm [1228] may have another end [1152] intersecting with the second pivot axis [1210].

As additional examples, the example [1100] of the lighting system may include a third mounting arm [1326] being attached to the third housing [1306] and forming a part of the third pivot joint [1302]. In further examples, the example [1100] of the lighting system may include a fourth mounting arm [1328] being attached to the fourth housing [1314] and forming a part of the fourth pivot joint [1310]. In some examples of the example [1100] of the lighting system, the third mounting arm [1326] may form a part of the third housing [1306], and the fourth mounting arm [1328] may form a part of the fourth housing [1314]. Further, for example, the third mounting arm [1326] of the example [1100] of the lighting system may be aligned between the third semiconductor light-emitting device [1308] and the third pivot axis [1304], and the fourth mounting arm [1328] may be aligned between the fourth semiconductor light-emitting device [1316] and the fourth pivot axis [1312]. As further examples of the example [1100] of the lighting system, the third mounting arm [1326] may be configured for permitting the additional range [1315] of pivotal movement by the third housing [1306] around the third pivot axis [1304] and for permitting the yet another range [1318] of pivotal movement by the another mounting body [1140] around the third pivot axis [1304]; and the fourth mounting arm [1328] may be configured for permitting the still further range [1320] of pivotal movement by the fourth housing [1314] around the fourth pivot axis [1312]. In further examples of the example [1100] of the lighting system, the third mounting arm [1326] may have a further end [1154] intersecting with the third pivot axis [1304], and the fourth mounting arm [1328] may have an additional end [1156] intersecting with the fourth pivot axis [1312].

In some examples, the example [1100] of the lighting system may include a set screw or locking bolt [1203] passing through the first end [1112] of the mounting body [1110] to the first mounting arm [1226], or passing through the first mounting arm [1226] to the first end [1112] of the mounting body [1110], for locking them into a fixed relative position. In further examples, the example [1100] of the lighting system may include a set screw or locking bolt [1205] passing through the second end [1116] of the mounting body [1110] to the second mounting arm [1228], or passing through the second mounting arm [1228] to the second end [1116] of the mounting body [1110], for locking them into a fixed relative position. In some examples, the example [1100] of the lighting system may include a set screw or locking bolt [1321] passing through the third mounting arm [1326] to the another mounting body [1140], or passing through the another mounting body [1140] to the third mounting arm [1326], for locking them into a fixed relative position. In further examples, the example [1100] of the lighting system may include a set screw or locking bolt [1323] passing through the fourth mounting arm [1328] to the another mounting body [1140], or passing through the another mounting body [1140] to the fourth mounting arm [1328], for locking them into a fixed relative position.

In some examples of the example [1100] of the lighting system, the first housing [1120] may include a first light emission aperture [1410], and the first housing [1120] may include a first back plate [1158] being spaced apart by a first side wall [1170] along the first central light emission axis [1222]. As additional examples of the example [1100] of the lighting system, the second housing [1124] may include a second light emission aperture [1412], and the second housing [1124] may include a second back plate [1160] being spaced apart by a second side wall [1172] along the second central light emission axis [1224]. As further examples of the example [1100] of the lighting system, the third housing [1306] may include a third light emission aperture [1416], and the third housing [1306] may include a third back plate [1162] being spaced apart by a third side wall [1330] along the third central light emission axis [1322]. In other examples of the example [1100] of the lighting system, the fourth housing [1314] may include a fourth light emission aperture [1418], and the fourth housing [1314] may include a fourth back plate [1164] being spaced apart by a fourth side wall [1332] along the fourth central light emission axis [1324]. As further examples, the first housing [1120] may include a lens [1403]; and the second housing [1124] may include a lens [1405]; and the third housing [1306] may include a lens [1407]; and the fourth housing [1314] may include a lens [1409]. Additionally, for example, each of the housings [1120], [1124], [1306], [1314] may include further optical components (not shown), including, as examples, a lens carrier and a primary reflector. In examples of the example [1100] of the implementation of the lighting system, configuring the first lighting module [1118] for emitting the light emissions [1402] along the first central light emission axis [1214] and configuring the second lighting module [1122] for emitting the further light emissions [1404] along the second central light emission axis [1224] may include fixing the lenses [1403], [1405] at selected orientations within the first and second housings [1120], [1124]. In further examples of the example [1100] of the implementation of the lighting system, configuring the third lighting module [1132] for emitting the light emissions [1406] along the third central light emission axis [1322] and configuring the fourth lighting module [1148] for emitting the additional light emissions [1408] along the fourth central light emission axis [1324] may include fixing the lenses [1407], [1409] at selected orientations within the third and fourth housings [1306], [1314].

In addition, for example, the lens [1403] may be a tertiary lens; and the first housing [1120] may include a secondary lens (not shown) being located between the first semiconductor light-emitting device [1206] and the lens [1403]. Further, for example, the lens [1405] may be a tertiary lens; and the second housing [1124] may include another secondary lens (not shown) being located between the second semiconductor light-emitting device [1208] and the lens [1405]. In addition, for example, the lens [1407] may be a tertiary lens; and the third housing [1306] may include a secondary lens (not shown) being located between the third semiconductor light-emitting device [1308] and the lens [1407]. Further, for example, the lens [1409] may be a tertiary lens; and the fourth housing [1314] may include another secondary lens (not shown) being located between the fourth semiconductor light-emitting device [1316] and the lens [1409]. As further examples, the first, second, third and fourth housings [1120], [1124], [1306], [1314] respectively may each independently include an oriented lens [1403], [1405], [1407], [1409], or may each independently include an oriented secondary lens (not shown). In examples, an oriented lens [1403], [1405], [1407], [1409], or such an oriented secondary lens (not shown) may be configured for emission of light [1402], [1404], [1406], [1408] having a non-uniform intensity distribution around the respective central light emission axes [1222], [1224], [1322], [1324]. In examples, an oriented lens [1403], [1405], [1407], [1409], or such an oriented secondary lens (not shown) may be configured for emission of light [1402], [1404], [1406], [1408] having a non-uniform intensity distribution as intentionally being asymmetrically oriented around the central light emission axes [1222], [1224], [1322], [1324]. Further, for example, an oriented lens [1403], [1405], [1407], [1409] or secondary lens (not shown) of the first, second, third, or fourth housing [1120], [1124], [1306], [1314] may be configured for emission of light [1402], [1404], [1406], [1408] having a non-uniform intensity distribution being asymmetrically oriented around the central light emission axis [1222], [1224], [1322], [1324], in a selected manner, relative to another non-uniform intensity distribution being asymmetrically oriented around another one of the central light emission axes [1222], [1224], [1322], [1324] for emission of light [1402], [1404], [1406], [1408] by another oriented lens [1403], [1405], [1407], [1409] or another secondary lens (not shown). In some examples, the example [1100] of the lighting system may cause such intentionally asymmetric orientations of the light emission distributions around the central light emission axes [1222], [1224], [1322], [1324] to be established by the positioning of the lenses [1403], [1405], [1407], [1409] and such secondary lenses (not shown) around the respective central light emission axes [1222], [1224], [1322], [1324] in the first, second, third and fourth housings [1120], [1124], [1306], [1314]. In further examples, the example [1100] of the lighting system may cause such intentionally asymmetric orientations of the light emission distributions around the central light emission axes [1222], [1224], [1322], [1324] to be maintained by attachment of the mounting bracket plate [1101] by the mounting fastener [1105] to a working surface (not shown), examples of working surfaces including a surface of: a wall, a ceiling, a floor, or a table.

In some examples [1100] of the lighting system, the first side wall [1170], the second side wall [1172], the third side wall [1330], and the fourth side wall [1332] each independently may have a shape, and the shapes of the side walls [1170], [1172], [1330], [1332] may each independently include: a cylindrical shape; a spherical shape; a bullet shape; a frusto-conical shape; or an ellipsoid shape. As a further example [1100] of the lighting system, the first housing [1120] may include additional side walls [1174], [1422], [1424]; and the first side wall [1170] together with the additional side walls [1174], [1422], [1424] may collectively form a first housing [1120] shape, and the first housing [1120] shape may include a polyhedron. As another example [1100] of the lighting system, the second housing [1124] may include additional side walls [1176], [1331], [1428]; and the second side wall [1172] together with the additional side walls [1176], [1331], [1428] may collectively form a second housing [1124] shape, and the second housing [1124] shape may include a polyhedron. As an additional example [1100] of the lighting system, the third housing [1306] may include additional side walls [1182], [1178], [1434]; and the third side wall [1330] together with the additional side walls [1182], [1178], [1434] may collectively form a third housing [1306] shape, and the third housing [1306] shape may include a polyhedron. As another example [1100] of the lighting system, the fourth housing [1148] may include additional side walls [1184], [1180], [1438]; and the fourth side wall [1332] together with the additional side walls [1184], [1180], [1438] may collectively form a fourth housing [1148] shape, and the fourth housing [1148] shape may include a polyhedron. As examples [1100] of the lighting system, the polyhedron shape of the first housing [1120], the second housing [1124], the third housing [1306], and the fourth housing [1314] each independently may include a cube or a prism; and in some examples, the prism may include: a rectangular prism; a pentagonal prism; or a hexagonal prism.

In some examples [1100] of the lighting system, the first mounting arm [1226] may be attached to the first back plate [1158]. Further, in some examples [1100] of the lighting system, the second mounting arm [1228] may be attached to the second back plate [1160]. Additionally, in some examples [1100] of the lighting system, the third mounting arm [1326] may be attached to the third back plate [1162]. Also, in some examples [1100] of the lighting system, the fourth mounting arm [1328] may be attached to the fourth back plate [1164]. As examples, the first mounting arm [1226] may be integral with the first back plate [1158]; and the second mounting arm [1228] may be integral with the second back plate [1160]. Further, as examples, the third mounting arm [1326] may be integral with the third back plate [1162]; and the fourth mounting arm [1328] may be integral with the fourth back plate [1164].

In additional examples [1100] of the lighting system, the mounting body [1110] may include a lateral edge [1234] extending between the first and second ends [1112], [1116] of the mounting body [1110]; and the first mounting arm [1226] may have a surface [1236] configured for being engaged with the lateral edge [1234] of the mounting body [1110] at an endpoint of the another range [1216] of pivotal movement; and the second mounting arm [1228] may have another surface [1238] configured for being engaged with the lateral edge [1234] at another endpoint of the further range [1218] of pivotal movement. In some examples [1100] of the lighting system, the surface [1236] of the first mounting arm [1226] and the another surface [1238] of the second mounting arm [1228] may be configured together with the lateral edge [1234] of the mounting body [1110] for cooperatively preventing the first housing [1120] from being in direct contact with the second housing [1124]. In further examples [1100] of the lighting system, the surface [1236] of the first mounting arm [1226] and the another surface [1238] of the second mounting arm [1228] may be configured, while being engaged with the lateral edge [1234] of the mounting body [1110], for cooperatively maintaining the first housing [1120] as being at least a selected minimum distance [1220] of about one millimeter away from the second housing [1124].

In further examples [1100] of the lighting system, the another mounting body [1140] may include a lateral edge [1334] extending between the first and second ends [1142], [1146] of the another mounting body [1140]; and the third mounting arm [1326] may have a surface [1336] configured for being engaged with the lateral edge [1334] of the another mounting body [1140] at an endpoint of the still another range [1315] of pivotal movement; and the fourth mounting arm [1328] may have another surface [1338] configured for being engaged with the lateral edge [1334] at another endpoint of the still further range [1320] of pivotal movement. In some examples [1100] of the lighting system, the surface [1336] of the third mounting arm [1326] and the another surface [1338] of the fourth mounting arm [1328] may be configured together with the lateral edge [1334] of the another mounting body [1140] for cooperatively preventing the third housing [1306] from being in direct contact with the fourth housing [1314]. In further examples [1100] of the lighting system, the surface [1336] of the third mounting arm [1326] and the another surface [1338] of the fourth mounting arm [1328] may be configured, while being engaged with the lateral edge [1334] of the another mounting body [1140], for cooperatively maintaining the third housing [1306] as being at least a selected minimum distance [1319] of about one millimeter away from the fourth housing [1314].

In additional examples [1100] of the lighting system, the mounting body [1110] may include: a container [1510] and a cover [1512] collectively forming an enclosed chamber [1166]; and the enclosed chamber [1166] may include: an aperture [1602] forming a part of the first pivot joint [1204] and being aligned with the first pivot axis [1202]; and another aperture [1612] forming a part of the second pivot joint [1212] and being aligned with the second pivot axis [1210]. In further examples [1100] of the lighting system, the another mounting body [1140] may include: another container [1514] and another cover [1516] collectively forming another enclosed chamber [1168]; and the another enclosed chamber [1168] may include: a further aperture [1608] forming a part of the third pivot joint [1302] and being aligned with the third pivot axis [1304]; and an additional aperture [1620] forming a part of the fourth pivot joint [1310] and being aligned with the fourth pivot axis [1312].

In some examples [1100] of the lighting system: the mounting post [1111] may include a first electrical conduit, represented by the arrow [1106], communicating with the first and second ends [1104], [1108] of the mounting post [1111]; and the end [1150] of the first mounting arm [1226] may include a second electrical conduit, represented by an arrow [1242], communicating with the first electrical conduit [1106] and with the aperture [1602]; and the end [1150] of the first mounting arm [1226] may include a third electrical conduit, represented by an arrow [1244], communicating with the second electrical conduit [1242] and with the first lighting module [1118]; and the another end [1152] of the second mounting arm [1228] may include a fourth electrical conduit, represented by an arrow [1246], communicating with the another aperture [1612] and with the second lighting module [1122]. In additional examples [1100] of the lighting system, the first connector body [1126] may include a fifth electrical conduit, represented by an arrow [1248], communicating with the first end [1104] of the mounting post [1111] and with the first end [1142] of the another mounting body [1140]; and the second connector body [1134] may include a sixth electrical conduit, represented by an arrow [1250], communicating with the second end [1116] of the mounting body [1110] and with the second end [1146] of the another mounting body [1140]; and the further end [1154] of the third mounting arm [1326] may include a seventh electrical conduit, represented by an arrow [1340], communicating with the first end [1142] of the another mounting body [1140] and with the third lighting module [1132]; and the additional end [1156] of the fourth mounting arm [1328] may include an eighth electrical conduit, represented by an arrow [1342], communicating with the second end [1146] of the another mounting body [1140] and with the fourth lighting module [1148]. In further examples [1100] of the lighting system, the first electrical conduit [1106], the second electrical conduit [1242], the enclosed chamber [1166], the third electrical conduit [1244], the fourth electrical conduit [1246], the fifth electrical conduit [1248], the sixth electrical conduit [1250], the seventh electrical conduit [1340], and the eighth electrical conduit [1342] may be collectively configured for supplying electrical power to the first, second, third and fourth lighting modules [1118], [1122], [1132], [1148] from an external power source represented by an arrow [1252]. In a further example of the example [1100] of the lighting system, the first electrical conduit [1106], the second electrical conduit [1242], the enclosed chamber [1166], the third electrical conduit [1244], the fourth electrical conduit [1246], the fifth electrical conduit [1248], the sixth electrical conduit [1250], the seventh electrical conduit [1340], and the eighth electrical conduit [1342] may together form an electrical circuit for supplying electrical power to the first, second, third and fourth lighting modules [1118], [1122], [1132], [1148] from the external power source [1252]. As an example, an example [1100] of the lighting system may include the first, second, third and fourth lighting modules [1118], [1122], [1132], [1148] each having a peak rated light output of 2,500 lumens, and may be supplied with electrical power from a 15 amp external power circuit [1252]. In another example, an example [1100] of the lighting system may include two slaved-together sets each including the first, second, third and fourth lighting modules [1118], [1122], [1132], [1148], the lighting modules each having a peak rated light output of 2,500 lumens, and the example [1100] of the lighting system may be supplied with electrical power from a 30 amp external power circuit [1252].

In additional examples of the example [1100] of the lighting system, the first pivot joint [1204] may further include a first bolt [1502], and the first bolt [1502] may pass, along the first pivot axis [1202], into the first end [1112] of the mounting body [1110], and into the end [1150] of the first mounting arm [1226], and into the first end [1128] of the first connector body [1126]. As some examples of the example [1100] of the lighting system, the first bolt [1502] may pass, along the first pivot axis [1202], through the first end [1112] of the mounting body [1110], and then through the end [1150] of the first mounting arm [1226], and then into the first end [1128] of the first connector body [1126]. In further examples (not shown) of the example [1100] of the lighting system, the relative positions of the first mounting arm [1226] and the mounting body [1110] along the first pivot axis [1202] as shown in FIG. 15 may be exchanged, and the first bolt [1502] may pass, along the first pivot axis [1202], through the end [1150] of the first mounting arm [1226], and then through the first end [1112] of the mounting body [1110], and then into the first end [1128] of the first connector body [1126]. In some examples of the example [1100] of the lighting system, the first end [1112] of the mounting body [1110] may have the aperture [1602], and the end [1150] of the first mounting arm [1226] may have another aperture [1604], and the first end [1128] of the first connector body [1126] may have a further aperture [1606]; and the first pivot axis [1202] may pass through the apertures [1602], [1604], [1606]. Further, for example, the further aperture [1606] of the first end [1128] of the first connector body [1126] may be a threaded (not shown) receptacle [1606] configured for receiving the first bolt [1502] being threaded and forming a part of the first pivot joint [1204], the first bolt [1502] passing through the aperture [1602] and through the another aperture [1604] into the threaded receptacle [1606].

In further examples of the example [1100] of the lighting system, the third pivot joint [1302] may further include a third bolt [1504], and the third bolt [1504] may pass, along the third pivot axis [1304], into the first end [1142] of the another mounting body [1140], and into the end [1154] of the third mounting arm [1326], and into the second end [1130] of the first connector body [1126]. As some examples of the example [1100] of the lighting system, the third bolt [1504] may pass, along the third pivot axis [1304], through the first end [1142] of the another mounting body [1140], then through the end [1154] of the third mounting arm [1326], and then into the second end [1130] of the first connector body [1126]. In further examples (not shown) of the example [1100] of the lighting system, the relative positions of the another mounting body [1140] and the third mounting arm [1326] along the third pivot axis [1304] as shown in FIG. 15 may be exchanged, and the third bolt [1504] may pass, along the third pivot axis [1304], through the end [1154] of the third mounting arm [1326], then through the first end [1142] of the another mounting body [1140], and then into the second end [1130] of the first connector body [1126]. In some examples of the example [1100] of the lighting system, the first end [1142] of the another mounting body [1140] may have the further aperture [1608], and the end [1154] of the third mounting arm [1326] may have another aperture [1610], and the second end [1130] of the first connector body [1126] may have a further aperture [1702]; and the third pivot axis [1304] may pass through the apertures [1608], [1610], [1702]. Further, for example, the further aperture [1702] may be a threaded (not shown) receptacle [1702] configured for receiving the third bolt [1504] being threaded and forming a part of the third pivot joint [1302], the third bolt [1504] passing through the further aperture [1608] and through the another aperture [1610] into the threaded receptacle [1702] at the second end [1130] of the first connector body [1126]. In some examples of the example [1100] of the lighting system, the bolts [1502], [1504] may be replaced by a single bolt (not shown) extending along both of the first and third pivot axes [1202], [1304].

In further examples of the example [1100] of the lighting system, the second pivot joint [1212] may further include a second bolt [1506], and the second bolt [1506] may pass, along the second pivot axis [1210], into the second end [1116] of the mounting body [1110], and into the end [1152] of the second mounting arm [1228], and into the first end [1136] of the second connector body [1134]. As some examples of the example [1100] of the lighting system, the second bolt [1506] may pass, along the second pivot axis [1210], through the second end [1116] of the mounting body [1110], and then through the end [1152] of the second mounting arm [1228], and then into the first end [1136] of the second connector body [1134]. In additional examples (not shown) of the example [1100] of the lighting system, the relative positions of the end [1152] of the second mounting arm [1228] and the mounting body [1110] along the second pivot axis [1210] as shown in FIG. 15 may be exchanged; and the second bolt [1506] may pass, along the second pivot axis [1210], through the end [1152] of the second mounting arm [1228], and then through the second end [1116] of the mounting body [1110], and then into the first end [1136] of the second connector body [1134]. In some examples of the example [1100] of the lighting system, the second end [1116] of the mounting body [1110] may have the another aperture [1612], and the end [1152] of the second mounting arm [1228] may have another aperture [1614], and the first end [1136] of the second connector body [1134] may have an aperture [1616]; and the second pivot axis [1210] may pass through the apertures [1612], [1614], [1616]. As another example [1100] of the lighting system, the aperture [1616] of the first end [1136] of the second connector body [1134] may be a threaded (not shown) receptacle [1616] configured for receiving the second bolt [1506]; and the second bolt [1506] may pass, along the second pivot axis [1210], through the another aperture [1612], and then through the aperture [1614], and then into the threaded receptacle [1616].

In further examples of the example [1100] of the lighting system, the fourth pivot joint [1310] may further include a fourth bolt [1509], and the fourth bolt [1509] may pass, along the fourth pivot axis [1312], into the second end [1146] of the another mounting body [1140], and into the end [1156] of the fourth mounting arm [1328], and into the second end [1138] of the second connector body [1134]. As some examples of the example [1100] of the lighting system, the fourth bolt [1509] may pass, along the fourth pivot axis [1312], through the second end [1146] of the another mounting body [1140], and then through the end [1156] of the fourth mounting arm [1328], and then into the second end [1138] of the second connector body [1134]. In further examples (not shown) of the example [1100] of the lighting system, the relative positions of the another mounting body [1140] and the fourth mounting arm [1328] along the fourth pivot axis [1312] as shown in FIG. 15 may be exchanged, and the fourth bolt [1509] may pass, along the fourth pivot axis [1312], through the end [1156] of the fourth mounting arm [1328], then through the second end [1146] of the another mounting body [1140], and then into the second end [1138] of the second connector body [1134]. In some examples of the example [1100] of the lighting system, the second end [1146] of the another mounting body [1140] may have the additional aperture [1620], and the end [1156] of the fourth mounting arm [1328] may have another aperture [1622], and the second end [1138] of the second connector body [1134] may have a further aperture [1704]; and the fourth pivot axis [1312] may pass through the apertures [1620], [1622], [1704]. Further, for example, the further aperture [1704] may be a threaded (not shown) receptacle [1704] configured for receiving the fourth bolt [1509] being threaded and forming a part of the fourth pivot joint [1310], the fourth bolt [1509] passing through the additional aperture [1620] and through the another aperture [1622] into the threaded receptacle [1704] at the second end [1138] of the second connector body [1134]. In some examples of the example [1100] of the lighting system, the bolts [1506], [1509] may be replaced by a single bolt (not shown) extending along both of the second and fourth pivot axes [1210], [1312].

In other examples [1100] of the lighting system, the mounting body [1110] may include a ring [1624] surrounding the aperture [1602] and forming a part of the first pivot joint [1204]; and the first connector body [1126] may include another ring [1626] located at the first end [1128] of the first connector body [1126] and forming a part of the first pivot joint [1204]; and the another ring [1626] may be configured for being engaged with the ring [1624] while permitting the mounting body [1110] to be pivoted around the first pivot axis [1202]. In additional examples [1100] of the lighting system, the another mounting body [1140] may include a further ring [1636] surrounding the further aperture [1608] and forming a part of the third pivot joint [1302]; and the first connector body [1126] may include an additional ring [1706] located at the second end [1130] of the first connector body [1126] and forming a part of the third pivot joint [1302]; and the additional ring [1706] may be configured for being engaged with the further ring [1636] while permitting the another mounting body [1140] to be pivoted around the third pivot axis [1304].

In further examples [1100] of the lighting system, the mounting body [1110] may include an end cap [1527] forming a part of the first pivot joint [1204] and being aligned with the first pivot axis [1202]; and the ring [1624] may be aligned between the end cap [1527] and the another ring [1626]; and the end cap [1527] may be configured for permitting the mounting body [1110] to be pivoted around the first pivot axis [1202]. For example, in some examples [1100] of the lighting system, the mounting body [1110] may include the container [1510] and the cover [1512], and the cover [1512] may include two separate parts [1630], [1632] being separated by a space [1634] between them for permitting the mounting body [1110] to be pivoted around the first pivot axis [1202].

In additional examples [1100] of the lighting system, the another ring [1626] may have a surface [1638] configured for being engaged with a surface [1640] of the ring [1624]; and the surface [1638] of the another ring [1626] and the surface [1640] of the ring [1624] may be mutually positioned for permitting the mounting body [1110] to be pivoted around the first pivot axis [1202]. In further examples [1100] of the lighting system, the additional ring [1706] may have a surface [1708] configured for being engaged with a surface [1642] of the further ring [1636]; and the surface [1708] of the additional ring [1706] and the surface [1642] of the further ring [1636] may be mutually positioned for permitting the another mounting body [1140] to be pivoted around the third pivot axis [1304]. In some examples [1100] of the lighting system, the surface [1638] of the another ring [1626] and the surface [1640] of the ring [1624] may be collectively configured for locating the mounting body [1110] at a one of a plurality of predetermined positions within the another range [1216] of pivotal movement. In additional examples [1100] of the lighting system, the surface [1708] of the additional ring [1706] and the surface [1642] of the further ring [1636] may be collectively configured for locating the another mounting body [1140] at a one of a plurality of predetermined positions within the yet another range [1318] of pivotal movement. In further examples [1100] of the lighting system, configuring the surfaces [1638], [1640] and the surfaces [1708], [1642] for locating the respective mounting bodies [1110], [1140] at a one of the pluralities of predetermined positions may include each of the surfaces [1638], [1640], [1708], [1642] as having a circular pattern of alternating radially extending crests and valleys. In additional examples of the example [1100] of the lighting system, the circular patterns of alternating radially extending crests and valleys may have a uniform contour. Further, for example, in some examples [1100] of the lighting system, the circular patterns of the surfaces [1638], [1640] may fit together with each other, and the circular patterns of the surfaces [1642], [1708] may fit together with each other. Additionally, in some examples [1100] of the lighting system, the circular patterns of the surfaces [1638], [1640] may form a ratchet assembly permitting such surfaces to be rotated to a plurality of predefined positions with respect to each other around the first pivot axis [1202]. Likewise in some examples [1100] of the lighting system, the circular patterns of the surfaces [1708], [1642] may form another ratchet assembly permitting such surfaces to be rotated to a plurality of predefined positions with respect to each other around the third pivot axis [1304].

In further examples [1100] of the lighting system, the mounting body [1110] may include the ring [1624] and the first connector body [1126] may include the another ring [1626]; and the first mounting arm [1226] may include a yet another ring [1644] located at the end [1150] of the first mounting arm [1226] and forming a part of the first pivot joint [1204]; and the yet another ring [1644] may be configured for being engaged with the ring [1624] and with the another ring [1626] while permitting the first lighting module [1118] and the mounting body [1110] to be pivoted around the first pivot axis [1202]. In additional examples [1100] of the lighting system, the another mounting body [1140] may include the further ring [1636] and the first connector body [1126] may include the additional ring [1706]; and the third mounting arm [1326] may include a yet additional ring [1646] located at the end [1154] of the third mounting arm [1326] and forming a part of the third pivot joint [1302]; and the yet additional ring [1646] may be configured for being engaged with the additional ring [1706] and with the further ring [1636] while permitting the third lighting module [1132] and the another mounting body [1140] to be pivoted around the third pivot axis [1304]. In additional examples [1100] of the lighting system, the another ring [1626] may have the surface [1638], and the ring [1624] may have the surface [1640], and the yet another ring [1644] may have a first surface [1648] and a second surface [1703]. Also in those additional examples, the first surface [1648] may be configured for being engaged with the surface [1640]; and the second surface [1703] may be configured for being engaged with the surface [1638]. Further in these additional examples [1100] of the lighting system, the additional ring [1706] may have the surface [1708], and the further ring [1636] may have the surface [1642], and the yet additional ring [1646] may have a first surface [1650] and another surface [1705]. In addition, the first surface [1650] may be configured for being engaged with the surface [1708]; and the another surface [1705] may be configured for being engaged with the surface [1642]. Also in these additional examples [1100] of the lighting system, the surfaces [1640], [1648], [1703], [1638] may be mutually positioned for permitting the mounting body [1110] to be pivoted around the first pivot axis [1202]; and the surfaces [1708], [1650], [1705], [1642] may be mutually positioned for permitting the another mounting body [1140] to be pivoted around the third pivot axis [1304]. In some examples [1100] of the lighting system, the surfaces [1640], [1648], [1703], [1638] may be collectively configured for locating the mounting body [1110] at a one of a plurality of predetermined positions within the another range [1216] of pivotal movement. In additional examples [1100] of the lighting system, the surfaces [1708], [1650], [1705], [1642] may be collectively configured for locating the another mounting body [1140] at a one of a plurality of predetermined positions within the yet another range [1318] of pivotal movement. In further examples [1100] of the lighting system, each of the surfaces [1640], [1648], [1703], [1638] and each of the surfaces [1708], [1650], [1705], [1642] may include a circular pattern of alternating radially extending crests and valleys. In additional examples of the example [1100] of the lighting system, the circular patterns of alternating radially extending crests and valleys may have a uniform contour. Further, for example, in some examples [1100] of the lighting system, the circular patterns of the surfaces [1640], [1648], [1703], [1638] may fit together with each other; and the circular patterns of the surfaces [1708], [1650], [1705], [1642] may fit together with each other. Additionally, in some examples [1100] of the lighting system, the circular patterns of the surfaces [1640], [1648], [1703], [1638] may form a ratchet assembly permitting such surfaces to be rotated to a plurality of predefined positions with respect to each other around the first pivot axis [1202]. Likewise in some examples [1100] of the lighting system, the circular patterns of the surfaces [1708], [1650], [1705], [1642] may form another ratchet assembly permitting such surfaces to be rotated to a plurality of predefined positions with respect to each other around the third pivot axis [1304].

In other examples [1100] of the lighting system, the mounting body [1110] may include a yet further ring [1652] surrounding the aperture [1612] and forming a part of the second pivot joint [1212]; and the second connector body [1134] may include a still further ring [1654] located at the first end [1136] of the second connector body [1134] and forming a part of the second pivot joint [1212]; and the still further ring [1654] may be configured for being engaged with the yet further ring [1652] while permitting the second lighting module [1122] to be pivoted around the second pivot axis [1210]. In additional examples [1100] of the lighting system, the another mounting body [1140] may include a still additional ring [1656] surrounding the additional aperture [1620] and forming a part of the fourth pivot joint [1310]; and the second connector body [1134] may include an even further ring [1710] located at the second end [1138] of the second connector body [1134] and forming a part of the fourth pivot joint [1310]; and the even further ring [1710] may be configured for being engaged with the still additional ring [1656] while permitting the fourth lighting module [1148] to be pivoted around the fourth pivot axis [1312]. Further in these other examples [1100] of the lighting system, the second mounting arm [1228] may include a still another ring [1658] located at the end [1152] of the second mounting arm [1228] and forming a part of the second pivot joint [1212]; and the still another ring [1658] may be configured for being engaged with the still further ring [1654] and with the yet further ring [1652] while permitting the second lighting module [1122] to be pivoted around the second pivot axis [1210]. Additionally in these other examples [1100] of the lighting system, the fourth mounting arm [1328] may include an even additional ring [1660] located at the end [1156] of the fourth mounting arm [1328] and forming a part of the fourth pivot joint [1310]; and the even additional ring [1660] may be configured for being engaged with the even further ring [1710] and with the still additional ring [1656] while permitting the fourth lighting module [1148] to be pivoted around the fourth pivot axis [1312].

In additional examples [1100] of the lighting system, the still further ring [1654] may have a surface [1662] configured for being engaged with a surface [1664] of the yet further ring [1652]; and the surfaces [1662], [1664] may be mutually positioned for permitting the second lighting module [1122] to be pivoted around the second pivot axis [1210]. Further in these additional examples [1100] of the lighting system, the surfaces [1662], [1664] may be cooperatively configured for locating the second lighting module [1122] at a one of a plurality of predetermined positions within the further range [1218] of pivotal movement. Also in these additional examples [1100] of the lighting system, the even further ring [1710] may have a surface [1712] configured for being engaged with a surface [1666] of the still additional ring [1656]; and the surfaces [1666], [1712] may be mutually positioned for permitting the fourth lighting module [1148] to be pivoted around the fourth pivot axis [1312]. Further in these additional examples [1100] of the lighting system, the surfaces [1666], [1712] may be cooperatively configured for locating the fourth lighting module [1148] at a one of a plurality of predetermined positions within the still further range [1320] of pivotal movement.

In additional examples [1100] of the lighting system, the still further ring [1654] may have the surface [1662], and the yet further ring [1652] may have the surface [1664]; and the still another ring [1658] may have a first surface [1668] and a second surface [1707]. Further in those additional examples, the first surface [1668] may be configured for being engaged with the surface [1664]; and the second surface [1707] may be configured for being engaged with the surface [1662]. Further in these additional examples [1100] of the lighting system, the even further ring [1710] may have the surface [1712], and the still additional ring [1656] may have the surface [1666]; and the even additional ring [1660] may have a first surface [1670] and a second surface [1709]. Also in these additional examples, the first surface [1670] may be configured for being engaged with the surface [1712]; and the second surface [1709] may be configured for being engaged with the surface [1666]. Also in these additional examples [1100] of the lighting system, the surfaces [1664], [1668], [1707], [1662] may be mutually positioned for permitting the second lighting module [1122] to be pivoted around the second pivot axis [1210]; and the surfaces [1712], [1670], [1709], [1666] may be mutually positioned for permitting the fourth lighting module [1148] to be pivoted around the fourth pivot axis [1312]. Further in these additional examples [1100] of the lighting system, the surfaces [1664], [1668], [1707], [1662] may be cooperatively configured for locating the second lighting module [1122] at a one of a plurality of predetermined positions within the further range [1218] of pivotal movement. Also in these additional examples [1100] of the lighting system, the surfaces [1712], [1670], [1709], [1666] may be cooperatively configured for locating the fourth lighting module [1148] at a one of a plurality of predetermined positions within the still further range [1320] of pivotal movement. In further examples [1100] of the lighting system, each of the surfaces [1664], [1668], [1707], [1662] and each of the surfaces [1712], [1670], [1709], [1666] may include a circular pattern of alternating radially extending crests and valleys. In additional examples of the example [1100] of the lighting system, the circular patterns of alternating radially extending crests and valleys may have a uniform contour. Further, for example, in some examples [1100] of the lighting system, the circular patterns of the surfaces [1664], [1668], [1707], [1662] may fit together with each other; and the circular patterns of the surfaces [1712], [1670], [1709], [1666] may fit together with each other. Additionally, in some examples [1100] of the lighting system, the circular patterns of the surfaces [1664], [1668], [1707], [1662] may form a ratchet assembly permitting such surfaces to be rotated with respect to each other around the second pivot axis [1210]. Likewise in some examples [1100] of the lighting system, the circular patterns of the surfaces [1712], [1670], [1709], [1666] may form another ratchet assembly permitting such surfaces to be rotated with respect to each other around the fourth pivot axis [1312].

In further examples [1100] of the lighting system, the rings [1624], [1626], [1706], [1636], [1652], [1654], [1710], [1656] may be rims respectively having rim surfaces [1640], [1638], [1708], [1642], [1664], [1662], [1712], [1666] being shaped to fit together with surfaces [1648], [1703], [1650], [1705], [1668], [1707], [167], [1709] inside the rings [1644], [1646], [1658], [1660].

Figure 18:
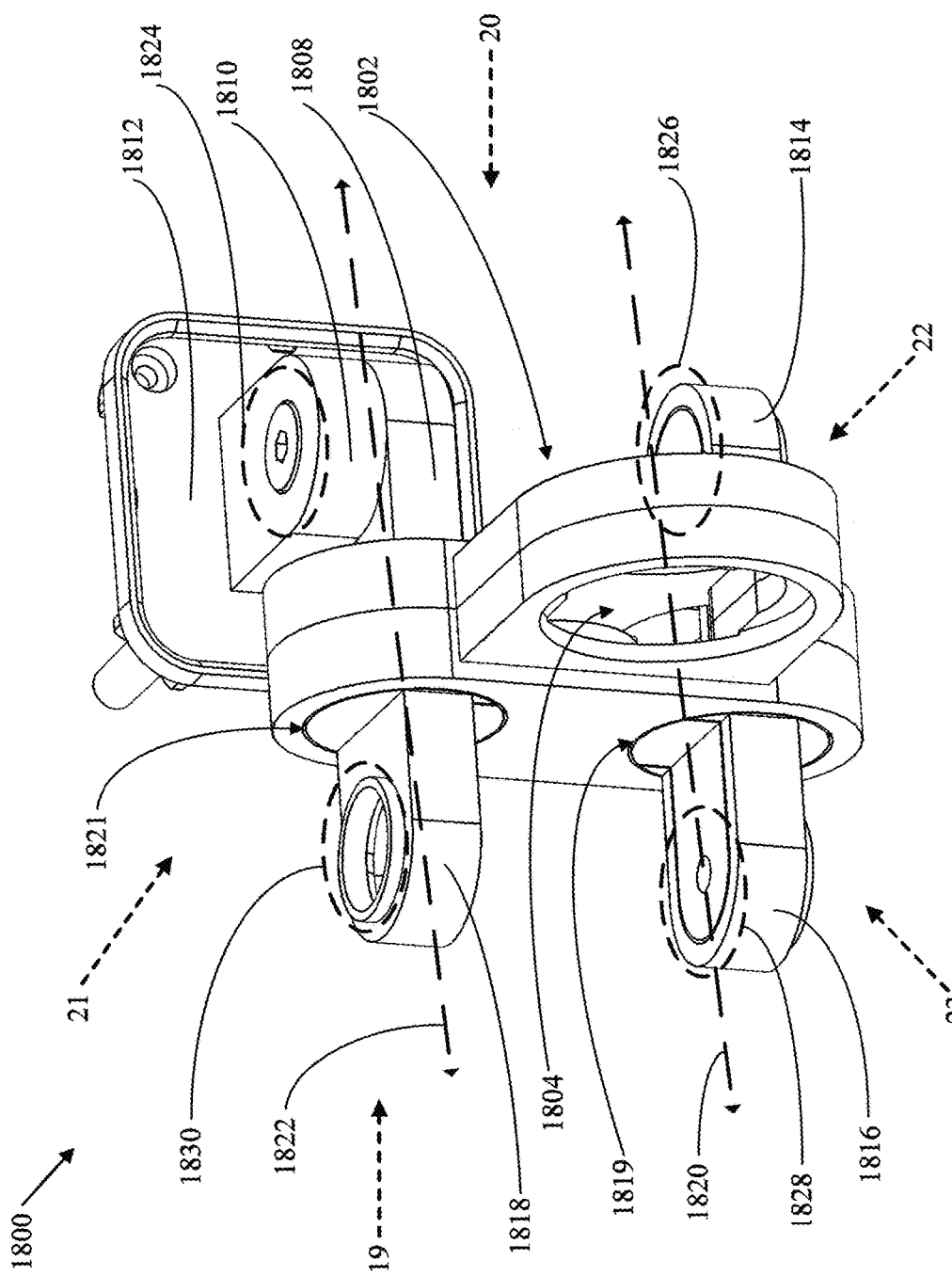
FIG. 18 is a perspective back side view showing an example [1800] of an implementation of a mini-mounting arm assembly.
Figure 19:
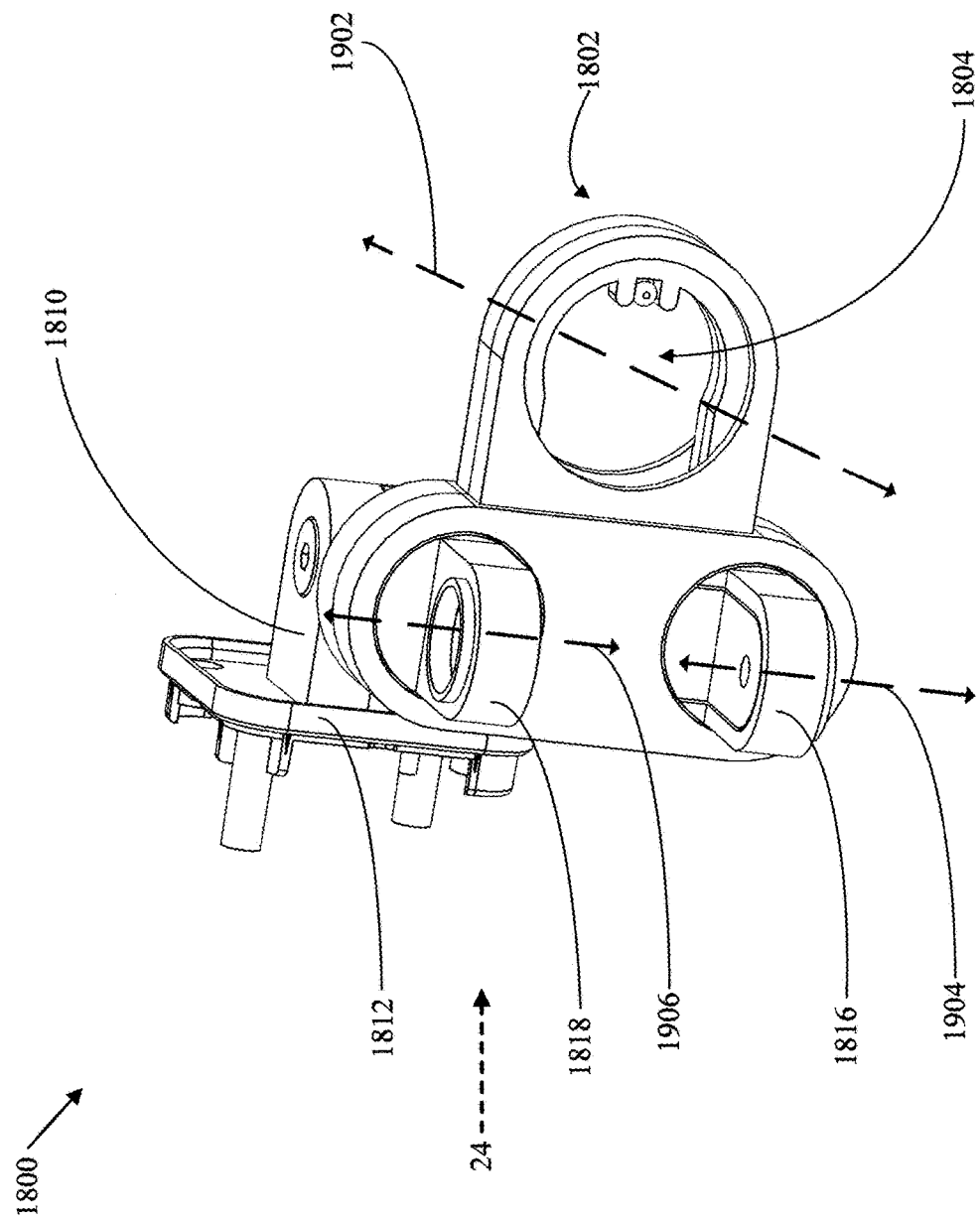
FIG. 19 is a perspective side view taken along the line [19], showing the example [1800] of the mini-mounting arm assembly.
Figure 20:
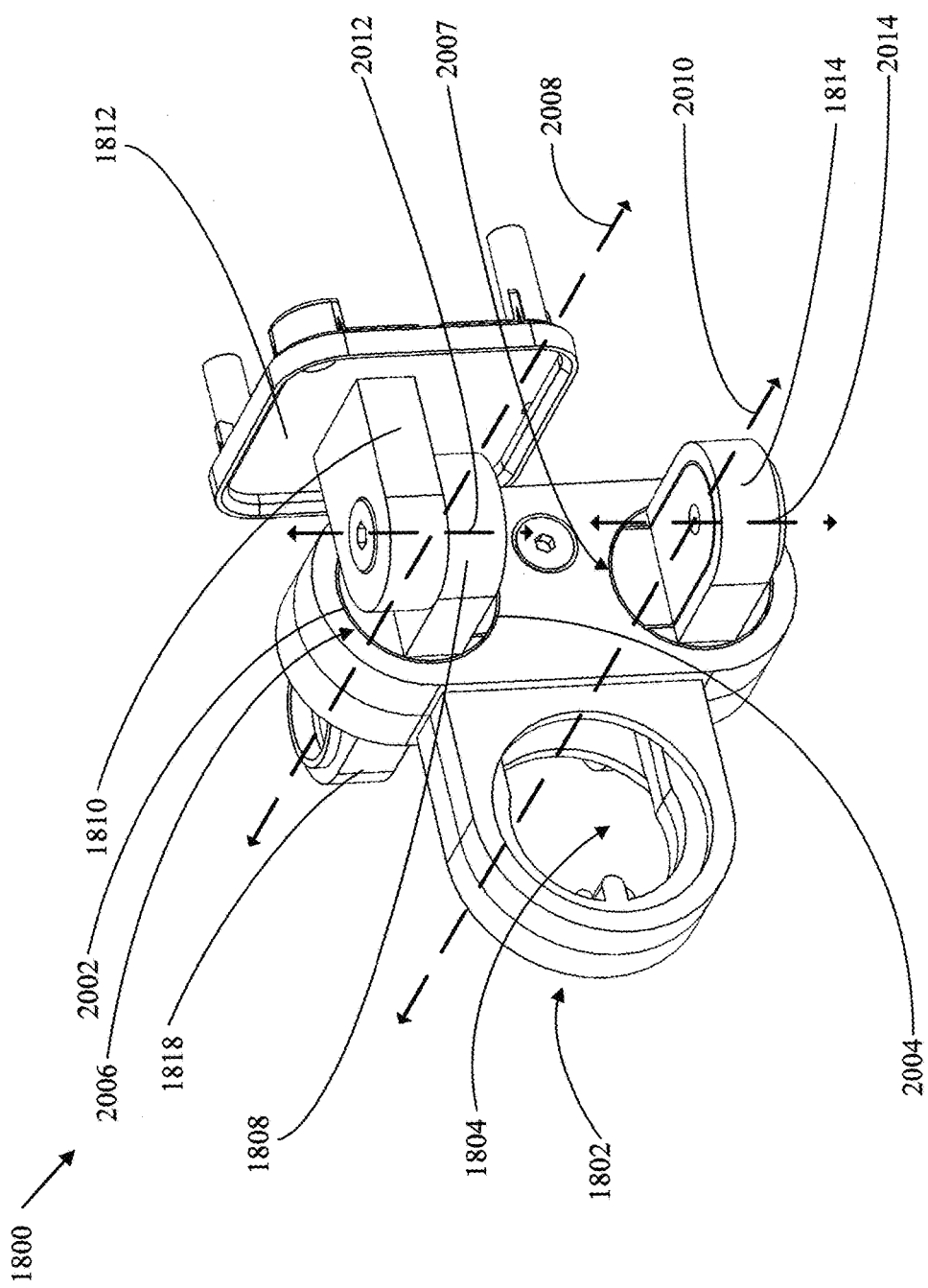
FIG. 20 is a perspective side view taken along the line [20], showing the example [1800] of the mini-mounting arm assembly.
Figure 21:
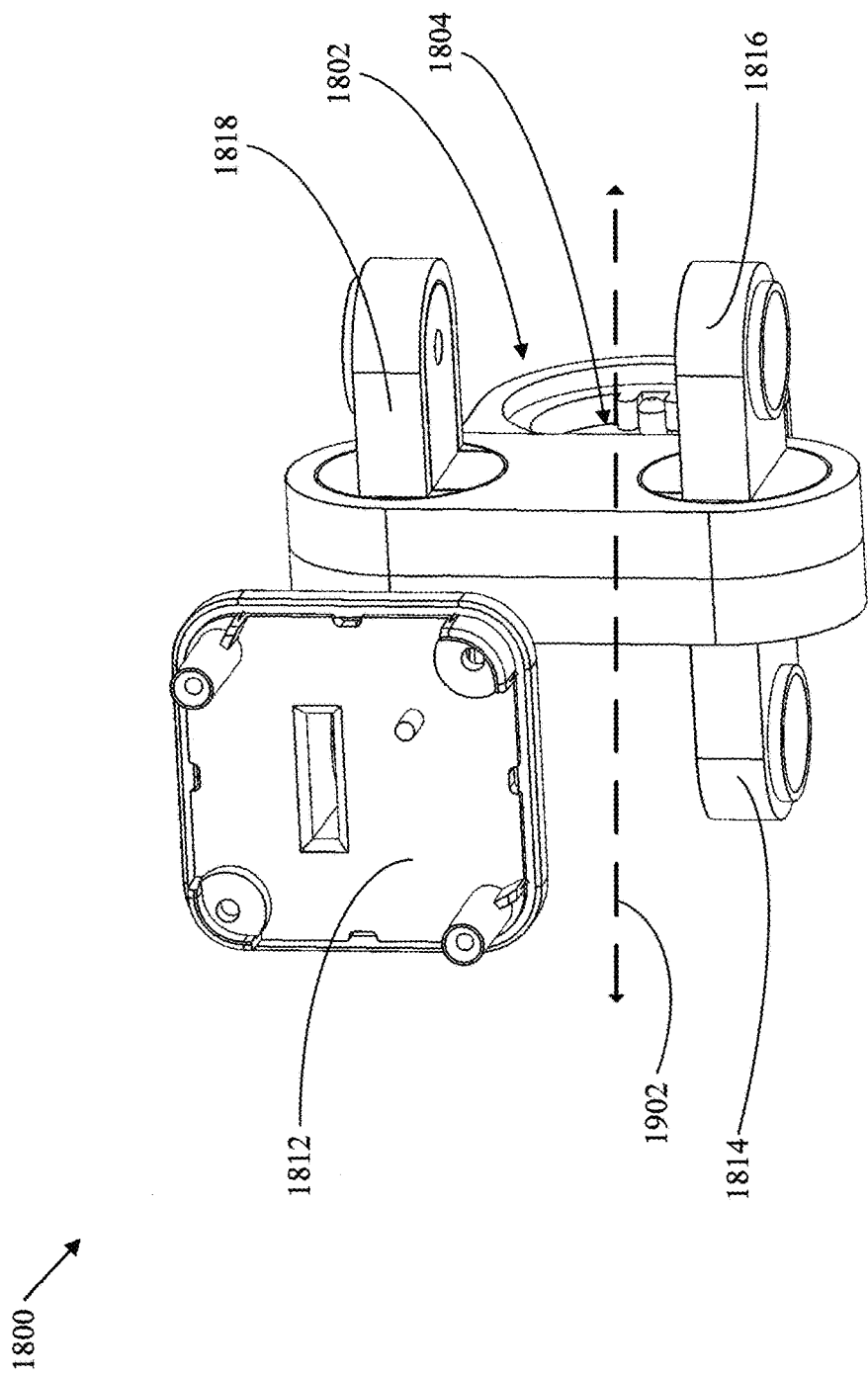
FIG. 21 is a perspective front view taken along the line [21], showing the example [1800] of the mini-mounting arm assembly.
Figure 22:
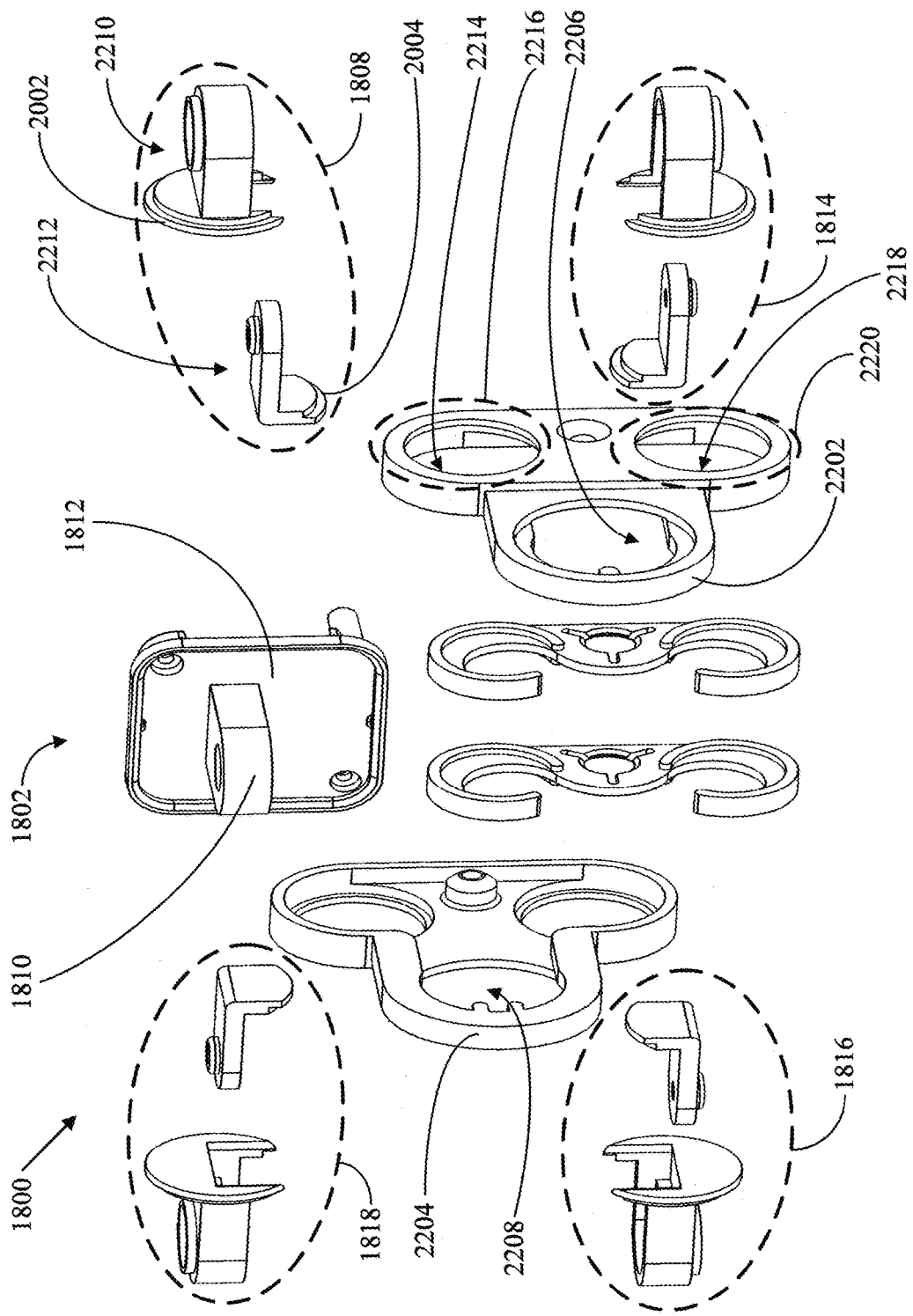
FIG. 22 is an exploded view taken along the line [22], showing the example [1800] of the mini-mounting arm assembly.
Figure 23:
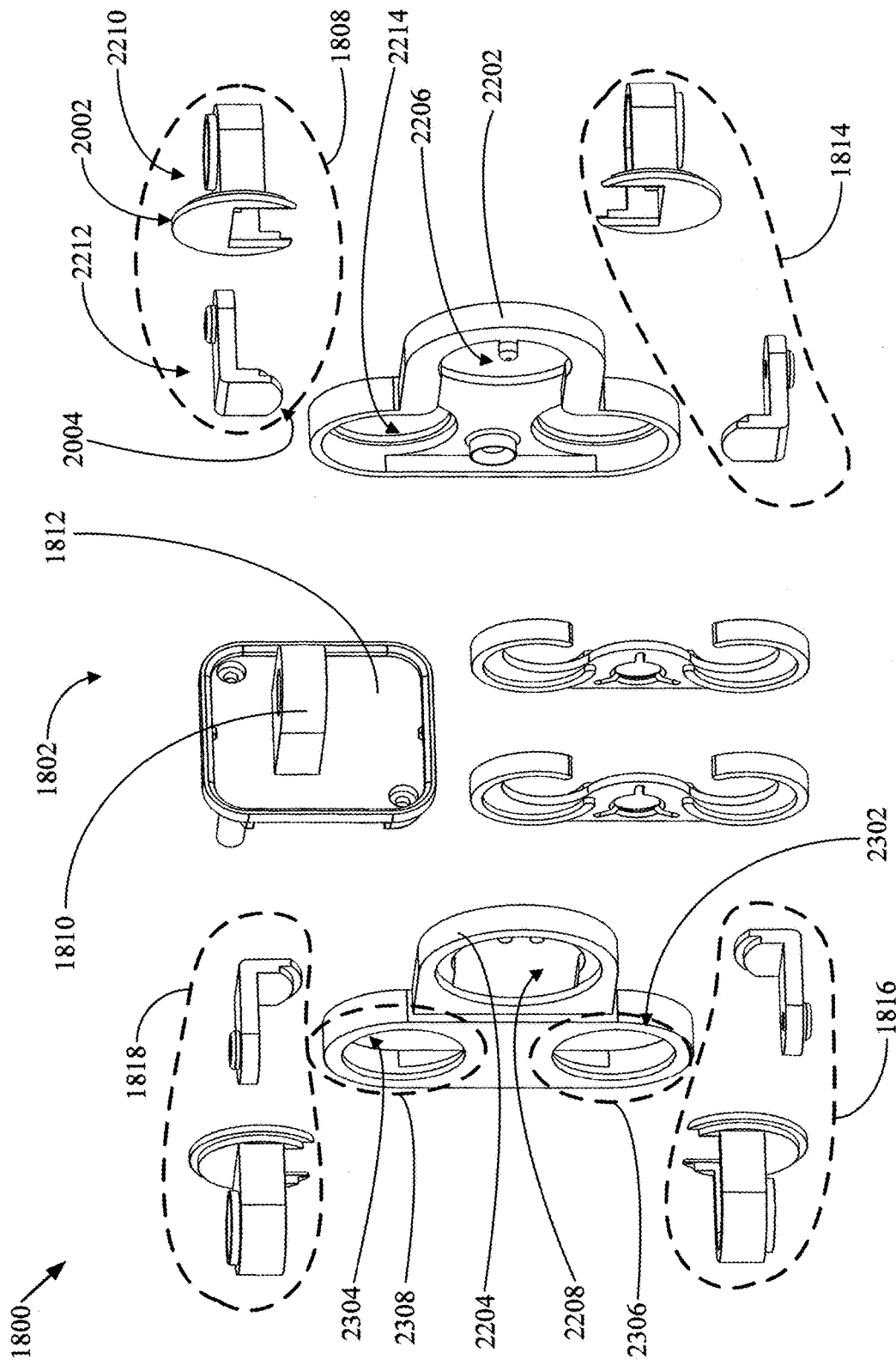
FIG. 23 is an exploded view taken along the line [23], showing the example [1800] of the mini-mounting arm assembly.
Figure 24:
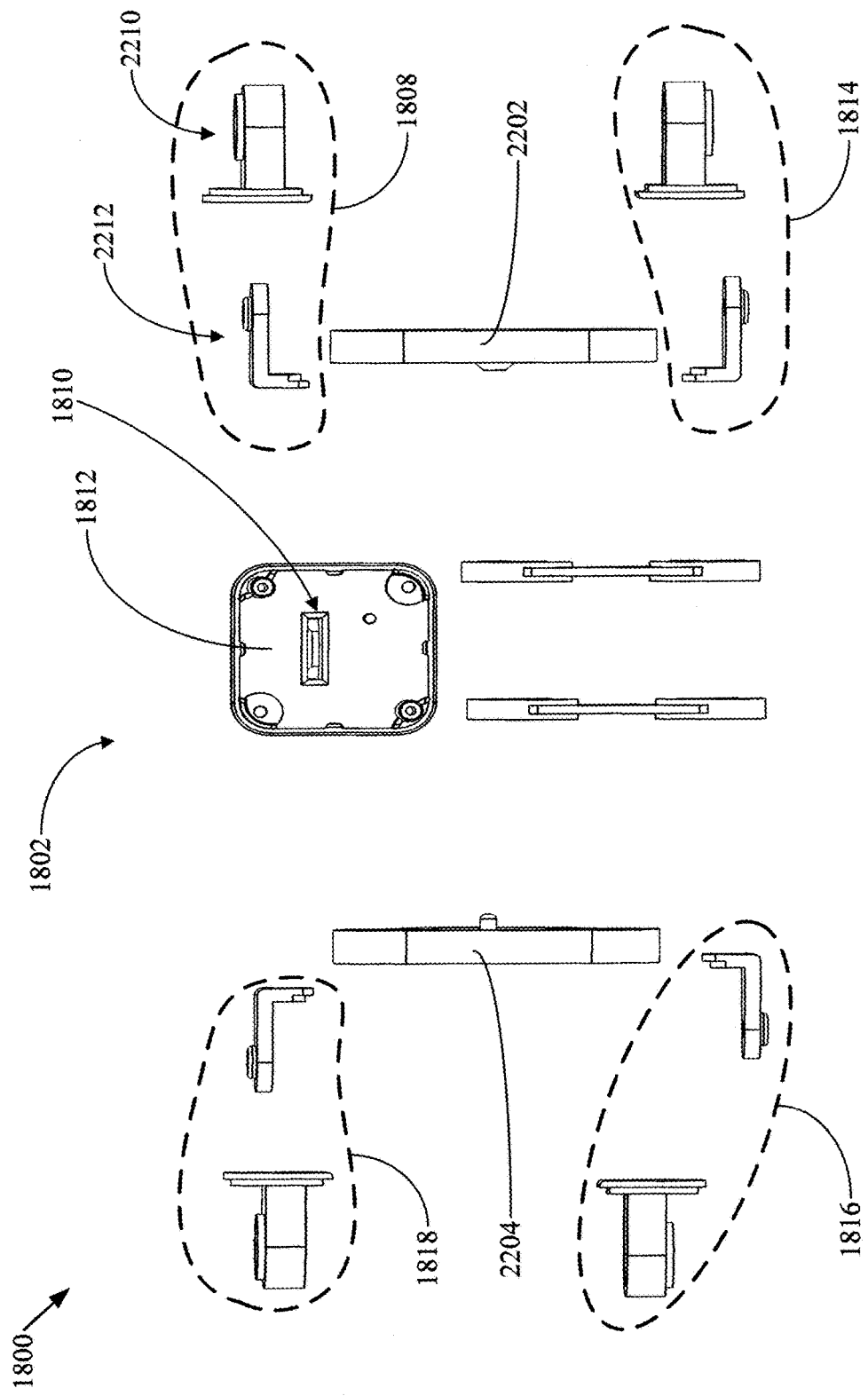
FIG. 24 is an exploded view taken along the line [24], showing the example [1800] of the mini-mounting arm assembly.

FIG. 18 is a perspective back side view showing an example [1800] of an implementation of a mini-mounting arm assembly. FIG. 19 is a perspective side view taken along the line [19], showing the example [1800] of the mini-mounting arm assembly. FIG. 20 is a perspective side view taken along the line [20], showing the example [1800] of the mini-mounting arm assembly. FIG. 21 is a perspective front view taken along the line [21], showing the example [1800] of the mini-mounting arm assembly. FIG. 22 is an exploded view taken along the line [22], showing the example [1800] of the mini-mounting arm assembly. FIG. 23 is an exploded view taken along the line [23], showing the example [1800] of the mini-mounting arm assembly. FIG. 24 is an exploded view taken along the line [24], showing the example [1800] of the mini-mounting arm assembly. It is understood throughout this specification that the example [1800] of a mini-mounting arm assembly may be utilized together with any combination of the features that are discussed herein in connection with the examples [100], [600], [1100] of lighting systems. Accordingly, the entireties of the discussions of the examples [100], [600], [1100] of lighting systems are hereby incorporated in this discussion of the examples [1800] of the mini-mounting arm assembly. As shown in FIGS. 18, 19, 20, 21, 22, 23 and 24, the example [1800] of the implementation of the mini-mounting arm assembly may include a mounting arm [1802], having an aperture [1804] being aligned with a pivot axis [1902]. FIGS. 22-24 further show the mounting arm [1802] as including two mounting arm halves [2202], [2204] respectively defining portions [2206], [2208] of the aperture [1804]. In further examples, the example [1800] of the mini-mounting arm assembly may also include: a first mini-bracket [1808] being attached to the mounting arm [1802]; and a first mini-mounting arm [1810] being attached to the first mini-bracket [1808]. As an additional example, the example [1800] of the mini-mounting arm assembly may include a first back plate [1812] being attached to the first mini-mounting arm [1810]. In additional examples, the example [1800] of the mini-mounting arm assembly may include a second mini-bracket [1814], and a third mini-bracket [1816], and a fourth mini-bracket [1818]. As further examples, each of the second, third and fourth mini-brackets [1814], [1816], [1818] may include a mini-mounting arm (not shown) having an attached back plate (not shown), corresponding to the first mini-mounting arm [1810] and the first back plate [1812] being attached to the first mini-bracket [1808]. In an example of the example

[1800] of the mini-mounting arm assembly, the first mini-bracket [1808] may be pivotally connected at a pivot axis [2012] by a pivot joint with the first mini-mounting arm [1810]; and the pivot joint may be configured for permitting a range of pivotal movement, as represented by a dashed loop [1824], by the first mini-mounting arm [1810] around the pivot axis [2012] relative to the first mini-bracket [1808]. In another example of the example [1800] of the mini-mounting arm assembly, the second mini-bracket [1814] may be pivotally connected at a pivot axis [2014] by a pivot joint with a second mini-mounting arm (not shown); and the pivot joint may be configured for permitting a range of pivotal movement, as represented by a dashed loop [1826], by the second mini-mounting arm (not shown) around the pivot axis [2014] relative to the second mini-bracket [1814]. In a further example of the example [1800] of the mini-mounting arm assembly, the third mini-bracket [1816] may be pivotally connected at a pivot axis [1904] by a pivot joint with a third mini-mounting arm (not shown); and the pivot joint may be configured for permitting a range of pivotal movement, as represented by a dashed loop [1828], by the third mini-mounting arm (not shown) around the pivot axis [1904] relative to the third mini-bracket [1816]. In an additional example of the example [1800] of the mini-mounting arm assembly, the fourth mini-bracket [1818] may be pivotally connected at a pivot axis [1906] by a pivot joint with a fourth mini-mounting arm (not shown); and the pivot joint may be configured for permitting a range of pivotal movement, as represented by a dashed loop [1830], by the fourth mini-mounting arm (not shown) around the pivot axis [1906] relative to the fourth mini-bracket [1818]. In some examples, the ranges of pivotal movement [1824], [1826], [1828], [1830] by the first, second, third and fourth mini-mounting arms around the pivot axes [2012], [2014], [1904], [1906] relative to the mini-brackets [1808], [1814], [1816], [1818] being attached to the mounting arm [1802] may collectively constitute a first degree of freedom of the example [1800] of the mini-mounting arm assembly. As another example, the first mini-bracket [1808] being represented by a dashed loop in FIGS. 22-24, may include a first mini-bracket arm [2210] and a first mini-bracket base [2212]. Further, for example, the first mini-bracket arm [2210] may include a ring portion [2002] and the first mini-bracket base [2212] may include another ring portion [2004]. In addition, for example, the ring portion [2002] and the another ring portion [2004] may be shaped for collectively forming a ring [2006] configured for being engaged with a further ring [2214] of the mounting arm half [2202]. Further, for example, the ring [2006] and the further ring [2214] may be mutually positioned for permitting a range of pivotal movement of the first mini-bracket [1808] around another pivot axis [2008], as represented by a dashed loop [2216]. In additional examples of the example [1800] of the mini-mounting arm assembly, the second, third and fourth mini-brackets being respectively represented by dashed loops [1814], [1816], and [1818] in FIGS. 22-24, likewise each independently may include a mini-bracket arm and a mini-bracket base. Further, for example, the second, third and fourth mini-brackets being respectively represented by the dashed loops [1814], [1816], and [1818] in FIGS. 22-24, likewise each independently may have the mini-bracket arm as including a ring portion, and may have the mini-bracket base as including another ring portion. Additionally, for example, the second, third and fourth mini-brackets being respectively represented by the dashed loops [1814], [1816], and [1818] in FIGS. 22-24, likewise each independently may respectively have the ring portion and the another ring portion being shaped for collectively forming a ring [2007], [1819], [1821]; and the rings [2007], [1819], [1821] of the second, third and fourth mini-brackets [1814], [1816], [1818] may likewise be configured for respectively being engaged with further rings [2218], [2302], [2304] of the mounting arm halves [2202], [2204]. In another example of the example [1800] of the mini-mounting arm assembly, the ring [2007] of the second mini-bracket [1814] and the further ring [2218] may be mutually positioned for permitting a range of pivotal movement of the second mini-bracket [1814] around a further pivot axis [2010], as represented by a dashed loop [2220]. In an additional example of the example [1800] of the mini-mounting arm assembly, the ring [1819] of the third mini-bracket [1816] and the further ring [2302] may be mutually positioned for permitting a range of pivotal movement of the third mini-bracket [1816] around an additional pivot axis [1820], as represented by a dashed loop [2306]. In still another example of the example [1800] of the mini-mounting arm assembly, the ring [1821] of the fourth mini-bracket [1818] and the further ring [2304] may be mutually positioned for permitting a range of pivotal movement of the fourth mini-bracket [1818] around a still another pivot axis [1822], as represented by a dashed loop [2308]. In some examples, the ranges of pivotal movement [2216], [2220], [2306], [2308] by the first, second, third and fourth mini brackets [1808], [1814], [1816], [1818] relative to the mounting arm [1802] around the pivot axes [2008], [2010], [1820], [1822] may collectively constitute a second degree of freedom of the example [1800] of the mini-mounting arm assembly. In further examples of the example [1800] of the mini-mounting arm assembly, the ranges of pivotal movement [1824], [1826], [1828], [1830] of the first degree of freedom relative to the mounting arm [1802] by the first, second, third and fourth mini-mounting arms around the pivot axes [2012], [2014], [1904], [1906] may be orthogonal to the ranges of pivotal movement [2216], [2220], [2306], [2308] of the second degree of freedom relative to the mounting arm [1802] by the first, second, third and fourth mini brackets [1808], [1814], [1816], [1818] around the pivot axes [2008], [2010], [1820], [1822]. In further examples of the example [1800] of the mini-mounting arm assembly, the first, second, third and fourth mini brackets [1808], [1814], [1816], [1818] or the first, second, third and fourth mini-mounting arms may have removable set screws or locking bolts (not shown) for fixing the mini-mounting arms at selected positions around the pivot axes [2012], [2014], [1904], [1906]; and the mounting arm [1802] or the first, second, third and fourth mini brackets [1808], [1814], [1816], [1818] may have removable set screws or locking bolts (not shown) for fixing the mini brackets at selected positions around the pivot axes [2008], [2010], [1820], [1822]. In other examples of the example [1800] of the mini-mounting arm assembly, the first, second, third and fourth mini brackets [1808], [1814], [1816], [1818] may have removable set screws or locking bolts (not shown) both for: fixing the mini-mounting arms at selected positions around the pivot axes [2012], [2014], [1904], [1906]; and fixing the mini brackets at selected positions around the pivot axes [2008], [2010], [1820], [1822]. In some examples of the example [1800] of the mini-mounting arm assembly, the first back plate [1812] and the second, third and fourth back plates (not shown) may each independently have an attached housing (not shown) forming a lighting module (not shown) having structures and component parts being analogous to the housings [120], [124], [620], [624], [1120], [1124], [1306], [1314] and the corresponding lighting modules [118], [122], [618], [622], [1118], [1122], [1132], [1148]

discussed earlier in connection with the examples [100], [600], [1100] of the lighting system. As further examples of the example [1800] of the mini-mounting arm assembly, the first back plate [1812] and the second, third and fourth back plates (not shown) may each independently have an attached housing (not shown) forming a lighting module (not shown) having structures and component parts being smaller than but otherwise analogous to the housings [120], [124], [620], [624], [1120], [1124], [1306], [1314] and the corresponding lighting modules [118], [122], [618], [622], [1118], [1122], [1132], [1148] discussed earlier in connection with the examples [100], [600], [1110] of the lighting system. In further examples, the mounting arm [1802] of the example [1800] of the mini-mounting arm assembly may replace a mounting arm [226], [228], [726], [728], [1226], [1228], [1326], [1328] of an example [100], [600], [1100] of the lighting system, so that the mounting arm [1802] may have the aperture [1804] replacing an aperture [506], [516], [1604], [1610], [1614], [1622] and with the pivot axis [1902] being oriented along a one of the pivot axes [202], [210], [702], [710], [1202], [1210], [1304], [1312] and may thereby attach the example [1800] of the mini-mounting arm assembly to an example [100], [600], [1100] of the lighting system.

The examples [100], [600], [1100] of lighting systems and the example [1800] of a mini-mounting arm assembly may generally be utilized in end-use applications for lighting systems that include a plurality of independently-positionable lighting modules. The examples of lighting systems that are disclosed herein may also be fabricated and utilized together with the teachings disclosed in the following commonly-owned U.S. patent applications, the entireties of which are hereby incorporated herein by reference: U.S. patent application Ser. No. 14/526,504 filed on Oct. 28, 2014, entitled "Lighting Systems Having Multiple Light Sources"; U.S. patent application Ser. No. 14/636,204 filed on Mar. 3, 2015, entitled "Lighting Systems Including Lens Modules For Selectable Light Distribution"; U.S. patent application Ser. No. 14/617,849 filed on Feb. 9, 2015, entitled "Lighting Systems Generating Controlled and Wavelength-Converted Light Emissions"; U.S. patent application Ser. No. 14/702,800 filed on May 4, 2015, entitled "Lighting Systems Including Asymmetric Lens Modules For Selectable Light Distribution"; and U.S. patent application Ser. No. 14/702,765 filed on May 4, 2015, entitled "Lighting System Having a Sealing System."

While the present invention has been disclosed in a presently defined context, it will be recognized that the present teachings may be adapted to a variety of contexts consistent with this disclosure and the claims that follow. For example, the lighting systems shown in the figures and discussed above can be adapted in the spirit of the many optional parameters described.

What is claimed is:

1. A lighting system, comprising:
   a mounting post having a first end being spaced apart along a longitudinal axis from a second end;
   a mounting body having a first end being spaced apart along another longitudinal axis from a second end, the first end of the mounting body being pivotally connected at a first pivot axis by a first pivot joint with the first end of the mounting post;
   a first lighting module including a first housing and having a first semiconductor light-emitting device in the first housing, the first lighting module being pivotally connected at the first pivot axis by the first pivot joint with the first end of the mounting body and with the first end of the mounting post;
   a second lighting module including a second housing and having a second semiconductor light-emitting device in the second housing, the second lighting module being pivotally connected at a second pivot axis by a second pivot joint with the second end of the mounting body;
   wherein the mounting body includes: a container and a cover collectively forming an enclosed chamber; and an aperture in the enclosed chamber forming a part of the first pivot joint and being aligned with the first pivot axis; and another aperture in the enclosed chamber forming a part of the second pivot joint and being aligned with the second pivot axis; and
   wherein the mounting body includes a ring surrounding the aperture and forming a part of the first pivot joint, and wherein the mounting post includes another ring located at the first end of the mounting post and forming a part of the first pivot joint, and wherein the ring is configured for being engaged with the another ring and for permitting the mounting body to be pivoted around the first pivot axis.

2. The lighting system of claim 1, wherein the first pivot joint is configured for permitting a range of pivotal movement by the first housing around the first pivot axis.

3. The lighting system of claim 2, wherein the first pivot joint is configured for permitting another range of pivotal movement by the mounting body around the first pivot axis.

4. The lighting system of claim 3, wherein the second pivot joint is configured for permitting a further range of pivotal movement by the second housing around the second pivot axis.

5. The lighting system of claim 4, wherein the first pivot joint and the second pivot joint are configured for cooperatively preventing the first housing from being in direct contact with the second housing.

6. The lighting system of claim 5, wherein the first pivot joint and the second pivot joint are configured for causing the another range of pivotal movement and the further range of pivotal movement to cooperatively prevent the first housing from being in direct contact with the second housing.

7. The lighting system of claim 5, wherein the first pivot joint and the second pivot joint are configured for cooperatively maintaining the first housing as being at least a selected minimum distance away from the second housing.

8. The lighting system of claim 7, wherein the first pivot joint and the second pivot joint are configured for cooperatively maintaining the first housing as being at least a selected minimum distance of about one millimeter away from the second housing.

9. The lighting system of claim 4, wherein the first lighting module is configured for emitting light emissions along a first central light emission axis intersecting the first pivot joint.

10. The lighting system of claim 9, wherein the second lighting module is configured for emitting further light emissions along a second central light emission axis intersecting the second pivot joint.

11. The lighting system of claim 10, wherein the range of pivotal movement, and the another range of pivotal movement, and the further range of pivotal movement are collectively configured for permitting an alignment of the first central light emission axis of the first lighting module as being parallel with the second central light emission axis of the second lighting module.

12. The lighting system of claim 10, wherein the first pivot joint is configured for facilitating a locking of the first central light emission axis of the first lighting module in a fixed position relative to the second central light emission axis of the second lighting module.

13. The lighting system of claim 10, wherein the first pivot joint is configured for facilitating a locking of the another longitudinal axis of the mounting body as being in a fixed position relative to the first central light emission axis of the first lighting module.

14. The lighting system of claim 13, wherein the second pivot joint is configured for facilitating another locking of the another longitudinal axis of the mounting body as being in another fixed position relative to the second central light emission axis of the second lighting module.

15. The lighting system of claim 14, wherein the first pivot joint is configured for permitting the range of pivotal movement by the first housing around the first pivot axis while the another longitudinal axis of the mounting body is locked in the fixed position relative to the first central light emission axis and is locked in the another fixed position relative to the second central light emission axis.

16. The lighting system of claim 10, including a first mounting arm being attached to the first housing and forming a part of the first pivot joint.

17. The lighting system of claim 16, including a second mounting arm being attached to the second housing and forming a part of the second pivot joint.

18. The lighting system of claim 17, wherein the first mounting arm forms a part of the first housing and wherein the second mounting arm forms a part of the second housing.

19. The lighting system of claim 17, wherein the first mounting arm is aligned between the first semiconductor light-emitting device and the first pivot axis, and wherein the second mounting arm is aligned between the second semiconductor light-emitting device and the second pivot axis.

20. The lighting system of claim 17, wherein the first mounting arm is configured for permitting the range of pivotal movement by the first housing around the first pivot axis and for permitting the another range of pivotal movement by the mounting body around the first pivot axis; and wherein the second mounting arm is configured for permitting the further range of pivotal movement by the second housing around the second pivot axis.

21. The lighting system of claim 20, wherein the first mounting arm has an end intersecting with the first pivot joint and wherein the second mounting arm has another end intersecting with the second pivot joint.

22. The lighting system of claim 17, wherein the first housing includes a first light emission aperture, and wherein the first housing includes a first back plate being spaced apart by a first side wall along the first central light emission axis.

23. The lighting system of claim 22, wherein the second housing includes a second light emission aperture, and wherein the second housing includes a second back plate being spaced apart by a second side wall along the second central light emission axis.

24. The lighting system of claim 23, wherein the second side wall has a shape, and wherein the shape of the second side wall includes: a cylindrical shape; a spherical shape; a bullet shape; a frusto-conical shape; or an ellipsoid shape.

25. The lighting system of claim 23, wherein the second housing includes further side walls, and wherein the second side wall and the further side walls collectively form a second housing shape, and wherein the second housing shape includes a polyhedron.

26. The lighting system of claim 25, wherein the polyhedron includes a cube or a prism.

27. The lighting system of claim 26, wherein the prism includes: a rectangular prism; a pentagonal prism; or a hexagonal prism.

28. The lighting system of claim 23, wherein the first mounting arm is attached to the first back plate.

29. The lighting system of claim 28, wherein the second mounting arm is attached to the second back plate.

30. The lighting system of claim 29, wherein the first mounting arm is integral with the first back plate and wherein the second mounting arm is integral with the second back plate.

31. The lighting system of claim 22, wherein the first side wall has a shape, and wherein the shape of the first side wall includes: a cylindrical shape; a spherical shape; a bullet shape; a frusto-conical shape; or an ellipsoid shape.

32. The lighting system of claim 22, wherein the first housing includes additional side walls, and wherein the first side wall and the additional side walls collectively form a first housing shape, and wherein the first housing shape includes a polyhedron.

33. The lighting system of claim 32, wherein the polyhedron includes a cube or a prism.

34. The lighting system of claim 33, wherein the prism includes: a rectangular prism; a pentagonal prism; or a hexagonal prism.

35. The lighting system of claim 17, further including a set screw or locking bolt passing through the first mounting arm and the mounting body, for locking the first mounting arm and the mounting body into a fixed relative position.

36. The lighting system of claim 35, additionally including another set screw or another locking bolt passing through the second mounting arm and the mounting body, for locking the second mounting arm and the mounting body into another fixed relative position.

37. The lighting system of claim 1, including a first mounting arm being attached to the first housing and forming a part of the first pivot joint, and including a second mounting arm being attached to the second housing and forming a part of the second pivot joint;
wherein the first mounting arm has an end intersecting with the first pivot joint and wherein the second mounting arm has another end intersecting with the second pivot joint; and
wherein the mounting post includes a first electrical conduit communicating with the first and second ends of the mounting post, and wherein the end of the first mounting arm includes a second electrical conduit communicating with the first electrical conduit and with the aperture, and wherein the end of the first mounting arm includes a third electrical conduit communicating with the second electrical conduit and with the first lighting module, and wherein the another end of the second mounting arm includes a fourth electrical conduit communicating with the another aperture and with the second lighting module.

38. The lighting system of claim 37, wherein the first electrical conduit, the second electrical conduit, the enclosed chamber, the third electrical conduit and the fourth electrical conduit are collectively configured for supplying electrical power to the first and second lighting modules from an external power source.

39. The lighting system of claim 1, wherein the mounting body includes an end cap forming a part of the first pivot joint and being aligned with the first pivot axis, and wherein the ring is aligned between the end cap and the another ring, and wherein the end cap is configured for permitting the mounting body to be pivoted around the first pivot axis.

40. The lighting system of claim 1, including a first mounting arm being attached to the first housing and forming a part of the first pivot joint, and including a second mounting arm being attached to the second housing and forming a part of the second pivot joint;
wherein the first mounting arm has an end intersecting with the first pivot joint and wherein the second mounting arm has another end intersecting with the second pivot joint; and
wherein the first mounting arm includes a further ring located at the end of the first mounting arm and forming a part of the first pivot joint, and wherein the further ring is configured for being engaged with the ring and with the another ring and for permitting the first lighting module and the mounting body to be pivoted around the first pivot axis.

41. The lighting system of claim 40, wherein the ring has a surface configured for being engaged with another surface of the another ring or with yet another surface of the further ring, and wherein the surface of the ring and the another surface of the another ring and the yet another surface of the further ring are mutually positioned for permitting the mounting body to be pivoted around the first pivot axis.

42. The lighting system of claim 41, wherein the first pivot joint is configured for permitting a range of pivotal movement by the first housing around the first pivot axis;
wherein the first pivot joint is configured for permitting another range of pivotal movement by the mounting body around the first pivot axis; and
wherein the surface of the ring and the another surface of the another ring and the yet another surface of the further ring are collectively configured for locating the mounting body at a one of a plurality of predetermined positions within the another range of pivotal movement.

43. The lighting system of claim 42, wherein the surface of the ring and the another surface of the another ring and the yet another surface of the further ring each includes a circular pattern of alternating radially extending crests and valleys.

44. The lighting system of claim 41, wherein the mounting body includes an additional ring surrounding the another aperture and forming a part of the second pivot joint, and wherein the second mounting arm includes yet another ring located at the another end of the second mounting arm and forming a part of the second pivot joint, and wherein the additional ring is configured for being engaged with the yet another ring and for permitting the second lighting module to be pivoted around the second pivot axis.

45. The lighting system of claim 44, wherein the additional ring has a further surface configured for being engaged with an additional surface of the yet another ring, and wherein the further surface of the additional ring and the additional surface of the yet another ring are mutually positioned for permitting the second lighting module to be pivoted around the second pivot axis.

46. The lighting system of claim 45, wherein the second pivot joint is configured for permitting a further range of pivotal movement by the second housing around the second pivot axis; and
wherein the further surface of the additional ring and the additional surface of the yet another ring are collectively configured for locating the second lighting module at a one of a plurality of predetermined positions within the further range of pivotal movement.

47. The lighting system of claim 46, wherein the further surface of the additional ring and the additional surface of the yet another ring each includes a circular pattern of alternating radially extending crests and valleys.

48. The lighting system of claim 1 further including a mounting bracket plate being attached to the mounting post.

49. The lighting system of claim 48, wherein the mounting bracket plate is attached by a swivel joint to the mounting post, and wherein the swivel joint is configured for facilitating rotation of the mounting post around the longitudinal axis on a swivel path.

50. The lighting system of claim 49, wherein the mounting post is configured for being locked at a selected position along the swivel path.

* * * * *